United States Patent
Hawkes et al.

(10) Patent No.: US 7,185,362 B2
(45) Date of Patent: Feb. 27, 2007

(54) METHOD AND APPARATUS FOR SECURITY IN A DATA PROCESSING SYSTEM

(75) Inventors: Philip Michael Hawkes, Burwood (AU); Raymond T. Hsu, San Diego, CA (US); Ramin Rezaiifar, San Diego, CA (US); Gregory G. Rose, Concord (AU); Paul E. Bender, San Diego, CA (US); Jun Wang, San Diego, CA (US); Roy Franklin Quick, Jr., San Diego, CA (US); Arungundram C. Mahendran, San Diego, CA (US); Parag A. Agashe, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 745 days.

(21) Appl. No.: 10/233,188

(22) Filed: Aug. 28, 2002

(65) Prior Publication Data

US 2003/0039361 A1    Feb. 27, 2003

Related U.S. Application Data

(63) Continuation-in-part of application No. 09/933,972, filed on Aug. 20, 2001.

(51) Int. Cl.
*G06F 9/00* (2006.01)
*G06F 12/00* (2006.01)
*H04L 9/00* (2006.01)
*H04K 1/00* (2006.01)

(52) U.S. Cl. .................. 726/4; 726/5; 726/7; 726/9; 726/17; 726/19; 726/30; 380/44; 380/201; 380/223; 380/226

(58) Field of Classification Search ............... 726/3–7, 726/17–19, 27, 29, 30; 380/201, 223, 226, 380/44
See application file for complete search history.

(56) References Cited

U.S. PATENT DOCUMENTS

| 4,323,921 | A | * | 4/1982 | Guillou | 705/53 |
|---|---|---|---|---|---|
| 5,101,501 | A | | 3/1992 | Gilhousen et al. | 455/33 |
| 5,467,398 | A | * | 11/1995 | Pierce et al. | 380/44 |
| 5,758,068 | A | * | 5/1998 | Brandt et al. | 726/27 |
| 6,233,341 | B1 | * | 5/2001 | Riggins | 380/277 |
| 6,343,280 | B2 | * | 1/2002 | Clark | 705/55 |
| 6,690,795 | B1 | * | 2/2004 | Richards | 380/203 |
| 2002/0001386 | A1 | * | 1/2002 | Akiyama | 380/201 |
| 2002/0164025 | A1 | * | 11/2002 | Raiz et al. | 380/231 |

FOREIGN PATENT DOCUMENTS

EP    1 213 943 A1    6/2002

(Continued)

OTHER PUBLICATIONS

Greg Rose et al., "The Secure Real Time Transport Protocol," Internet Draft, Feb. 2001, pp. 1-26.

(Continued)

*Primary Examiner*—Norman M. Wright
(74) *Attorney, Agent, or Firm*—Thomas R Rouse; Thien T Nguyen; Ramin Mobarhan

(57) ABSTRACT

Method and apparatus for secure transmissions. Each user is provided a registration key. A long-time updated broadcast key is encrypted using the registration key and provided periodically to a user. A short-time updated key is encrypted using the broadcast key and provided periodically to a user. Broadcasts are then encrypted using the short-time key, wherein the user decrypts the broadcast message using the short-time key. One embodiment provides link layer content encryption. Another embodiment provides end-to-end encryption.

69 Claims, 34 Drawing Sheets

FOREIGN PATENT DOCUMENTS

| | | |
|---|---|---|
| WO | 00/02406 | 1/2000 |
| WO | 02/061572 A1 | 8/2002 |
| WO | 02/080449 A1 | 10/2002 |
| WO | 03/032573 A2 | 4/2003 |

OTHER PUBLICATIONS

A. J. Menezes et al., "Key Layering and Cryptoperiods, Passage," Handbook of Applied Cryptography, CRC Press Series on Discrete Mathematices and its Applications, Boca Raton, Florida, 1997, pp. 551-553, 577-581.

Shimshon Berkovits, "How to Broadcast a Secret," Advances in Cryptology, Eurocrypt, International Conference on the Theory and Application of Cryptographic Techniques, Springer Verlag, Delaware, Apr. 11, 1991, pp. 535-541.

* cited by examiner

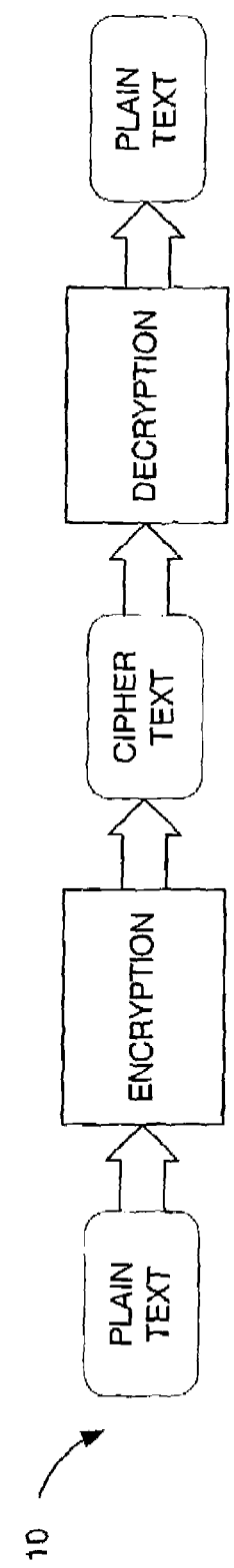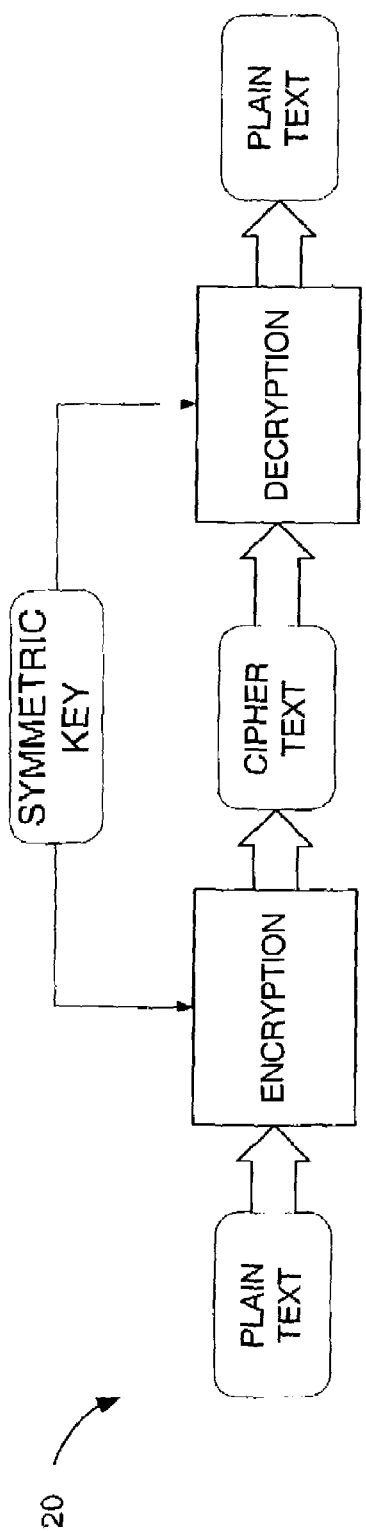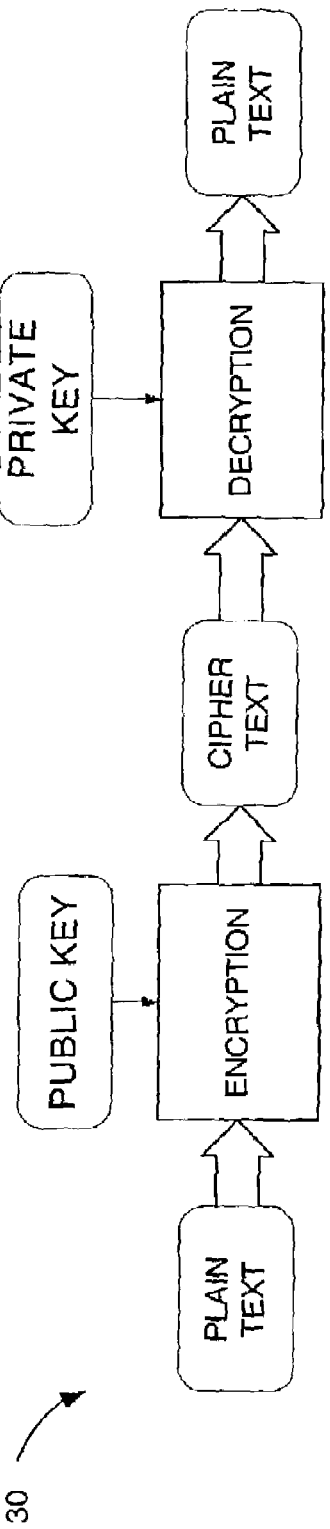

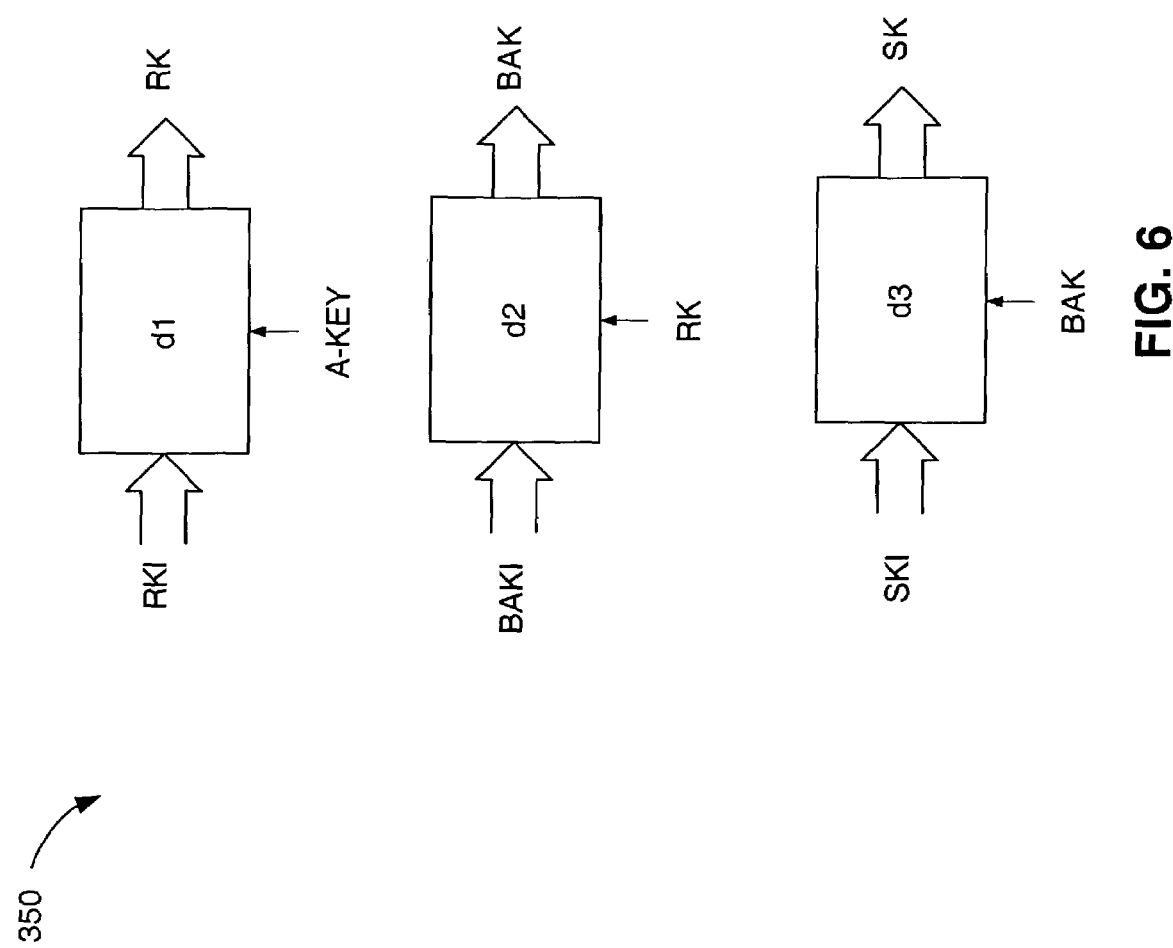

METHOD AND APPARATUS FOR SECURITY IN A DATA PROCESSING SYSTEM

CLAIM OF PRIORITY UNDER 35 U.S.C. §120

The present Application for Patent is a Continuation in Part and claims priority to U.S. patent application Ser. No. 09/933,972 entitled "METHOD AND APPARATUS FOR SECURITY IN A DATA PROCESSING SYSTEM" filed Aug. 20, 2001, and assigned to the assignee hereof and hereby expressly incorporated by reference herein.

FIELD

The present invention relates to data processing systems generally and specifically, to methods and apparatus for security in a data processing system.

BACKGROUND

Security in data processing and information systems, including communications systems, contributes to accountability, fairness, accuracy, confidentiality, operability, as well as a plethora of other desired criteria. Encryption, or the general field of cryptography, is used in electronic commerce, wireless communications, broadcasting, and has an unlimited range of applications. In electronic commerce, encryption is used to prevent fraud in and verify financial transactions. In data processing systems, encryption is used to verify a participant's identity. Encryption is also used to prevent hacking, protect Web pages, and prevent access to confidential documents.

Asymmetric encryption system, often referred to as a cryptosystem, uses a same key (i.e., the secret key) to encrypt and decrypt a message. Whereas an asymmetric encryption system uses a first key (i.e., the public key) to encrypt a message and uses a different key (i.e., the private key) to decrypt it. Asymmetric cryptosystems are also called public key cryptosystems. A problem exists in symmetric cryptosystems in the secure provision of the secret key from a sender to a recipient. Further, a problem exists when keys or other encryption mechanisms are updated frequently. In a data processing system methods of securely updating keys incur processing time, memory storage and other processing overhead. In a wireless communication system, updating keys uses valuable bandwidth used for transmission.

The prior art does not provide a method for updating keys to a large group of mobile stations in order that they may access an encrypted broadcast. There is a need, therefore, for a secure and efficient method of updating keys in a data processing system. Further, there is a need for a secure and efficient method of updating keys in a wireless communication system.

SUMMARY

Embodiments disclosed herein address the above stated needs by providing a method for security in a data processing system.

In one aspect a method for secure transmissions includes determining a registration key specific to a participant in a transmission, determining a first key, encrypting the first key with the registration key, determining a second key, encrypting the second key with the first key and updating the first and second keys.

In another aspect, a method for secure reception of a transmission includes receiving a registration key specific to a participant in a transmission, receiving a first key, decrypting the first key with the registration key, receiving a second key, decrypting the second key with the first key, receiving a broadcast stream of information, and decrypting the broadcast stream of information using the second key.

In still another aspect a wireless communication system supporting a broadcast service option has an infrastructure element including a receive circuitry, a user identification unit, operative to recover a short-time key for decrypting a broadcast message, and a mobile equipment unit adapted to apply the short-time key for decrypting the broadcast message. The user identification unit includes a processing unit operative to decrypt key information, and a memory storage unit for storing a registration key.

BRIEF DESCRIPTION OF THE DRAWINGS

FIG. 1A is a diagram of a cryptosystem.
FIG. 1B is a diagram of a symmetric cryptosystem.
FIG. 1C is a diagram of an asymmetric cryptosystem.
FIG. 6 is a model describing cryptographic operations within a UIM.

DETAILED DESCRIPTION

Figure 1D:
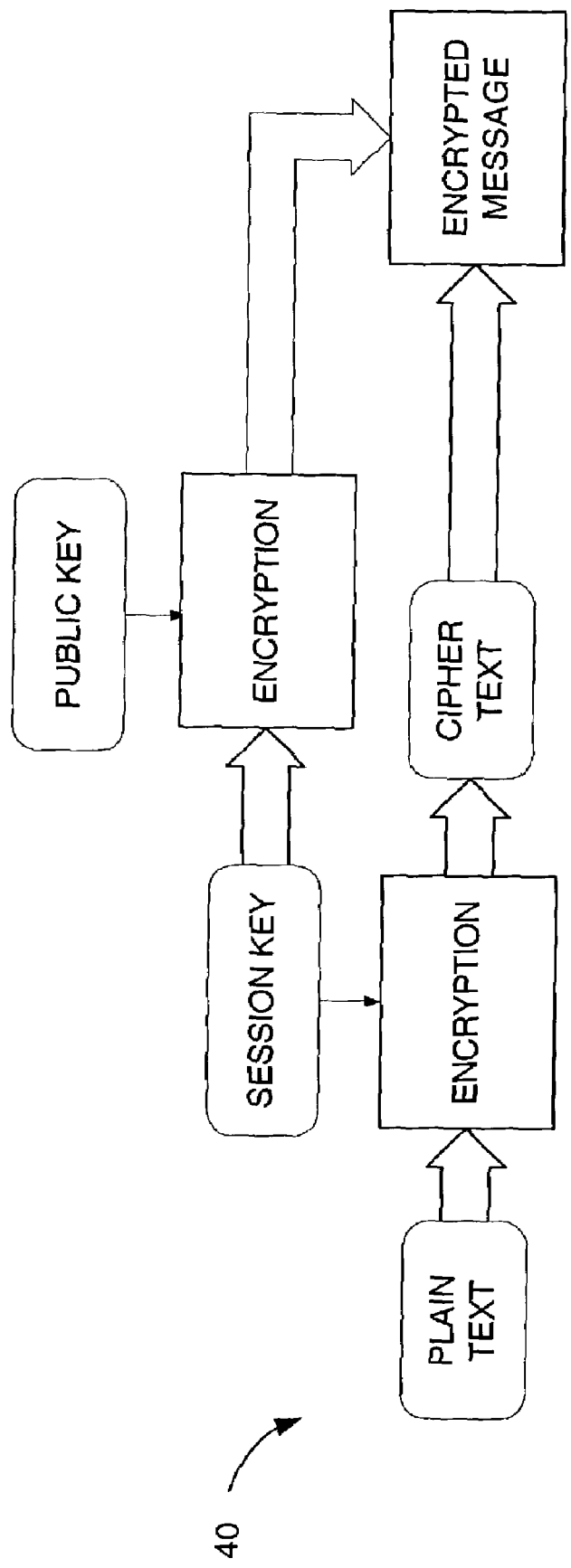
FIG. 1D is a diagram of a PGP encryption system.

The word "exemplary" is used exclusively herein to mean "serving as an example, instance, or illustration." Any embodiment described herein as "exemplary" is not necessarily to be construed as preferred or advantageous over other embodiments.

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of system, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3G TS 25.211, 3G TS 25.212, 3G TS 25.213, and 3G TS 25.214, 3G TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile, and vice versa. As an exemplary embodiment the following discussion considers a spread-spectrum communication system consistent with cdma2000 systems. Alternate embodiments may incorporate another standard/system. Still other embodiments may apply the security methods disclosed herein to any type of data processing system using a cryptosystem.

A cryptosystem is a method of disguising messages thus allowing a specific group of users to extract the message. FIG. 1A illustrates a basic cryptosystem 10. Cryptography is the art of creating and using cryptosystems. Cryptanalysis is the art of breaking cryptosystems, i.e., receiving and understanding the message when you are not within the specific group of users allowed access to the message. The original message is referred to as a plaintext message or plaintext.

The encrypted message is called a ciphertext, wherein encryption includes any means to convert plaintext into ciphertext. Decryption includes any means to convert ciphertext into plaintext, i.e., recover the original message. As illustrated in FIG. 1A, the plaintext message is encrypted to form a ciphertext. The ciphertext is then received and decrypted to recover the plaintext. While the terms plaintext and ciphertext generally refer to data, the concepts of encryption may be applied to any digital information, including audio and video data presented in digital form. While the description of the invention provided herein uses the term plaintext and ciphertext consistent with the art of cryptography, these terms do not exclude other forms of digital communications.

A cryptosystem is based on secrets. A group of entities shares a secret if an entity outside this group cannot obtain the secret without significantly large amount of resources. This secret is said to serve as a security association between the groups of entities.

A cryptosystem may be a collection of algorithms, wherein each algorithm is labeled and the labels are called keys. A symmetric encryption system, often referred to as a cryptosystem, uses a same key (i.e., the secret key) to encrypt and decrypt a message. A symmetric encryption system 20 is illustrated in FIG. 1B, wherein both the encryption and decryption utilize a same private key.

In contrast, an asymmetric encryption system uses a first key (i.e., the public key) to encrypt a message and uses a different key (i.e., the private key) to decrypt it. FIG. 1C illustrates an asymmetric encryption system 30 wherein one key is provided for encryption and a second key for decryption. Asymmetric cryptosystems are also called public key cryptosystems. The public key is published and available for encrypting any message, however, only the private key may be used to decrypt the message encrypted with the public key.

A problem exists in symmetric cryptosystems in the secure provision of the secret key from a sender to a recipient. In one solution a courier may be used to provide the information, or, a more efficient and reliable solution may be to use a public key cryptosystem, such as a public-key cryptosystem defined by Rivest, Shamir, and Adleman (RSA) which is discussed hereinbelow. The RSA system is used in the popular security tool referred to as Pretty Good Privacy (PGP), which is further detailed hereinbelow. For instance, an originally recorded cryptosystem altered letters in a plaintext by shifting each letter by n in the alphabet, wherein n is a predetermined constant integer value. In such a scheme, an "A" is replaced with a "D," etc., wherein a given encryption scheme may incorporate several different values of n. In this encryption scheme "n" is the key. Intended recipients are provided the encryption scheme prior to receipt of a ciphertext. In this way, only those knowing the key should be able to decrypt the ciphertext to recover the plaintext. However, by calculating the key with knowledge of encryption, unintended parties may be able to intercept and decrypt the ciphertext, creating a security problem.

More complicated and sophisticated cryptosystems employ strategic keys that are deter interception and decryption from unintended parties. A classic cryptosystem employs encryption functions E and decryption functions D such that:

$$D\_K(E\_K(P))=P, \text{ for any plaintext } P. \quad (1)$$

In a public-key cryptosystem, E_K is easily computed from a known "public key" Y which in turn is computed from K. Y is published, so that anyone can encrypt messages. The decryption function D_K is computed from public key Y, but only with knowledge of a private key K. Without the private key K an unintended recipient may not decrypt the ciphertext so generated. In this way only the recipient who generated K can decrypt messages.

RSA is a public-key cryptosystem defined by Rivest, Shamir, and Adleman. As an example, consider plaintexts as positive integers up to $2^{512}$. Keys are quadruples (p,q,e,d), with p given as a 256-bit prime number, q as a 258-bit prime number, and d and e large numbers with (de−1) divisible by (p−1)(q−1). Further, define the encryption function as:

$$E\_K(P)=P^e \bmod pq, D\_K(C)=C^d \bmod pq. \qquad (2)$$

While, E_K is easily computed from the pair (pq,e), there is no known simple way to compute D_K from the pair (pq,e). Therefore, the recipient that generates K can publish (pq,e). It is possible to send a secret message to the recipient, as he is the one able to read the message.

Figure 1E:
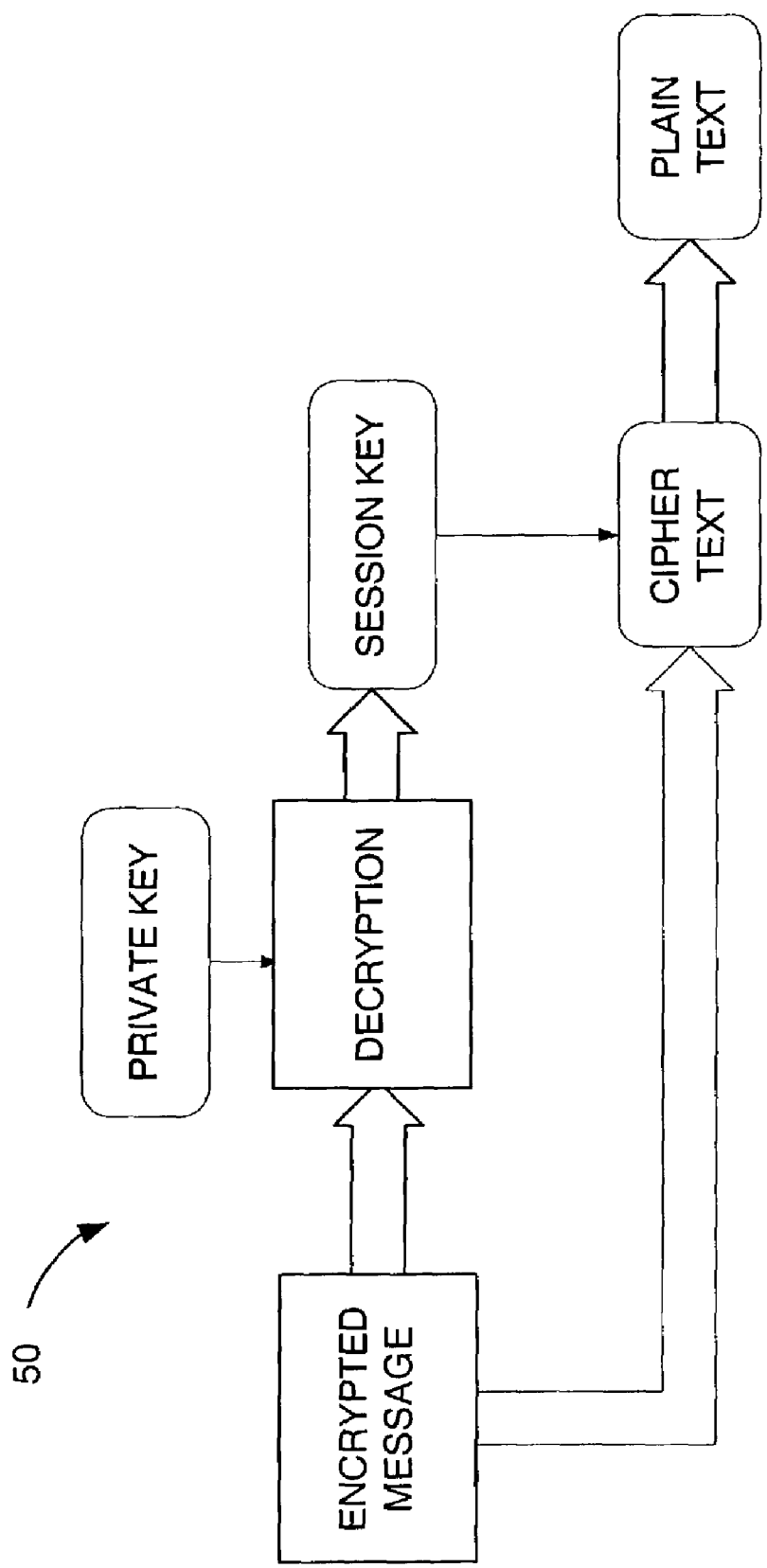
FIG. 1E is a diagram of a PGP decryption system.

PGP combines features from symmetric and asymmetric encryption. FIGS. 1D and 1E illustrate a PGP cryptosystem 50, wherein a plaintext message is encrypted and recovered. In FIG. 1D, the plaintext message is compressed to save modem transmission time and disk space. Compression strengthens cryptographic security by adding another level of translation to the encrypting and decrypting processing. Most cryptanalysis techniques exploit patterns found in the plaintext to crack the cipher. Compression reduces these patterns in the plaintext, thereby enhancing resistance to cryptanalysis. Note that one embodiment does not compress plaintext or other messages that are too short to compress or which don't compress well aren't compressed.

PGP then creates a session key, which is a one-time-only secret key. This key is a random number that may be generated from any random event(s), such as random movements of mouse and the keystrokes while typing. The session key works with a secure encryption algorithm to encrypt the plaintext, resulting in ciphertext. Once the data is encrypted, the session key is then encrypted to the recipient's public key. This public key-encrypted session key is transmitted along with the ciphertext to the recipient.

For decryption, as illustrated in FIG. 1E, the recipient's copy of PGP uses a private key to recover the temporary session key, which PGP then uses to decrypt the conventionally encrypted ciphertext. The combination of encryption methods takes advantage of the convenience of public key encryption and the speed of symmetric encryption. Symmetric encryption is generally much faster than public key encryption. Public key encryption in turn provides a solution to key distribution and data transmission issues. In combination, performance and key distribution are improved without any sacrifice in security.

A key is a value that works with a cryptographic algorithm to produce a specific ciphertext. Keys are basically very large numbers. Key size is measured in bits. In public key cryptography, security increases with key size, however, public key size and the symmetric encryption private key size are not generally related. While the public and private keys are mathematically related, a difficulty arises in deriving a private key given only a public key. Deriving the private key is possible given enough time and computing power, making the selection of key size an important security issue. The goal is to have a large key that is secure, while maintaining key size sufficiently small for quick processing. An additional consideration is the expected interceptor, specifically, what is the importance of a message to a third party, and how much resource does a third party have to decrypt.

Larger keys will be cryptographically secure for a longer period of time. Keys are stored in encrypted form. PGP specifically stores keys in two files; one for public keys and one for private keys. These files are called keyrings. In application, a PGP encryption system adds the public keys of target recipients to the sender's public keyring. The sender's private keys are stored on the sender's private keyring.

As discussed in the examples given hereinabove, the method of distributing the keys used for encryption and decryption can be complicated. The "key exchange problem" involves first ensuring that keys are exchanged such that both the sender and receiver can perform encryption and decryption, respectively, and for bidirectional communication, such that the sender and receiver can both encrypt and decrypt messages. Further, it is desired that key exchange be performed so as to preclude interception by a third unintended party. Finally, an additional consideration is authentication providing assurance to the receiver that a message was encrypted by an intended sender and not a third party. In a private key exchange system, the keys are exchanged secretly providing improved security upon successful key exchange and valid authentication. Note that the private key encryption scheme implicitly provides authentication. The underlying assumption in a private key cryptosystem is that only the intended sender will have the key capable of encrypting messages delivered to the intended receiver. While public-key cryptographic methods solve a critical aspect of the 'key-exchange problem', specifically their resistance to analysis even with the presence a passive eavesdropper during exchange of keys, they do not solve all problems associated with key exchange. In particular, since the keys are considered 'public knowledge,' (particularly with RSA) some other mechanism is desired to provide authentication, as possession of keys alone (sufficient to encrypt messages) is no evidence of a particular unique identity of the sender, nor is possession of a corresponding decryption key by itself enough to establish the identity of the recipient.

One solution is to develop a key distribution mechanism that assures that listed keys are actually those of the given entities, sometimes called a trusted authority, certificate authority, or third part escrow agent. The authority typically does not actually generate keys, but does ensure that the lists of keys and associated identities kept and advertised for reference by senders and receivers are correct and uncompromised. Another method relies on users to distribute and track each other's keys and trust in an informal, distributed fashion. Under RSA, if a user wishes to send evidence of their identity in addition to an encrypted message, a signature is encrypted with the private key. The receiver can use the RSA algorithm in reverse to verify that the information decrypts, such that only the sender could have encrypted the plaintext by use of the secret key. Typically the encrypted 'signature' is a 'message digest' that comprises a unique mathematical 'summary' of the secret message (if the signature were static across multiple messages, once known previous receivers could use it falsely). In this way, theoretically only the sender of the message could generate a valid signature for that message, thereby authenticating it for the receiver.

A message digest is often computed using a cryptographic hash function. A cryptographic hash function computes a value (with a fixed number of bits) from any input, regardless of the length of the input. One property of a cryptographic hash function is this: given an output value, it is computationally difficult to determine an input that will result in that output. An example of a cryptographic hash function is SHA-1 as described in "Secure Hash Standard," FIPS PUB 180-1, promulgated by the Federal Information Processing Standards Publications (FIPS PUBS) and issued by the National Institute of Standards and Technology.

Figure 2:
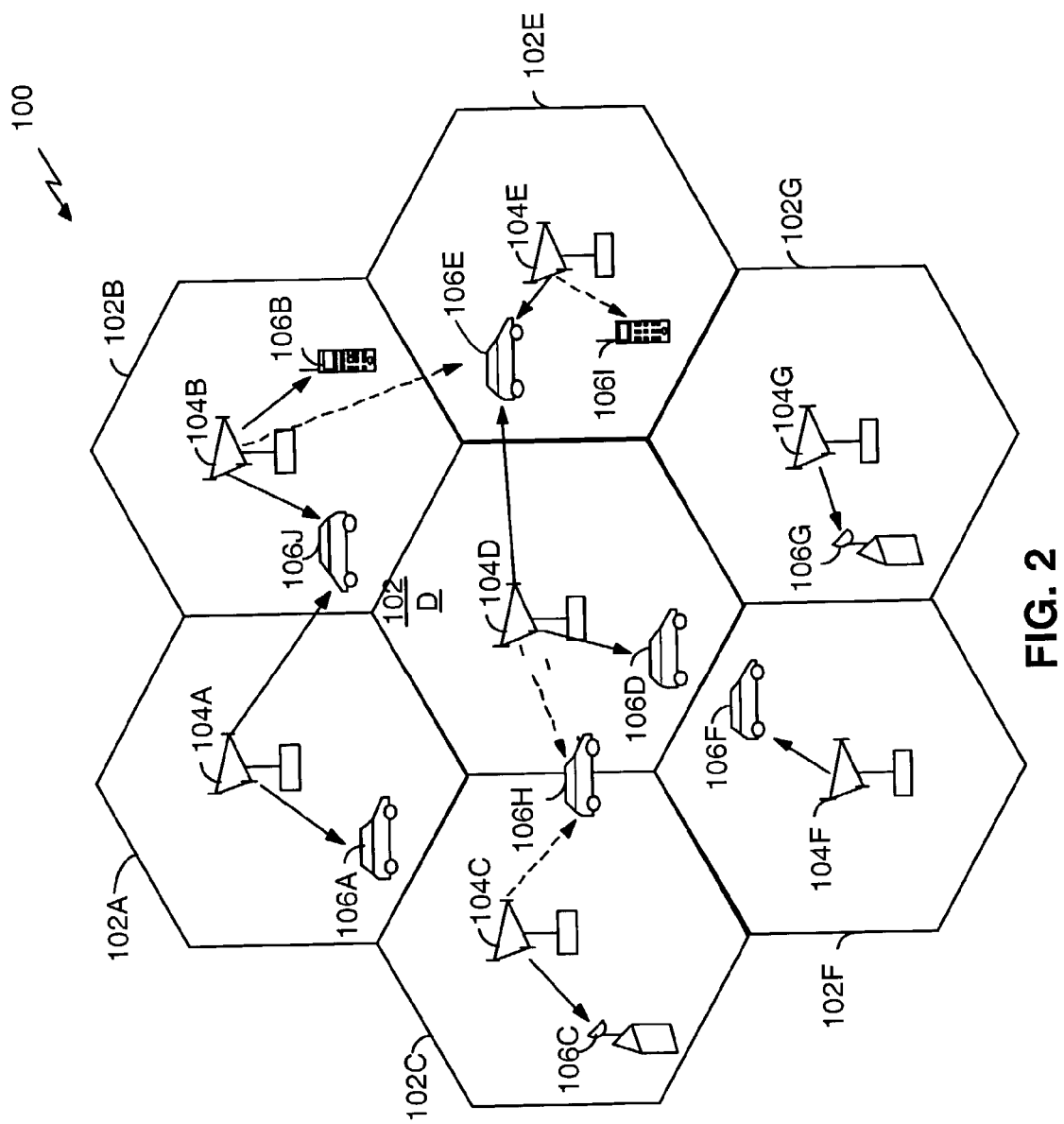
FIG. 2 is a diagram of a spread spectrum communication system that supports a number of users.

FIG. 2 serves as an example of a communications system 100 that supports a number of users and is capable of implementing at least some aspects and embodiments of the invention. Any of a variety of algorithms and methods may be used to schedule transmissions in system 100. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 2, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "METHOD AND SYSTEM FOR PROVIDING A SOFT HANDOFF IN A CDMA CELLULAR TELEPHONE SYSTEM," which is assigned to the assignee of the present invention.

The downlink refers to transmission from the base station to the terminal, and the uplink refers to transmission from the terminal to the base station. In the exemplary embodiment, some of terminals 106 have multiple receive antennas and others have only one receive antenna. In FIG. 2, base station 104A transmits data to terminals 106A and 106J on the downlink, base station 104B transmits data to terminals 106B and 106J, base station 104C transmits data to terminal 106C, and so on.

Increasing demand for wireless data transmission and the expansion of services available via wireless communication technology have led to the development of specific data services. One such service is referred to as High Data Rate (HDR). An exemplary HDR service is proposed in "EIA/TIA-IS856 cdma2000 High Rate Packet Data Air Interface Specification" referred to as "the HDR specification." HDR service is generally an overlay to a voice communication system that provides an efficient method of transmitting packets of data in a wireless communication system. As the amount of data transmitted and the number of transmissions increases, the limited bandwidth available for radio transmissions becomes a critical resource. There is a need, therefore, for an efficient and fair method of scheduling transmissions in a communication system that optimizes use of available bandwidth. In the exemplary embodiment, system 100 illustrated in FIG. 2 is consistent with a CDMA type system having HDR service.

According to one embodiment, the system 100 supports a high-speed multimedia broadcasting service referred to as High-Speed Broadcast Service (HSBS). An example application for HSBS is video streaming of movies, sports events, etc. The HSBS service is a packet data service based on the Internet Protocol (IP). According to the exemplary embodiment, a service provider indicates the availability of such high-speed broadcast service to the users. The users desiring the HSBS service subscribe to receive the service and may discover the broadcast service schedule through advertisements, Short Management System (SMS), Wireless Application Protocol (WAP), etc. Mobile users are referred to as Mobile Stations (MSs). Base Stations (BSs) transmit HSBS related parameters in overhead messages. When an MS desires to receive the broadcast session, the MS reads the overhead messages and learns the appropriate configurations. The MS then tunes to the frequency containing the HSBS channel, and receives the broadcast service content.

The service being considered is a high-speed multimedia broadcasting service. This service is referred to as High-Speed Broadcast Service (HSBS) in this document. One such example is video streaming of movies, sports events, etc. This service will likely be a packet data service based on the Internet Protocol (IP).

The service provider will indicate the availability of such high-speed broadcast service to the users. The mobile station users who desire such service will subscribe to receive this service and may discover the broadcast service schedule through advertisements, SMS, WAP, etc. Base stations will transmit broadcast service related parameters in overhead messages. The mobiles that wish to listen to the broadcast session will read these messages to determine the appropriate configurations, tune to the frequency containing the high-speed broadcast channel, and start receiving the broadcast service content.

There are several possible subscription/revenue models for HSBS service, including free access, controlled access, and partially controlled access. For free access, no subscription is needed by the mobiles to receive the service. The BS broadcasts the content without encryption and interested mobiles can receive the content. The revenue for the service provider can be generated through advertisements that may also be transmitted in the broadcast channel. For example, upcoming movie-clips can be transmitted for which the studios will pay the service provider.

For controlled access, the MS users subscribe to the service and pay the corresponding fee to receive the broadcast service. Unsubscribed users are not able to receive the HSBS service. Controlled access can be achieved by encrypting the HSBS transmission/content so that only the subscribed users can decrypt the content. This may use over-the-air encryption key exchange procedures. This scheme provides strong security and prevents theft-of-service.

A hybrid access scheme, referred to as partial controlled access, provides the HSBS service as a subscription-based service that is encrypted with intermittent unencrypted advertisement transmissions. These advertisements may be intended to encourage subscriptions to the encrypted HSBS service. Schedule of these unencrypted segments could be known to the MS through external means.

Figure 3:
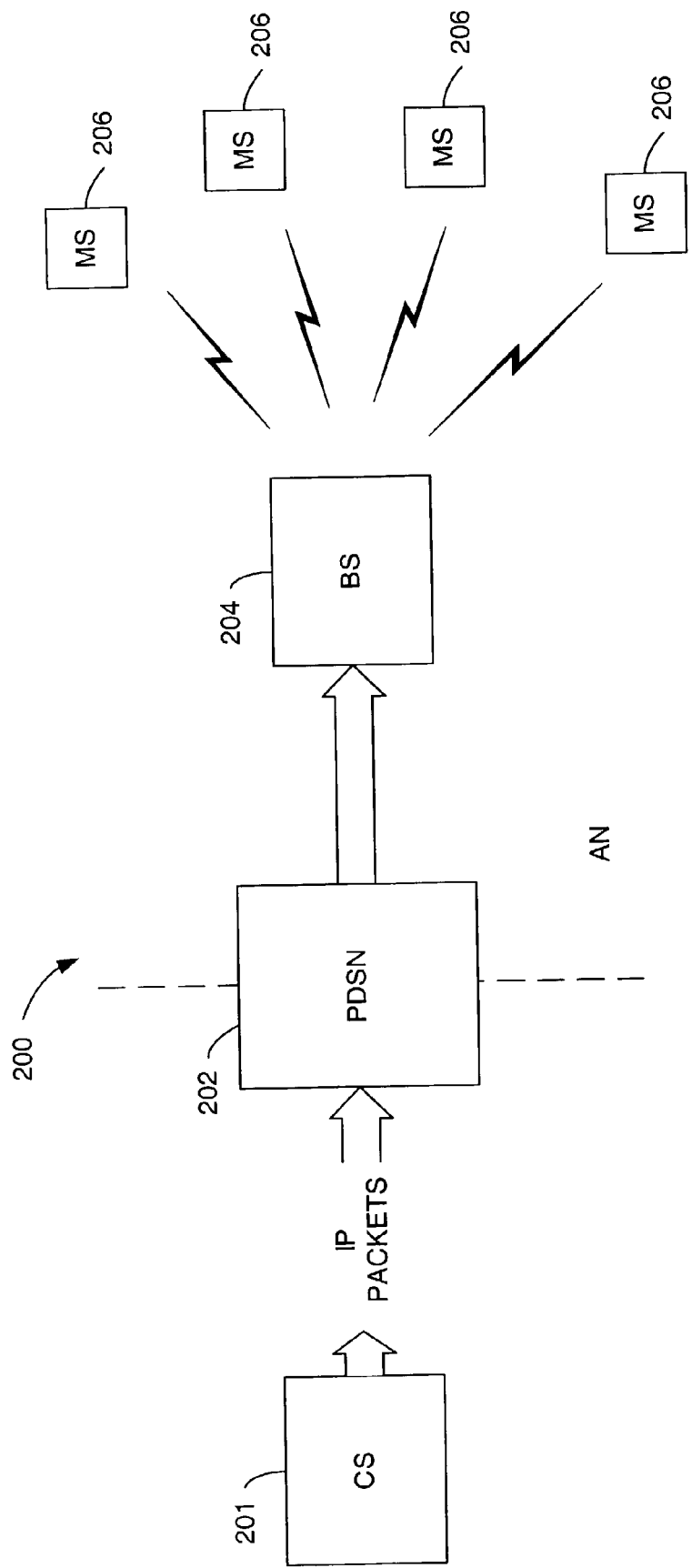
FIG. 3 is a block diagram of the communication system supporting broadcast transmissions.

A wireless communication system 200 is illustrated in FIG. 3, wherein video and audio information is provided to Packetized Data Service Network (PDSN) 202 by a Content Server (CS) 201. The video and audio information may be from televised programming or a radio transmission. The information is provided as packetized data, such as in IP packets. The PDSN 202 processes the IP packets for distribution within an Access Network (AN). As illustrated the AN is defined as the portions of the system including a BS 204 in communication with multiple MS 206. The PDSN 202 is coupled to the BS 204. For HSBS service, the BS 204 receives the stream of information from the PDSN 202 and provides the information on a designated channel to subscribers within the system 200. To control the access, the content is encrypted by the CS 201 before being provided to the PDSN 202. The subscribed users are provided with the decryption key so that the IP packets can be decrypted.

Figure 4:
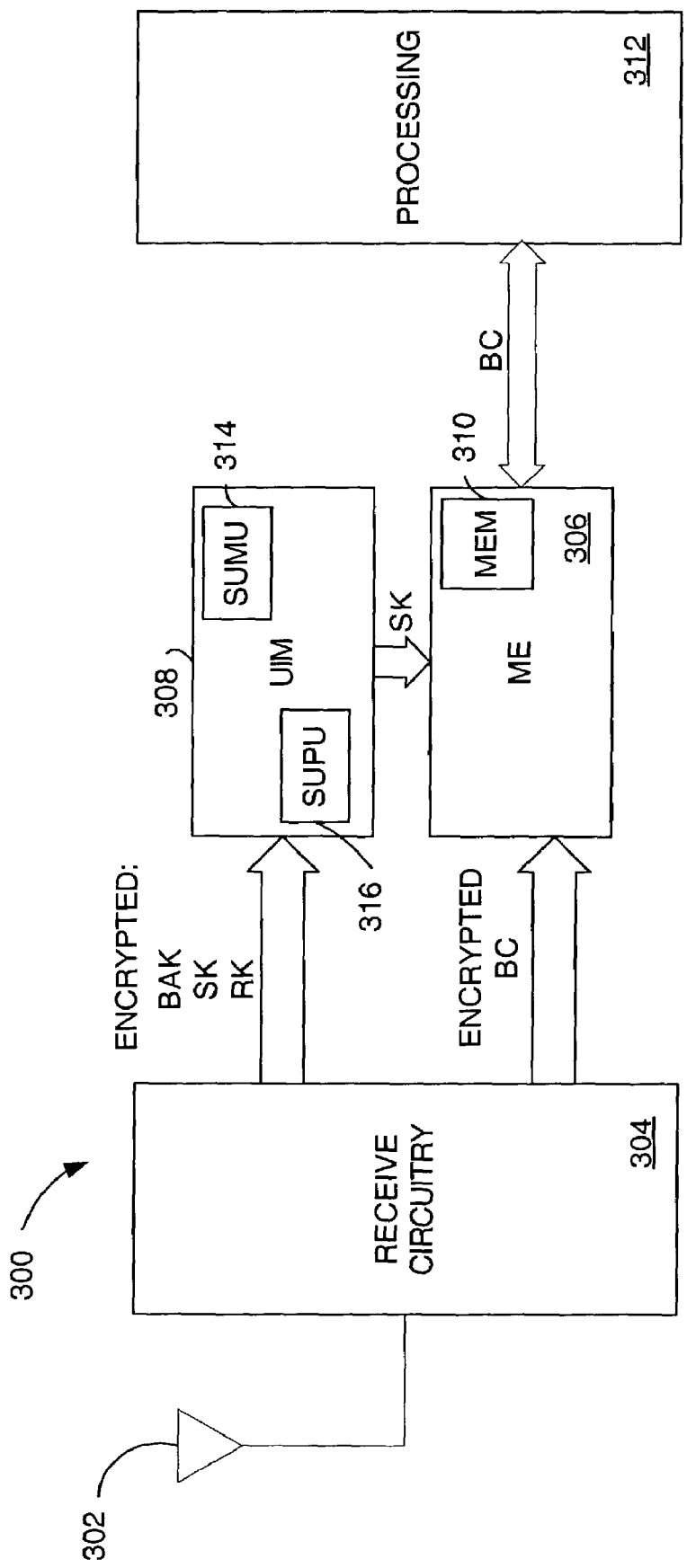
FIG. 4 is a block diagram of a mobile station in a wireless communication system.

FIG. 4 details an MS 300, similar to MS 206 of FIG. 3. The MS 300 has an antenna 302 coupled to receive circuitry 304. The MS 300 receives transmissions from a BS (not shown) similar to BS 204 of FIG. 3. The MS 300 includes a User Identification Module (UIM) 308 and a Mobile Equipment (ME) 306. The receive circuitry is coupled to the UIM 308 and the ME 306. The UIM 308 applies verification procedures for security of the HSBS transmission and provides various keys to the ME 306. The ME 306 may be coupled to processing unit 312. The ME 306 performs substantial processing, including, but not limited to, decryption of HSBS content streams. The ME 306 includes a memory storage unit, MEM 310. In the exemplary embodiment the data in the ME 306 processing (not shown) and the data in the ME memory storage unit, MEM 310 may be accessed easily by a non-subscriber by the use of limited resources, and therefore, the ME 306 is said to be insecure. Any information passed to the ME 306 or processed by the ME 306 remains securely secret for only a short amount of time. It is therefore desired that any secret information, such as key(s), shared with the ME 306 be changed often.

The UIM 308 is trusted to store and process secret information (such as encryption keys) that should remain secret for a long time. As the UIM 308 is a secure unit, the secrets stored therein do not necessarily require the system to change the secret information often. The UIM 308 includes a processing unit referred to as a Secure UIM Processing Unit (SUPU) 316 and memory storage unit referred to as a Secure UIM Memory Unit (SUMU) 314 that is trusted to be secure. Within the UIM 308, SUMU 314 stores secret information in such a way that as to discourage unauthorized access to the information. If the secret information is obtained from the UIM 308, the access will require a significantly large amount of resources. Also within the UIM 308, the SUPU 316 performs computations on values that may be external to the UIM 308 and/or internal to the UIM 308. The results of the computation may be stored in the SUMU 314 or passed to the ME 306. The computations performed with the SUPU 316 can only be obtained from the UIM 308 by an entity with significantly large amount of resources. Similarly, outputs from the SUPU 316 that are designated to be stored within the SUMU 314 (but not output to the ME 306) are designed such that unauthorized interception requires significantly large amount of resources. In one embodiment, the UIM 308 is a stationary unit within the MS 300. Note that in addition to the secure memory and processing within the UIM 308, the UIM 308 may also include non-secure memory and processing (not shown) for storing information including telephone numbers, e-mail address information, web page or URL address information, and/or scheduling functions, etc.

Alternate embodiments may provide a removable and/or reprogrammable UIM. In the exemplary embodiment, the SUPU 316 does not have significant processing power for functions beyond security and key procedures, such as to allow encryption of the broadcast content of the HSBS. Alternate embodiments may implement a UIM having stronger processing power.

The UIM is associated with a particular user and is used primarily to verify that the MS 300 is entitled to the privileges afforded the user, such as access to the mobile phone network. Therefore, a user is associated with the UIM 308 rather than an MS 300. The same user may be associated with multiple UIM 308.

The broadcast service faces a problem in determining how to distribute keys to subscribed users. To decrypt the broadcast content at a particular time, the ME must know the current decryption key. To avoid theft-of-service, the decryption key should be changed frequently, for example, every minute. These decryption keys are called Short-term Keys (SK). The SK is used to decrypt the broadcast content for a short-amount of time so the SK can be assumed to have some amount of intrinsic monetary value for a user. For example, this intrinsic monetary value may be a portion of the registration costs. Assume that the cost of a non-subscriber obtaining SK from the memory storage unit, MEM 310, of a subscriber exceeds the intrinsic monetary value of SK. That is, the cost of obtaining SK (illegitimately) exceeds the reward, so there is no benefit. Consequently, there is no need to protect SK in the memory storage unit, MEM 310. However, if a secret key has a lifetime longer than that of an SK, then the cost of obtaining this secret key (illegitimately) is less than the reward. In this situation, there is a benefit in obtaining such a key from the memory storage unit, MEM 310. Hence, ideally the memory storage unit, MEM 310 will not store secrets with a lifetime longer than that of an SK.

The channels used by the CS (not shown) to distribute the SK to the various subscriber units are considered insecure. Therefore, when distributing a given SK, the CS desires to use a technique that hides the value of the SK from non-subscribed users. Furthermore, the CS distributes the SK to each of a potentially large number of subscribers for processing in respective MEs within a relatively short time-frame. Known secure methods of key transmission are slow and require transmission of a large number of keys, and are generally not feasible for the desired criteria. The exemplary embodiment is a feasible method of distributing decryption keys to a large set of subscribers within a small time-frame in such a way that non-subscribers cannot obtain the decryption keys.

In the exemplary embodiment, the MS 300 supports HSBS in a wireless communication system. To obtain access to HSBS, the user must register and then subscribe to the service. Once the subscription is enabled, the various keys are updated periodically. In the registration process the CS and UIM 308 agree on a Registration Key (RK) that serves as a security association between the user and the CS. The CS may then send the UIM further secret information encrypted with the RK. The RK is kept as a secret in the UIM 308, and is unique to a given UIM, i.e., each user is assigned a different RK. The registration process alone does not give the user access to HSBS. As stated hereinabove, after registration the user subscribes to the service. In the subscription process the CS sends the UIM 308 the value of a common Broadcast Access Key (BAK). The CS sends the MS 300, and specifically UIM 308, the value of BAK encrypted using the RK unique to UIM 308. The UIM 308 is able to recover the value of the original BAK from the encrypted version using the RK. The BAK serves as a security association between the CS and the group of subscribed users. The CS then broadcasts data called SK Information (SKI) that is combined with the BAK in the UIM 308 to derive SK. The UIM 308 then passes SK to the ME 306. In this way, the CS can efficiently distribute new values of SK to the ME of subscribed users.

The following paragraphs discuss the registration process in more detail. When a user registers with a given CS, the UIM 308 and the CS (not shown) set-up a security association. That is, the UIM 308 and the CS agree on a secret key RK. The RK is unique to each UIM 308, although if a user has multiple UIMs then these UIMs may share the same RK dependent on the policies of the CS. This registration may occur when the user subscribes to a broadcast channel offered by the CS or may occur prior to subscription. A single CS may offer multiple broadcast channels. The CS may choose to associate the user with the same RK for all channels or require the user to register for each channel and associate the same user with different RKs on different channels. Multiple CSs may choose to use the same registration keys or require the user to register and obtain a different RK for each CS.

Two common scenarios for setting up this security association include the Authenticated Key Agreement (AKA) method (as used in 3GPP) and the Internet Key Exchange (IKE) method as used in IPsec. In either case the UIM memory unit SUMU 314 contains a secret key referred to as the A-key. As an example, the AKA method is described. In the AKA method the A-key is a secret known only to the UIM and a trusted third party (TTP): the TTP may consist of more than one entity. The TTP is typically the mobile service provider with whom the user is registered. All communication between the CS and TTP is secure, and the CS trusts that the TTP will not assist unauthorized access to the broadcast service. When the user registers, the CS informs the TTP that the user wishes to register for the service and provides verification of the user's request. The TTP uses a function (similar to a cryptographic hash function) to compute the RK from the A-key and additional data called Registration Key Information (RKI). The TTP passes RK, RKI to the CS over a secure channel along with other data not relevant to this submission. The CS sends RKI to the MS 300. The receiver circuitry 304 passes RKI to the UIM 308 and possibly passes RKI to the ME 306. The UIM 308 computes RK from RKI and the A-key that is stored in the UIM memory unit SUMU 314. The RK is stored in the UIM memory unit SUMU 314 and is not provided directly to the ME 306. Alternate embodiments may use an IKE scenario or some other method to establish the RK. The RK serves as the security association between the CS and UIM 308.

In the AKA method, the RK is a secret shared between the CS, UIM and TTP. Therefore, as used herein, the AKA method implies that any security association between the CS and UIM implicitly includes the TTP. The inclusion of the TTP in any security association is not considered a breach of security, as the CS trusts the TTP not to assist in unauthorized access to the broadcast channel. As stated hereinabove, if a key is shared with the ME 306, it is desirable to change that key often. This is due to the risk of a non-subscriber accessing information stored in memory storage unit, MEM 310 and thus allowing access to a controlled or partially controlled service. The ME 306 stores SK (key information used for decrypting broadcast content) in memory storage unit, MEM 310. The CS must send sufficient information for subscribed users to compute SK. If the ME 306 of a subscribed user could compute SK from this information, then additional information required to compute SK cannot be secret. In this case, assume that the ME 306 of a non-subscribed user could also compute SK from this information. Hence, the value of SK must be computed in the SUPU 316, using a secret key shared by the CS and SUMU 314. The CS and SUMU 314 share the value of RK, however each user has a unique value of RK. There is insufficient time for the CS to encrypt SK with every value of RK and transmit these encrypted values to each subscribed user. Some other technique is required.

The following paragraphs discuss the subscription process in more detail. To ensure the efficient distribution of the security information SK, the CS periodically distributes a common Broadcast Access Key (BAK) to each subscriber UIM 308. For each subscriber the CS encrypts BAK using the corresponding RK to obtain a value called BAKI (BAK Information). The CS sends the corresponding BAKI to MS 300 of the subscribed user. For example, BAK may be transmitted as an IP packet encrypted using the RK corresponding to each MS. In the exemplary embodiment, the BAKI is an IPSec packet. In the exemplary embodiment, BAKI is an IPSec packet containing BAK that is encrypted using RK as the key. Since RK is a per-user key, the CS must send the BAK to each subscriber individually; thus, the BAK is not sent over the broadcast channel. The MS 300 passes the BAKI to the UIM 308. The SUPU 316 computes BAK using the value of RK stored in SUMU 314 and the value of BAKI. The value of BAK is then stored in the SUMU. In the exemplary embodiment, the BAKI contains a Security Parameter Index (SPI) value instructing the MS 300 to pass BAKI to the UIM 308, and instructing the UIM 308 to use the RK for decrypting the BAKI.

The period for updating the BAK is desired to be sufficient to allow the CS to send the BAK to each subscriber individually, without incurring significant overhead. Since the ME 306 is not trusted to keep secrets for a long time, the UIM 308 does not provide the BAK to the ME 306. The BAK serves as the security association between the CS and the group of subscribers of HSBS service.

The following paragraph discusses how the SK is updated following a successful subscription process. Within each period for updating the BAK, a short-term interval is provided during which SK is distributed on a broadcast channel. The CS uses a cryptographic function to determine two values SK and SKI (SK Information) such that SK can be determined from BAK and SKI. For example, SKI may be the encryption of SK using BAK as the key. In the exemplary embodiment, SKI is an IPSec packet containing SK that is encrypted using BAK as the key. Alternatively, SK may be the result of applying a cryptographic hash function to the concatenation of the blocks SKI and BAK.

Some portion of SKI may be predictable. For example, a portion of SKI may be derived from the system time during which this SKI is valid. This portion, denoted SKI_A, need not be transmitted to the MS 300 as part of the broadcast service. The remainder of SKI, SKI_B may be unpredictable. The SKI_B need not be transmitted to the MS 300 as part of the broadcast service. The MS 300 reconstructs SKI from SKI_A and SKI_B and provides SKI to UIM 308. The SKI may be reconstructed within the UIM 308. The value of SKI must change for each new SK. Thus, either SKI_A and/or SKI_B must change when computing a new SK. The CS sends SKI_B to BS for broadcast transmission. The BS broadcasts SKI_B, which is detected by the antenna 302 and passed to the receive circuitry 304. Receive circuitry 304 provides SKI_B to the MS 300, wherein the MS 300 reconstructs SKI. The MS 300 provides SKI to UIM 308, wherein the UIM 308 obtains the SK using the BAK stored in SUMU 314. The SK is then provided by UIM 308 to ME 306. The ME 306 stores the SK in memory storage unit, MEM 310. The ME 306 uses the SK to decrypt broadcast transmissions received from the CS.

In the exemplary embodiment, the SKI also contains a Security Parameter Index (SPI) value instructing the MS 300 to pass SKI to the UIM 308, and instructing the UIM 308 to use the BAK for decrypting the SKI. After decryption, the UIM 308 passes the SK to the ME 306, wherein ME 306 uses the SK to decrypt broadcast content.

The CS and BS agree on some criteria for when SKI_B is to be transmitted. The CS may desire to reduce the intrinsic monetary value in each SK by changing SK frequently. In this situation, the desire to change SKI_B data is balanced against optimizing available bandwidth. The SKI_B may be transmitted on a channel other than the broadcast channel. When a user "tunes" to the broadcast channel, the receive circuitry 304 obtains information for locating the broadcast channel from a "control channel." It may be desirable to allow quick access when a user "tunes" to the broadcast channel. This requires the ME 306 to obtain SKI within a short amount of time. The ME 306 will already know SKI_A, however, the BS must provide SKI_B to ME 300 within this short amount of time. For example, the BS may frequently transmit SKI_B on the control channel, (along with the information for locating the broadcast channel), or frequently transmit SKI_B on the broadcast channel. The more often that the BS "refreshes" the value of SKI_B, the faster the MS 300 can access the broadcast message. The desire to refresh SKI_B data is balanced against optimizing available bandwidth, as transmitting SKI_B data too frequently may use an unacceptable amount of bandwidth in the control channel or broadcast channel.

This paragraph discusses the encryption and transmission of the broadcast content. The CS encrypts the broadcast content using the current SK. The exemplary embodiment employs an encryption algorithm such as the Advanced Encryption Standard (AES)h Cipher Algorithm. In the exemplary embodiment, the encrypted content is then transported by an IPsec packet according to the Encapsulating Security Payload (ESP) transport mode. The IPsec packet also contains an SPI value that instructs the ME 306 to use the current SK to decrypt received broadcast content. The encrypted content is sent via the broadcast channel.

Receive circuitry 304 provides the RKI and BAKI directly to the UIM 308. Further, receive circuitry 304 provides the SKI_B to an appropriate part of the MS 300 where it is combined with SKI_A to obtain SKI. The SKI is provided to the UIM 308 by the relevant part of the MS 300. The UIM 308 computes RK from the RKI and A-key, decrypts the BAKI using the RK to obtain BAK, and computes the SK using the SKI and BAK, to generate an SK for use by the ME 306. The ME 306 decrypts the broadcast content using the SK. The UIM 308 of the exemplary embodiment is not sufficiently powerful for decryption of broadcast content in real time, and, therefore, SK is passed to the ME 306 for decrypting the broadcast content.

Figure 5:
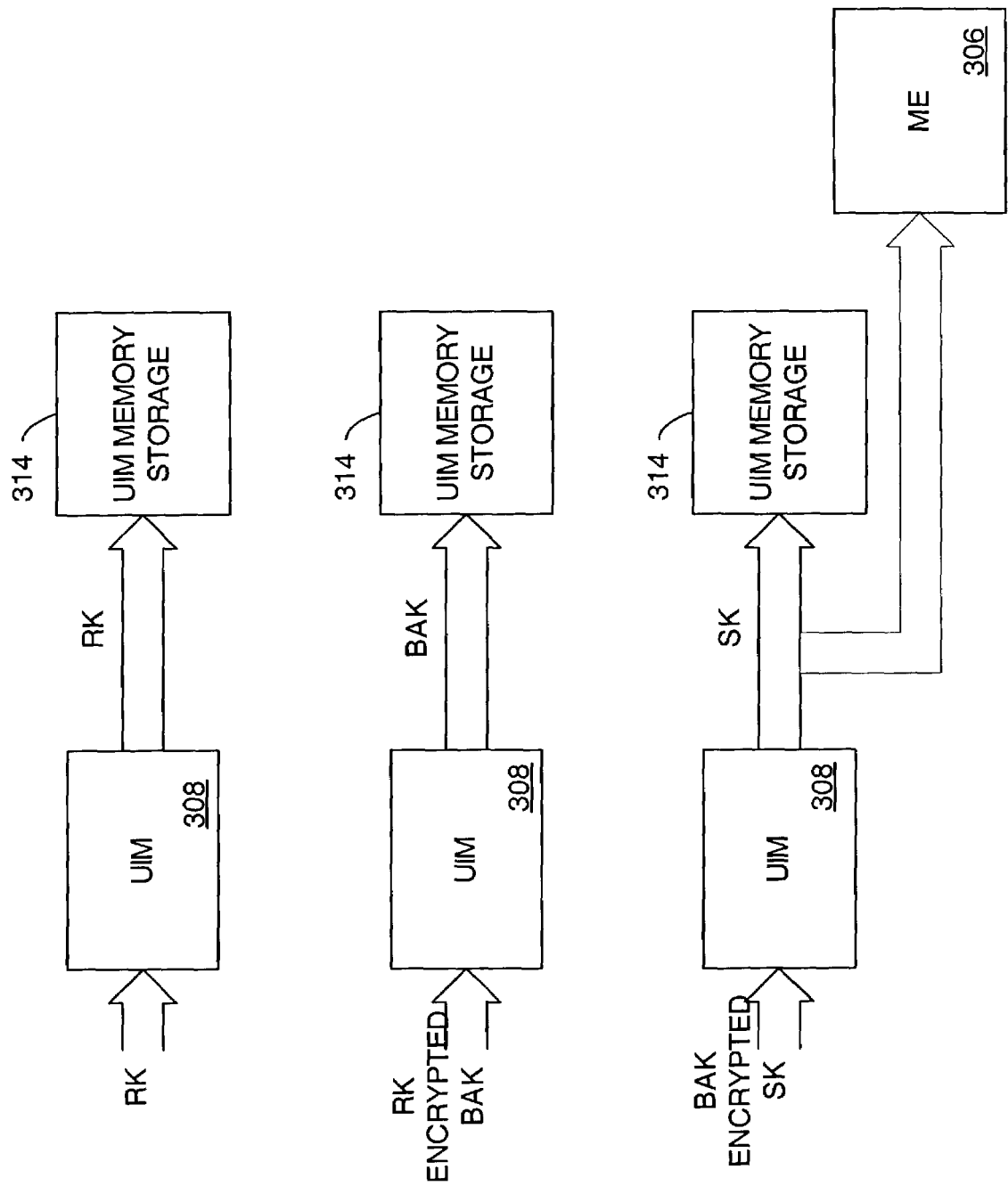
FIG. 5 is a model describing the updating of keys within a mobile station used for controlling broadcast access.

FIG. 5 illustrates the transmission and processing of keys RK, BAK and SK according to the exemplary embodiment. As illustrated, at registration the MS 300 receives the RKI and passes it to UIM 308, wherein the SUPU 316 computes RK using RKI and the A-key, and stores the RK in UIM memory storage SUMU 314. The MS 300 periodically receives the BAKI that contains BAK encrypted using the RK value specific to UIM 308. The encrypted BAKI is decrypted by SUPU 316 to recover the BAK, which is stored in UIM memory storage SUMU 314. The MS 300 further periodically receives an SKI_B that it combines with SKI_A to form SKI. The SUPU 316 computes SK from SKI and BAK. The SK is provided to ME 306 for decrypting broadcast content.

In the exemplary embodiment the CS keys are not necessarily encrypted and transmitted to the MSs; the CS may use an alternative method. The key information generated by the CS for transmission to each MS provides sufficient information for the MS to calculate the key. As illustrated in the system 350 of FIG. 6, the RK is generated by the CS, but RK Information (RKI) is transmitted to the MS. The CS sends information sufficient for the UIM to derive the RK, wherein a predetermined function is used to derive the RK from transmitted information from the CS. The RKI contains sufficient information for the MS to determine the original RK from the A_key and other values, such as system time, using a predetermined public function labeled d1, wherein:

$$RK=d1(A\text{-key}, RKI). \quad (3)$$

In the exemplary embodiment, the function d1 defines a cryptographic-type function. According to one embodiment, RK is determined as:

$$RK=SHA'(A\text{-key}\|RKI), \quad (4)$$

wherein "$\|$" denotes the concatenation of the blocks containing A-key and RKI, and SHA'(X) denotes the last 128-bits of output of the Secure Hash Algorithm SHA-1 given the input X. In an alternative embodiment, RK is determined as:

$$RK=AES(A\text{-key},RKI), \quad (5)$$

wherein AES(X,Y) denotes the encryption of the 128-bit block RKI using the 128-bit A-key. In a further embodiment based on the AKA protocol, RK is determined as the output of the 3GPP key generation function f3, wherein RKI includes the value of RAND and appropriate values of AMF and SQN as defined by the standard.

The BAK is treated in a different manner because multiple users having different values of RK must compute the same value of BAK. The CS may use any technique to determine BAK. However, the value of BAKI associated with a particular UIM 308 must be the encryption of BAK under the unique RK associated with that UIM 308. The SUPU 316 decrypts BAKI using RK stored in the SUMU 314 according to the function labeled d2, according to:

$$BAK=d2(BAKI, RK). \quad (9)$$

In an alternate embodiment, the CS may compute BAKI by applying a decryption process to BAK using RK, and the SUPU 316 obtains BAK by applying the encryption process to BAKI using RK. This is considered equivalent to the CS encrypting BAK and the SUPU 316 decrypting BAKI. Alternate embodiments may implement any number of key combinations in addition to or in place of those illustrated in FIG. 6.

The SK is treated in a similar manner to RK. First SKI is derived from the SKI_A and SKI_B (SKI_B is the information transmitted from CS to MS). Then a predetermined function labeled d3 is used to derive the SK from SKI and BAK (stored in the SUMU 314), according to:

$$SK=d3(BAK, SKI). \quad (6)$$

In one embodiment, the function d3 defines a cryptographic-type function. In an exemplary embodiment, SK is computed as:

$$SK=SHA(BAK\|SKI), \quad (7)$$

while in another embodiment, SK is computed as $$SK=AES(BAK, SKI). \quad (8)$$

Figure 7B:
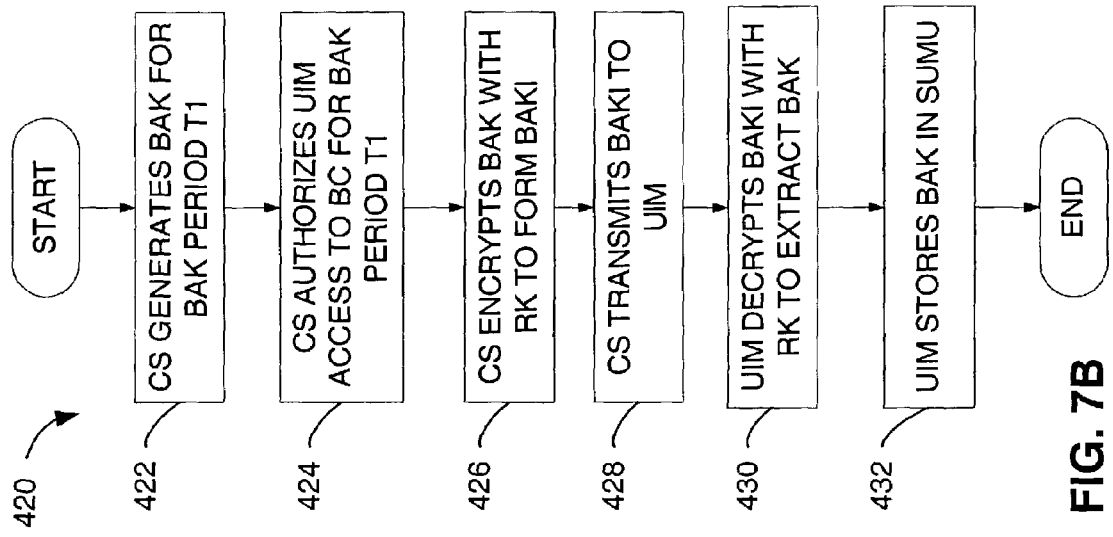
FIGS. 7A–7D illustrate a method of implementing security encryption in a wireless communication system supporting broadcast transmissions.
Figure 7A:
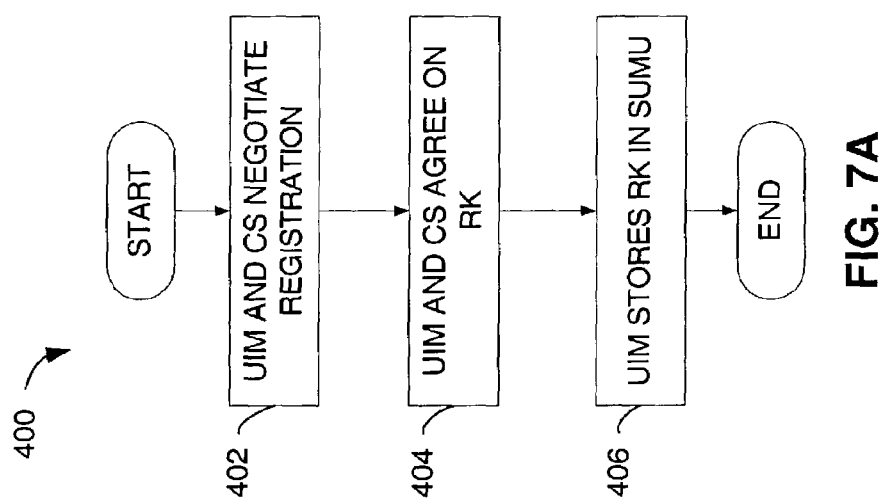

A method of providing the security for a broadcast message is illustrated in FIGS. 7A–7D. FIG. 7A illustrates a registration process 400 wherein a subscriber negotiates registration with the CS at step 402. The registration at step 404 provides the UIM a unique RK. The UIM stores the RK in a Secure Memory Unit (SUMU) at step 406. FIG. 7B illustrates subscription processing 420 between a CS and a MS. At step 422 the CS generates a BAK for a BAK time period T1. The BAK is valid throughout the BAK time period T1, wherein the BAK is periodically updated. At step 424 the CS authorizes the UIM to have access to the Broadcast Content (BC) during the BAK timer period T1. At step 426 the CS encrypts the BAK using each individual RK for each subscriber. The encrypted BAK is referred to as the BAKI. The CS then transmits the BAKI to the UIM at step 428. The UIM receives the BAKI and performs decryption using the RK at step 430. The decrypted BAKI results in the originally generated BAK. The UIM stores the BAK n a SUMU at step 432. The UIM then receives the broadcast session and is able to access the BC by applying the BAK to decryption of the encrypted broadcast (EBC).

Figure 7D:
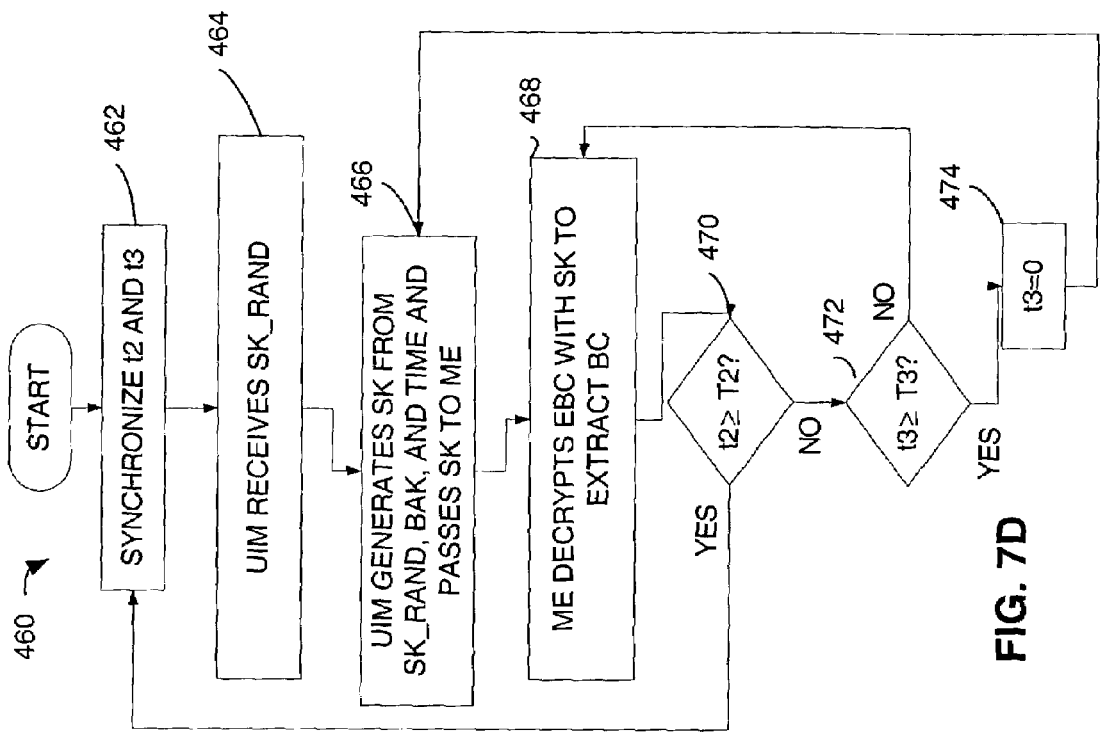
Figure 7C:
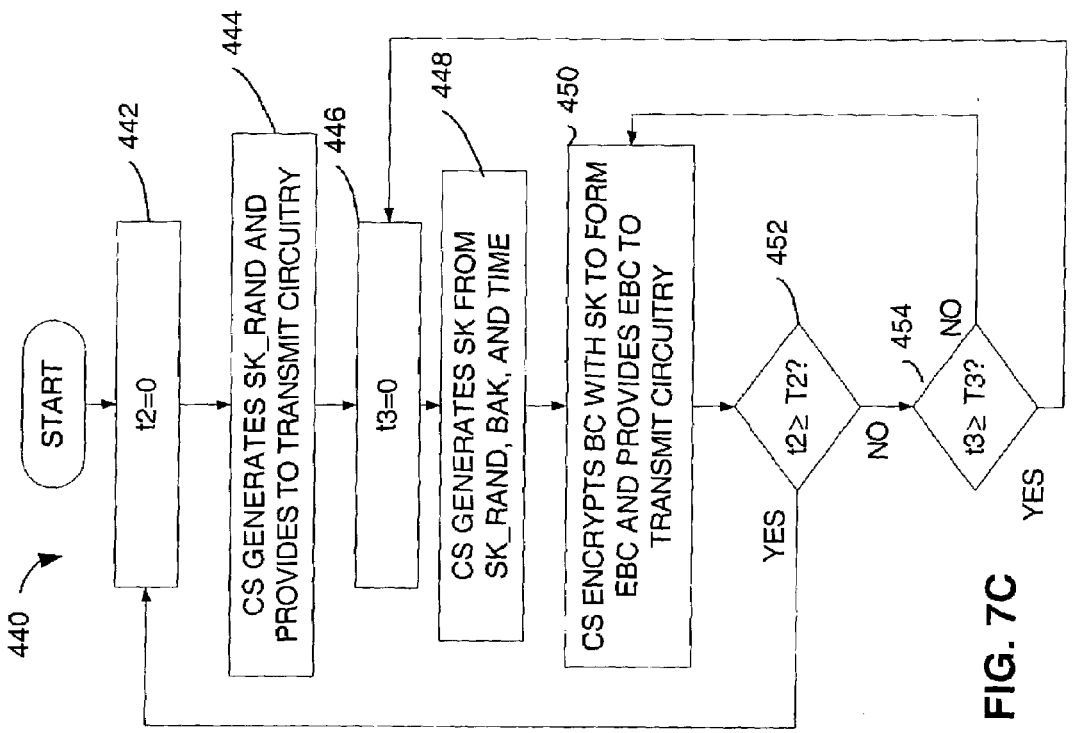
Figure 7E:
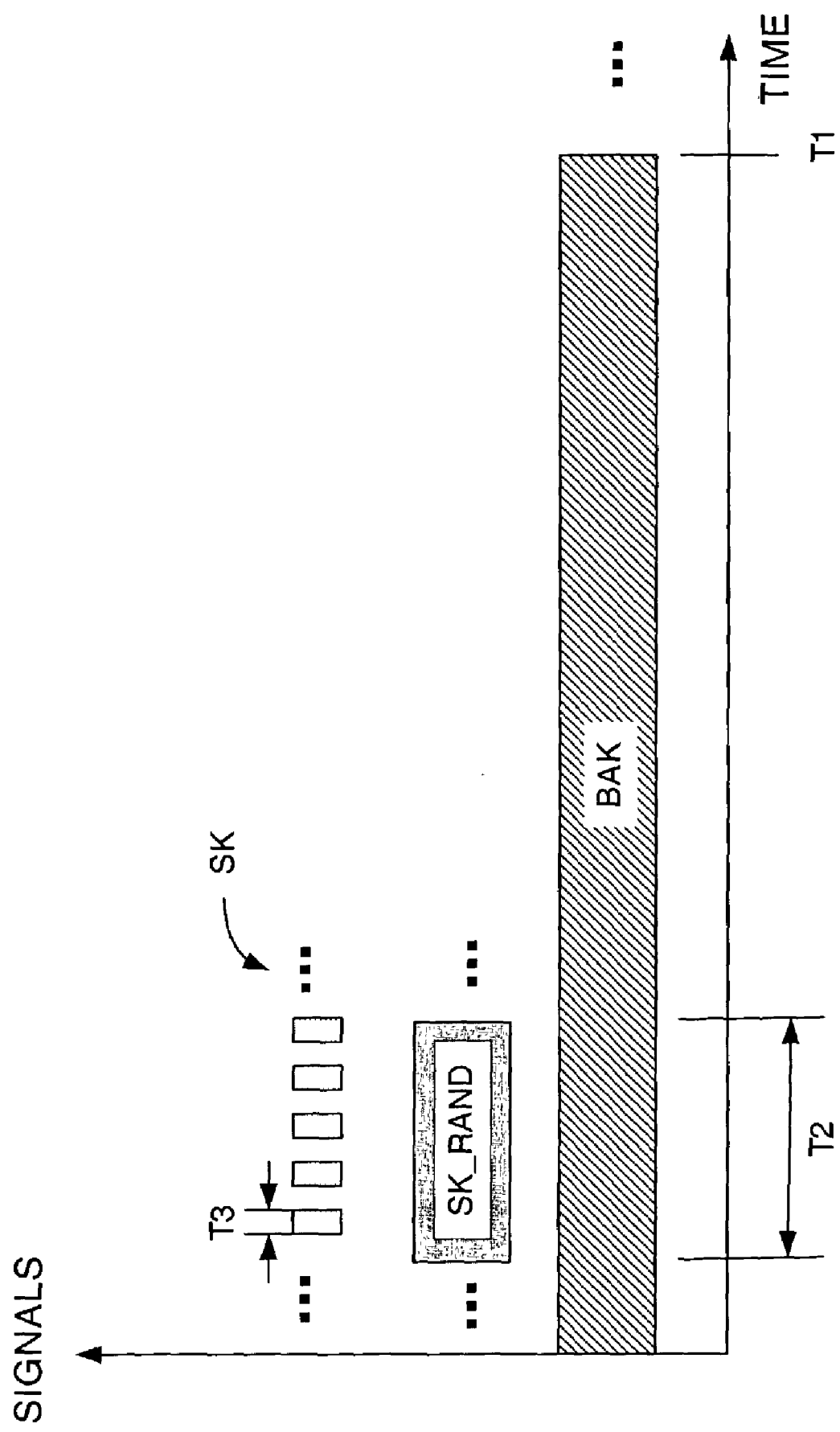
FIG. 7E is a timing diagram of key update periods of a security option in a wireless communication system supporting broadcast transmissions.

FIG. 7C illustrates a method of updating keys for security encryption in a wireless communication system supporting broadcast service. The method 440 implements time periods as given in FIG. 7E. The BAK is updated periodically having a time period T1. A timer t1 is initiated when BAK is calculated and times out at T1. A variable is used for calculating the SK referred to as SK_RAND, which is updated periodically having a time period T2. A timer t2 is initiated when the SK_RAND is generated and times out at T2. In one embodiment, the SK is further updated periodically having a period of T3. A timer t3 is initiated when each SK is generated and time out at time T3. The SK_RAND is generated at the CS and provided periodically to the MS. The MS and the CS use SK_RAND to generate the SK, as detailed hereinbelow.

A first timer t1 is reset when the applicable value of BAK is updated. The length of time between two BAK updates is the BAK update period. In the exemplary embodiment the BAK update period is a month, however, alternate embodiments may implement any time period desired for optimum operation of the system, or to satisfy a variety of system criteria.

Continuing with FIG. 7C, the method 440 initializes the timer t2 at step 442 to start the SK_REG time period T2. The CS generates SK_RAND and provides the value to transmit circuitry for transmission throughout the system at step 444. The timer t3 is initialized at step 446 to start the SK time period T3. The CS then encrypts the BC using the current SK at step 448. The encrypted product is the EBC, wherein the CS provides the EBC to transmit circuitry for transmission in the system. If the timer t2 has expired at decision diamond 450, processing returns to step 442. While t2 is less than T2, if the timer t3 has expired at decision diamond 452, processing returns to step 446; else processing returns to 450.

FIG. 7D illustrates the operation of the MS accessing a broadcast service. The method 460 first synchronizes the timers t2 and t3 with the values at the CS at step 462. The UIM of the MS receives the SK_RAND generated by the CS at step 464. At step 466 the UIM generates the SK using the SK_RAND, BAK, and a time measurement. The UIM passes the SK to the ME of the MS. The UIM then decrypts the received EBC using the SK to extract the original BC at step 468. When the timer t2 expires at step 470 processing returns to step 462. While the timer t2 is less than T2, if the timer t3 expires at step 472, the timer t3 is initialized at step 474 and returns to 466.

When the user subscribes to the broadcast service for a particular BAK update period, the CS sends the appropriate information BAKI (corresponding to the BAK encrypted with the RK). This typically occurs prior to the beginning of this BAK update period or when the MS first tunes to the broadcast channel during this BAK update period. This may be initiated by the MS or CS according to a variety of criteria. Multiple BAKI may be transmitted and decrypted simultaneously.

Note that when expiration of the BAK update period is imminent, the MS may request the updated BAK from the CS if the MS has subscribed for the next BAK update period. In an alternate embodiment the first timer t1 is used by the CS, where upon expiration of the timer, i.e., satisfaction of the BAK update period, the CS transmits the BAK.

Note that it is possible for a user to receive a BAK during a BAK update period, wherein, for example, a subscriber joins the service mid-month when the BAK updates are performed monthly. Additionally, the time periods for BAK and SK updates may be synchronized, such that all subscribers are updated at a given time.

Figure 8A:
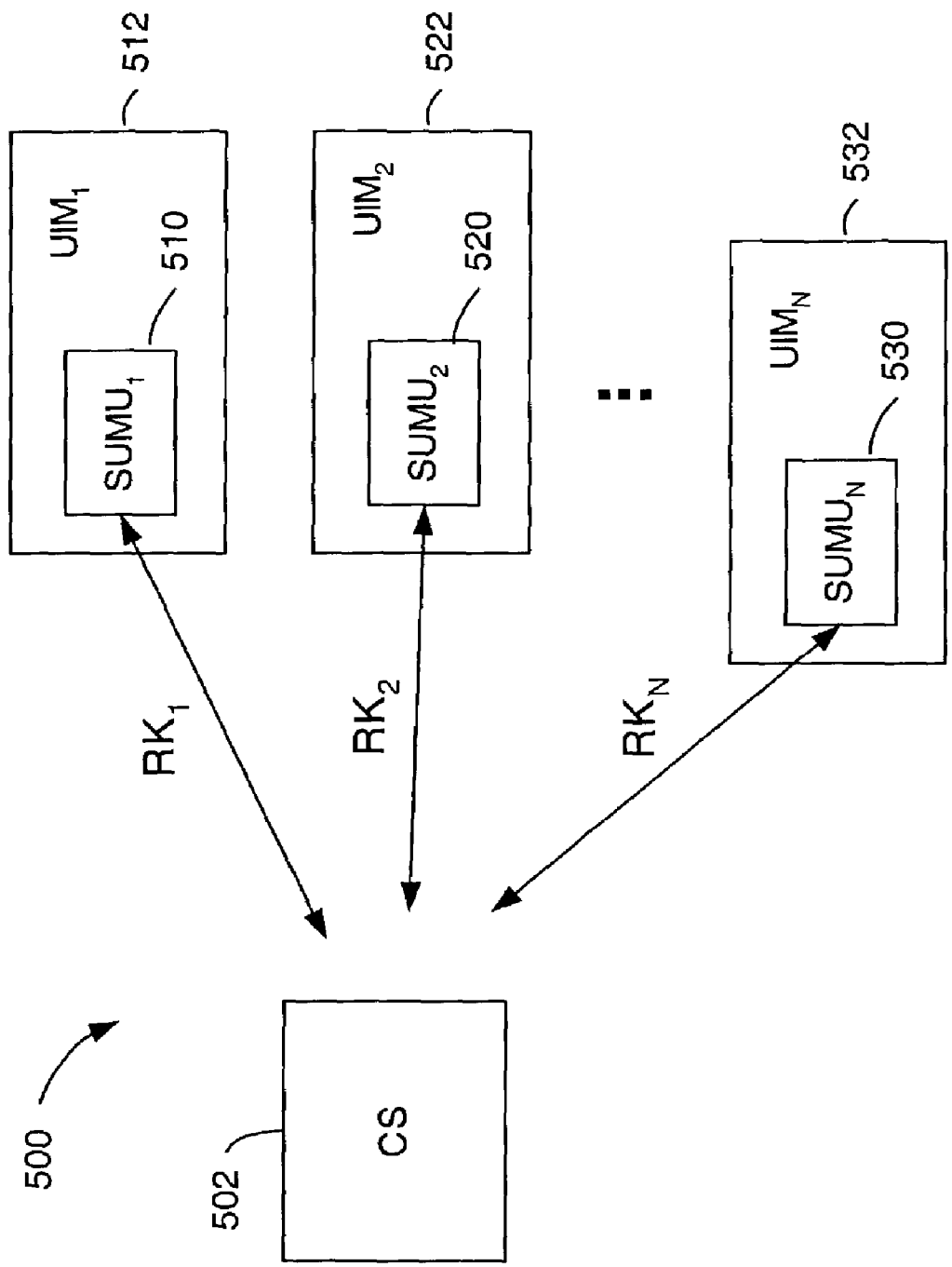
FIGS. 8A–8D illustrate application of a security encryption method in a wireless communication system supporting broadcast transmissions.

FIG. 8A illustrates the registration process in a wireless communication system 500 according to the exemplary embodiment. The CS 502 negotiates with each subscriber, i.e., MS 512, to generate a specific RK to each of the subscribers. The RK is provided to the SUMU unit within the UIM of each MS. As illustrated, the CS 502 generates $RK_1$ which is stored in $SUMU_1$ 510 within $UIM_1$ 512. Similarly, the CS 502 generates $RK_2$ and $RK_N$ which are stored in $SUMU_2$ 520 within $UIM_2$ 522 and $SUMU_N$ 530 within $UIM_N$ 532, respectively.

Figure 8B:
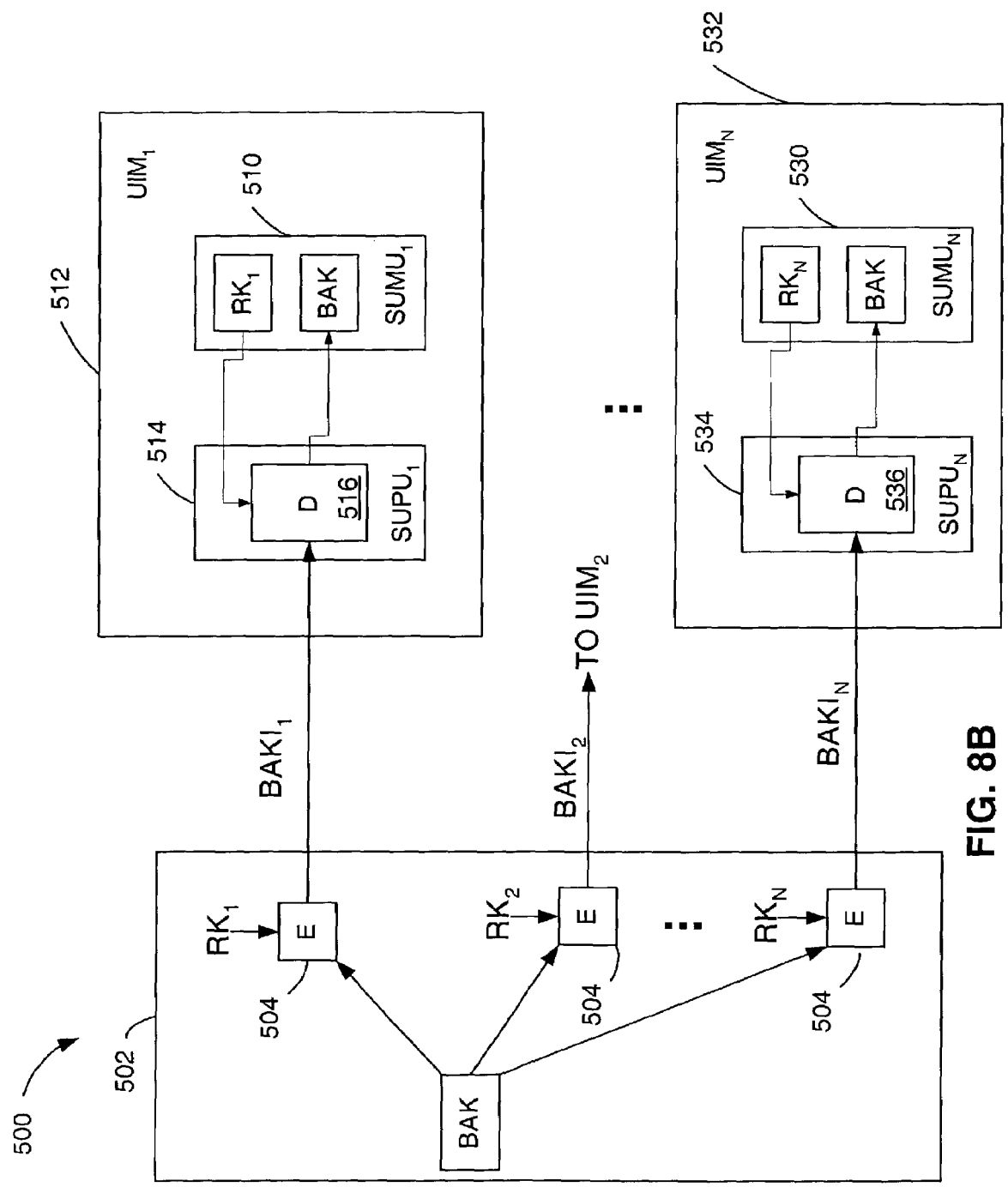

FIG. 8B illustrates the subscription process in the system 500. The CS 502 further includes multiple encoders 504. Each of the encoders 504 receives one of the unique RKs and the BAK value generated in the CS 502. The output of each encoder 504 is a BAKI encoded specifically for a subscriber. The BAKI is received at the UIM of each MS, such as $UIM_1$ 512. Each UIM includes a SUPU and a SUMU, such as $SUPU_1$ 514 and $SUMU_1$ 510 of $UIM_1$ 512. The SUPU includes a decoder, such as decoder 516 that recovers the BAK by application of the RK of the UIM. The process is repeated at each subscriber.

Figure 8C:
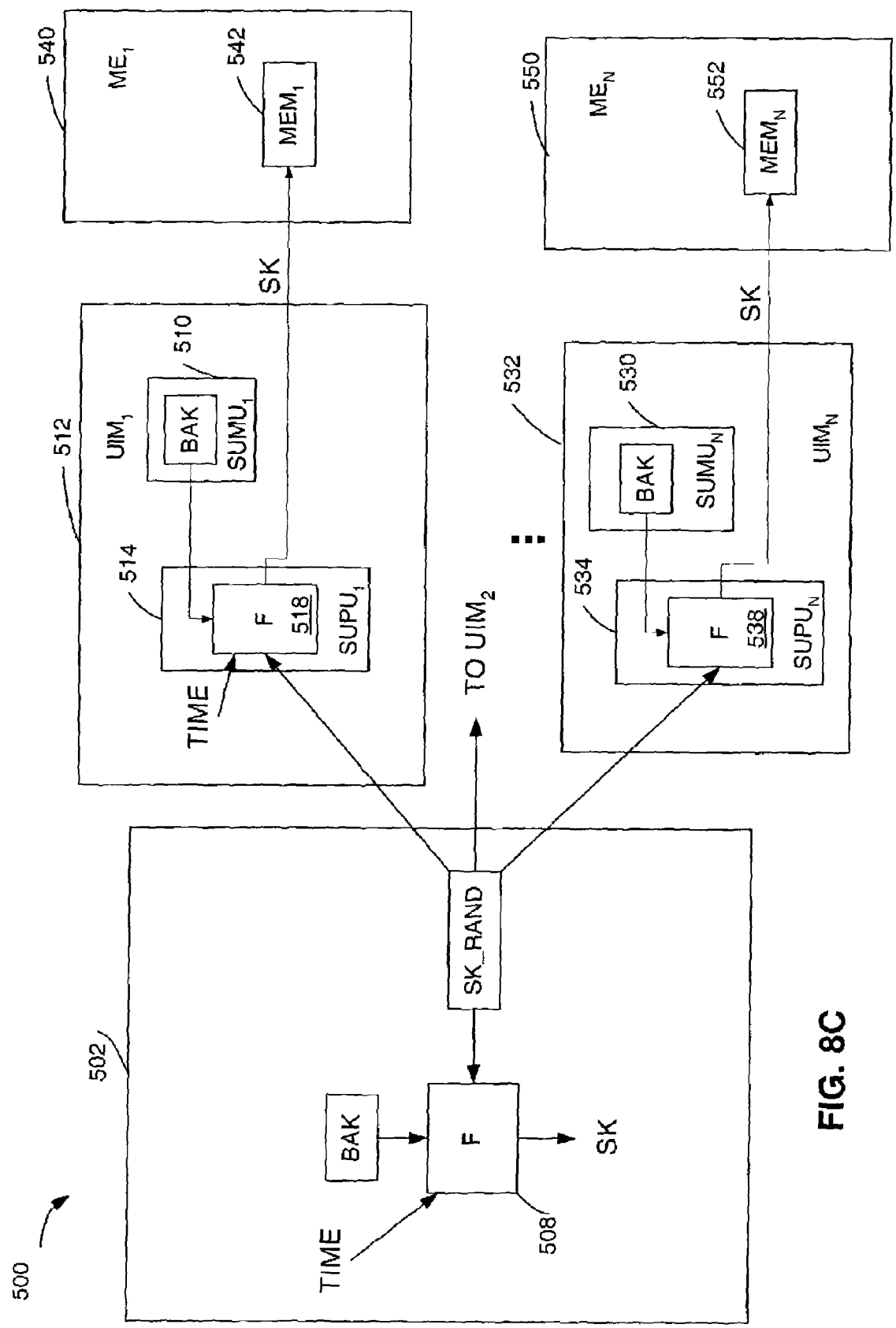

Key management and updates are illustrated in FIG. 8C, wherein the CS applies a function 508 to generate a value of SK_RAND, which is an interim value used by the CS and MS to calculate SK. Specifically, the function 508 applies the BAK value, the SK_RAND and a time factor. While the embodiment illustrated in FIG. 8C applies a timer to determine when to update the SK, alternate embodiments may use alternate measures to provide periodic updates, for example occurrence of an error or other event. The CS provides the SK_RAND value to each of the subscribers, wherein a function 518 resident in each UIM applies the same function as in function 508 of the CS. The function 518 operates on the SK_RAND, BAK and a timer value to generate a SK that is stored in a memory location in the ME, such as $MEM_1$ 542 of $ME_1$ 540.

Figure 8D:
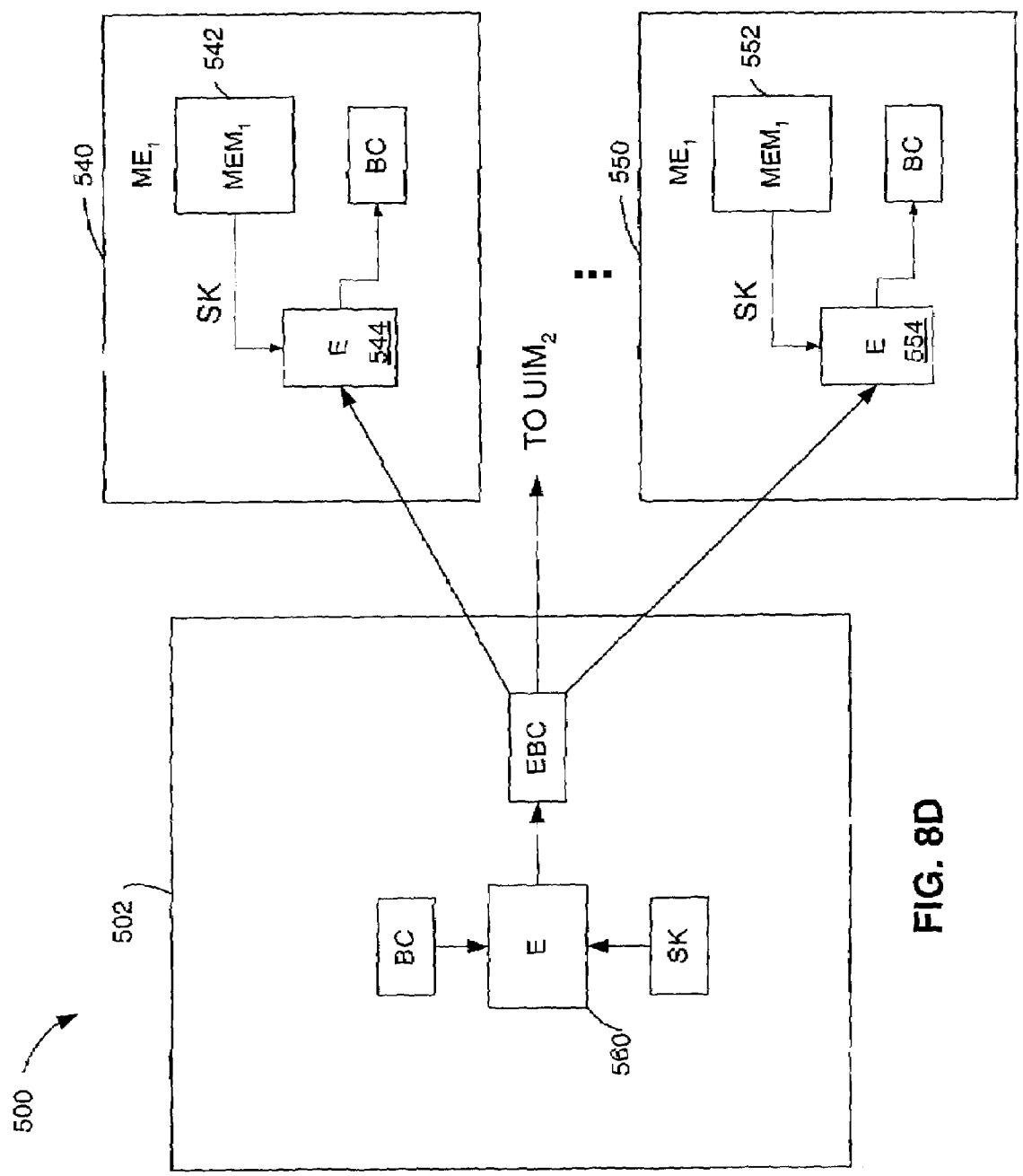

FIG. 8D illustrates the processing of BC after registration and subscription. The CS 502 includes an encoder 560 that encodes the BC using the current SK to generate the EBC. The EBC is then transmitted to the subscribers. Each MS includes an encoder, such as encoder 544, that extracts the BC from the EBC using the SK.

While the present invention has been described with respect to an exemplary embodiment of a wireless communication system supporting a uni-directional broadcast service, the encryption methods and key management described hereinabove is further applicable to other data processing systems, including a multi-cast type broadcast system. Still further, application of the present invention to any data processing system wherein multiple subscribers access a single transmission of secure information through an insecure channel.

Note that a user may subscribe to a first entity that is different from the current Content Server (CS), content provider, and/or content source for the current broadcast or transmission. As an example consider a user that is roaming into a different geographical area. The user is a subscriber to a central news broadcast entity, such as CNN. An affiliate of the central news broadcast entity, such as CNN Asia may be generated locally. In this situation, when a subscriber to the central news broadcast entity, e.g., CNN, roams into a geographical areas of a locally generated broadcast entity, e.g., CNN Asia, authorization may require the locally generated broadcast entity to check the central broadcast entity's subscription database.

Each broadcast entity may have a separate Subscription Server (SS), which complicates authentication, as each of SS needs to negotiate with another SS in the roaming situation. Similarly, the use of separate SSs may incur complications of key distributions. Each of the SS may be owned by a local CS or may have a business arrangement with the local CS.

Various alternate embodiments are described herein that avoid some of the authorization problems associated with roaming, etc. The following definitions for logical entities are provided for clarity in understanding such embodiments. The home system or network, referred to as the HLR or the HLR/AC holds the mobile user's subscription. In other words, home refers to the system where the normal telephone subscription is located. The visited system or network, referred to as the VLR, such as MSC/VLR, is then a system entered by roaming, etc. When a user is not roaming, the VLR system is the same as the HLR system. A Content Server (CS) is referred to as local/visited when that CS provides content to the visited network. The CS includes a content source and a Broadcast Access Key (BAK) generator. A BAK encryptor encrypts the BAK for provision into a UIM. A BAK encryptor may be associated only with one CS or may serve multiple CSs. A Subscription Server (SS) holds subscription data authorizing a user to at least one BroadCast MultiCast Service (BCMCS). The SS may be owned by a local CS or may be part of a business agreement with a local CS.

The aim of BCMCS is to provide the broadcast and multicast services. Entities, called Content Servers (CSs), will provide content to participating mobile Service Providers (SPs). The content is envisioned to be audiovisual data. A CS may be part of the serving network, but this is not necessarily so. The SP will transmit this content on a particular physical channel. If the content is offered for free, then any user can access this channel to view/process the content. If access to the channel is subscription based, then while any users can tune into the physical channel, the content will be encrypted so that only the subscribed users will be able to view/process the content.

Figure 18:
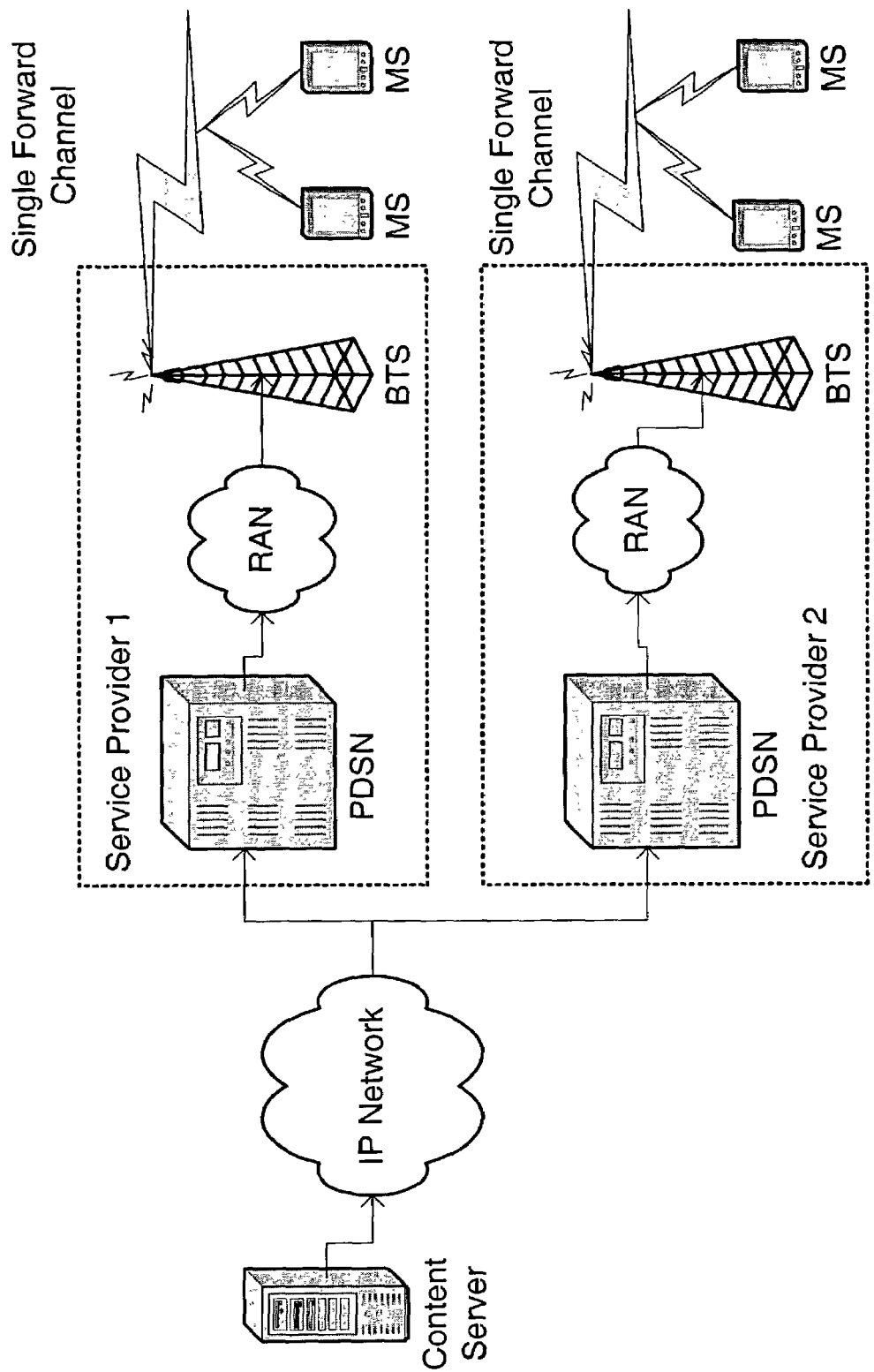
FIG. 18 is a communication system supporting broadcast and multicast services.

Security threats to a broadcast system are key design considerations. A system for providing broadcast and multicast services is illustrated in FIG. 18. The security threat may involve a user obtaining access to the content without paying a subscription fee (where required). To counter such threats, the content is encrypted and decryption keys provided only to those users who have subscribed. Key management then becomes of critical importance.

The broadcast content may be protected by end-to-end encryption using IPSec Encapsulating Security Payload (ESP) in transport mode. The security parameters, such as the encryption key and the encryption algorithm, are stored as a security association, which is indexed by the destination address and a 32-bit value called the Security Parameter Index (SPI).

For the purposes of this discussion, the Mobile Station (MS) is considered as two separate entities, the User Identity Module (UIM) and the Mobile Equipment (ME). The UIM is a low power processor that contains secure memory. The UIM may be removable (like a SIM card) or part of the MS itself. The ME contains a high power processor, but no secure memory.

The content is encrypted with a frequently changing Short-term Key (SK). The ME decrypts the content using SK. SK is changed frequently to prevent a "rogue shell" from sending SK to other terminals for use in receiving the broadcast, thereby providing many with service with only a single paying subscription. The SK is not transmitted; the value of SK used to encrypt a particular broadcast packet is derived from a Broadcast Access Key (BAK) and the SPI in the header of that IPSec packet. BAK resides in the UIM, requiring the presence of the UIM in order to receive broadcast service. The current BAK is the same for all subscribers to that channel, and the BAK provides access for a period of time determined by the operator. Thus, once the UIM has obtained the BAK, the UIM can compute the SK values needed for the ME to decrypt the broadcast. A method similar to "Secure Mode," as described in TIA/EIA/IS-683-B, C.S0016-A, SP-4742-RV2-A, entitled "Over-the-Air Service Provisioning of Mobile Stations in Spread Spectrum Systems," Published December 2001, is used to provision the UIM with the BAK.

The following is a list of definitions provided for clarity of understanding.

AAA Authentication, Authorization, and Accounting The AAA holds the root key K of the user.

AC Authentication Centre. This is an ANS-41 entity performing authentication and key management functions similar to those performed by an AAA.

BAK Broadcast Access Key: Provides access to the content for a certain amount of time (for example, one day, week or month).

BAKUE Broadcast Access Key Update Entity: A BAKUE is an entity that is in the serving network that can update BAK.

CS Content Server: Provides the data for the service.

MS Mobile Station: For the purposes of this document, the MS is considered as two separate entities, the UIM and ME.

UIM: User Identity Module (UIM): The UIM is a low power processor that contains secure memory. The UIM may be removable (like a SIM card) or part of the MS itself.

ME: Mobile Equipment: The ME contains a high power processor, but no secure memory.

SA Security Association: A listing of the parameters (such as the key) required to process an IPSec packet.

Each SA is index by destination address and Security Parameter Index (SPI).

SDP Session Data Parameters: Parameters required for processing the current content.

SK Short-term Key: The CS encrypts the content using SK and the ME decrypts using SK.

SMCK Secure Mode Cipher Key: as used in IS-683-B. In BCMCS, SMCK is used to encrypt BAK when being sent to the UIM.

SP Service Provider: The serving network in which the MS is currently located.

SPI Security Parameter Index: used to index a security Association (SA).

PDSN Packet Data Serving Node: Interfaces between the Internet and the RAN.

RAN Radio Access Network.

$RAND_{SM}$ A random number generated by the AC/AAA that is used to generate SMCK in IS-683-B.

The subscription process is outside the scope of this discussion. However, assume that the CS and SP agree on a subscription process that includes provisioning of a per-subscription root key that can be used both for authentication and for key management. Assume that this root key is held by the AC or AAA-H.

It is possible that the broadcast subscription may be held in the CS or another entity that is separate from the subscription for wireless access that would be held in the AAA-H or in the HLR associated with an AC. In that case, assume that a wireless access subscription is established before the broadcast service subscription is established. The location of the subscription data will affect how BAKs are provisioned. There are two methods that an MS can use to detect if it has the correct BAK.

When a user tunes to a broadcast services, the first step is to obtain the Session Data Parameters (SDP) from the CS. The SDP includes related data about BAK, such as an identifier (sequence number) and expiration time, if any. These values allow the MS to determine if it needs to update the BAK. If a BAK update is required during a transmission, the transmission will include notification for the MS to perform an SDP update (from which the MS can determine that it needs to update the BAK).

IPSec packets encrypted with SK values derived from BAK have the 4 most significant bits (MSBS) of the SPI set to the BAK_ID corresponding to that BAK. So the ME can extract the 4 MSBs to check if the UIM has the correct BAK.

The CS decides how often BAK is changed. Frequent BAK changes will provide more security. Frequent BAK changes will also provide greater flexibility in billing. Consider the following example. Once a user has BAK, they can access the content for the lifetime of that BAK. Suppose the BAK is changed at the beginning of every month. If a user's subscription runs out halfway through the lifetime of a BAK, the user will still be able to generate SK (and thus view the content) until the BAK expires. So by changing BAK only every month, the CS can only charge subscriptions from the beginning of the month to the end of the month. A user can't subscribe from the middle of one month to the middle of the next. However, if BAK changed every day, then the user could subscribe from the beginning of any day during the month. Increasing the frequency of BAK changes should be evaluated against a possible increase in the number of times the mobile station has to retrieve new BAK values.

This discussion does not specify how an MS determines that it needs to update BAK. Assume that a means will be provided for the MS to determine that its BAK is about to expire or has expired, triggering action to perform a BAK update. Several methods are available therefore. When an MS decides to perform a BAK update, a method similar to the IS-683-B Secure Mode is used to provide the UIM with BAK. There are a couple of ways in which this may be done.

Figure 19:
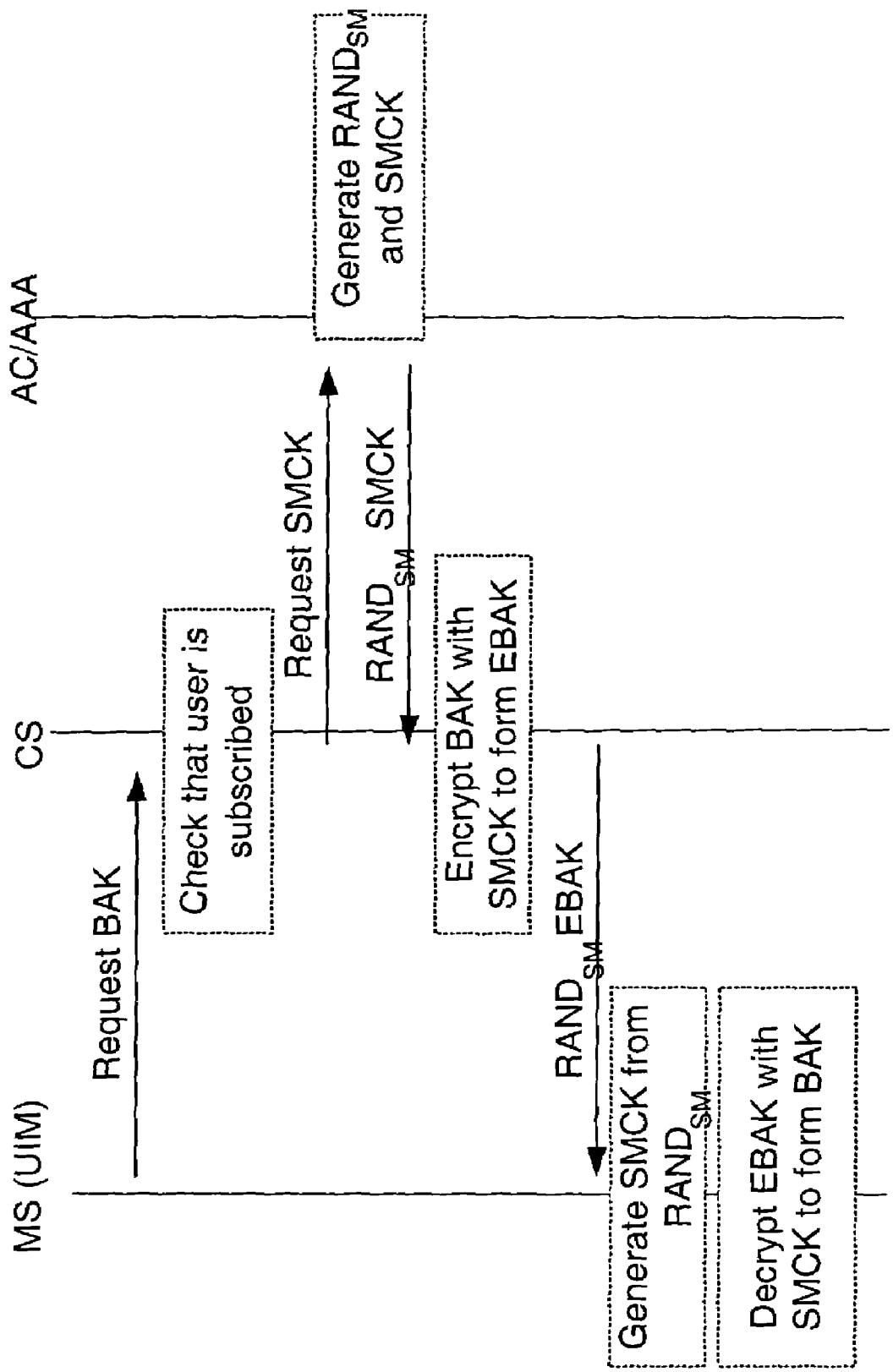
FIG. 19 a timing diagram illustrating Broadcast Access Key (BAK) updating performed by the Content Server (CS).

Firstly, the CS may provision the UIM with BAK, as in FIG. 19. When an MS determines that it needs to update BAK, the MS contacts the CS.

The CS checks if the user is subscribed. If the user is subscribed, then the CS contacts the AC/AAA of the user to obtain a temporary SMCK as in IS-683-B. The AC/AAA generates a random number $RAND_{SM}$ and combines this with the current SSD-B (or the root key K) of the mobile station to obtain SMCK. The SHA-1 based function f3 is used for this purpose. The AC/AAA sends $RAND_{SM}$ and SMCK to the CS.

The CS encrypts BAK using SMCK to obtain EBAK. The CS then sends $RAND_{SM}$, BAK_ID and EBAK to the mobile station. The UIM combines $RAND_{SM}$ with the root key K (or the current SSD-B) to obtain SMCK. The UIM then uses SMCK to decrypt EBAK to obtain BAK, and stores BAK within secure memory.

Figure 20:
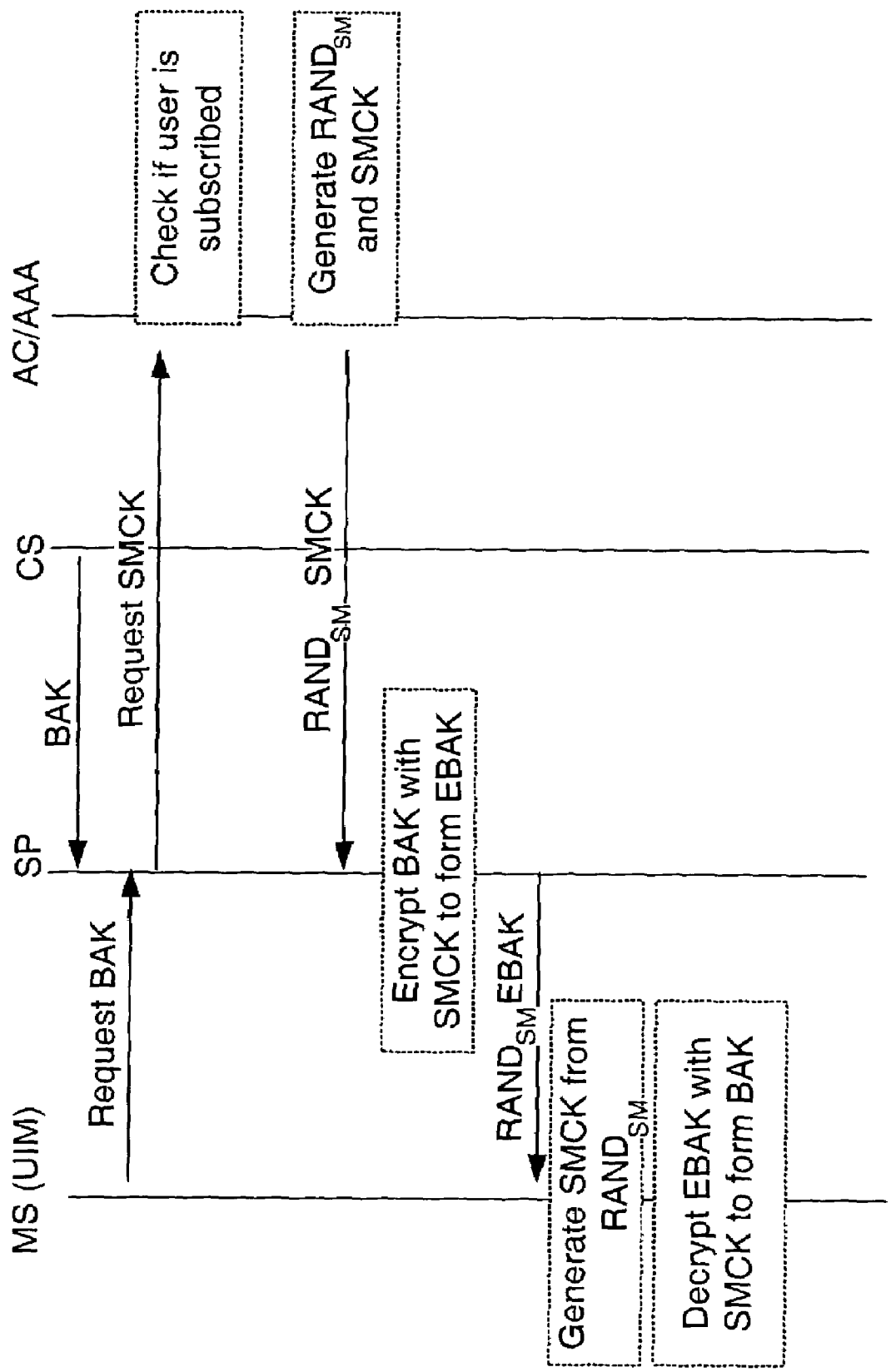
FIG. 20 is a timing diagram illustrating BAK updating performed by the Service Provider (SP).

If the CS passes subscription data on to the HLR/AC or the AAA-H, then the SP can provision UIMs with BAK on behalf of the CS, as shown in FIG. 20. In this scenario, the SP has one or more BAK Update Entities (BAKUEs) that can provision a UIM with BAK.

The CS supplies the current BAK to the BAKUEs. When an MS determines that it needs to update BAK, the MS contacts a BAKUE. The BAKUE contacts the AC/AAA of the user to obtain a temporary Secure Mode Cipher Key (SMCK) as in IS-683-B.

The AC/AAA checks if the user is subscribed. If the user is subscribed, then the AC/AAA generates a random number $RAND_{SM}$ and combines this with the current SSD-B (or the root key K) of the mobile station to obtain SMCK. The SHA-1 based function f3 is used for this purpose. The AC/AAA sends $RAND_{SM}$ and SMCK to the BAKUE.

The BAKUE encrypts BAK using SMCK to obtain EBAK. The CS then sends $RAND_{SM}$, BAK_ID and EBAK to the mobile station. The UIM combines $RAND_{SM}$ with the root key K (or the current SSD-B) to obtain SMCK. The UIM then uses SMCK to decrypt EBAK to obtain BAK, and stores BAK within secure memory.

If the CS passes subscription data on to the HLR/AC or the AAA-H, then the SP can provision UIMs with BAK on behalf of the CS, as shown in FIG. 20. In this scenario, the SP has one or more BAK Update Entities (BAKUEs) that can provision a UIM with BAK.

1. The CS supplies the current BAK to the BAKUEs.
2. When an MS determines that it needs to update BAK, the MS contacts a BAKUE.
3. The BAKUE contacts the AC/AAA of the user to obtain a temporary Secure Mode Cipher Key (SMCK) as in IS-683-B.
4. The AC/AAA checks if the user is subscribed. If the user is subscribed, then the AC/AAA generates a random number $RAND_{SM}$ and combines this with the current SSD-B (or the root key K) of the mobile station to obtain SMCK. The SHA-1 based function f3 is used for this purpose. The AC/AAA sends $RAND_{SM}$ and SMCK to the BAKUE.
5. The BAKUE encrypts BAK using SMCK to obtain EBAK. The CS then sends $RAND_{SM}$, BAK_ID and EBAK to the mobile station.
6. The UIM combines $RAND_{SM}$ with the root key K (or the current SSD-B) to obtain SMCK. The UIM then uses SMCK to decrypt EBAK to obtain BAK, and stores BAK within secure memory.

An adversary achieves nothing by performing a BAK request while impersonating a subscribed user. Only the subscribed user will be able to derive SMCK from RAND$_{SM}$, and thus extract BAK. For these reasons, the CS/BAKUE may not need to authenticate BAK requests. According to the exemplary embodiment, the UIM does not reveal BAK. If a single UIM reveals BAK, then all security is lost until the CS changes BAK.

The UIM should store BAK and related data about BAK, such as an identifier (sequence number) and expiration time, if any. It may prove beneficial to provision UIM with BAK shortly before BAK begins being used to derive SK values. Otherwise, once the CS starts sending packets with SK derived from the new BAK, the user would experience a delay as the MS performs a BAK update. If many users are tuned in, then there will be a burst of traffic as all the MSs perform a BAK update.

To avoid such problems, a Broadcast Multicast Service (BCMCS) as described herein may allow an MS to obtain the new BAK shortly before the BAK changes. The MS, SP or CS may initiate the BAK acquisition process. Different MS may have different schedules for performing BAK updates, to prevent too many MSs performing a BAK update at once.

For security reasons, BAK should be distributed as close as possible to the time of use. The ME may store the BAK-related data, to save requesting this information from the UIM.

If the CS has already computed the SK corresponding to the current SPI, then the CS encrypts the broadcast content according to IPSec ESP in transport mode, using SK as the encryption key. To create a new key SK, the CS performs the following steps. The CS chooses a random 28-bit value SPI_RAND. The CS forms a 32-bit SPI of the form SPI= (BAK_ID∥SPI_RAND), where the 4-bit BAK_ID identifies the current BAK value. The CS pads SPI_RAND to 128 bits. The CS encrypts this 128-bit value using BAK as the key. The 128-bit output is SK. The CS puts the new value of SK in an SA indexed by the SPI and the destination address of the broadcast packet.

The value of SPI_RAND should be random, so that a user can't predict what values of SPI will be used in the future. Otherwise someone could pre-compute the SK values to be used for that day and distribute these keys at the beginning of the day. For someone wanting to distribute keys, this process is easier (and less expensive) than distributing the keys in real time.

UIM so that the UIM can compute the SK. The UIM computes the SK as follows. The UIM extracts the BAK_ID from the 4 most significant bits of the SPI and retrieves the value of BAK (corresponding to BAK_ID) from its memory. The UIM extracts the 28-bit SPI_RAND and pads SPI_RAND to 128 bits.

The UIM encrypts this 128-bit value using BAK as the key. The 128-bit output is SK. The UIM passes SK to the ME. The ME puts the new value of SK in an SA indexed by the SPI and the destination address of the broadcast packet. The ME now decrypts the block, as per IPSec ESP in transport mode, using SK as the key.

The same value of SK The same value of SK can be used for more than one IPSec packet. The CS decides when and how often to change SK. Decreasing the lifetime of SK increases the security. The SK may normally change every 5 to 10 minutes, but it is up to the CS to decide how often they wish to change SK. During peak-usage times, the CS may choose to change SK more often for additional security. Note that the value of SK is changed by changing SPI, so the CS and MS must be designed to accommodate dynamic SPIs.

The same value of SK may be used for more than one IPSec packet. The CS decides when and how often to change SK. Decreasing the lifetime of SK increases the security. The SK may normally change every 5 to 10 minutes, but it is up to the CS to decide how often they wish to change SK. During peak-usage times, the CS may choose to change SK more often for additional security. Note that the value of SK is changed by changing SPI, so the CS and MS must be designed to accommodate dynamic SPIs. The same value of SK can be used for more than one IPSec packet. The CS decides when and how often to change SK. Decreasing the lifetime of SK increases the security. The SK may normally change every 5 to 10 minutes, but it is up to the CS to decide how often they wish to change SK. During peak-usage times, the CS may choose to change SK more often for additional security. Note that the value of SK is changed by changing SPI, so the CS and MS must be designed to accommodate dynamic SPIs.

Table 1 may be useful as a quick reference regarding the use, computation and storage of keys in the MS. Table 1 is a summary of the use computation and storage of keys in the Mobile Station.

TABLE 1

| The key: | is used to: | lasts for: | requires: | is computed in: | is stored in: |
| --- | --- | --- | --- | --- | --- |
| SMCK | decrypt BAK | [temporary] | Root Key K | UIM | (temporary) |
| BAK | compute SK | hours/days | SMCK | UIM | UIM |
| SK | decrypt content | sec/minutes | BAK, SPI | UIM | ME |

Given a BCMCS IPSec packet, the ME performs the following steps. The ME obtains the SPI. The ME extracts the BAK_ID from the SPI. The ME then decides if the UIM has the correct BAK. If the UIM doe not have the correct BAK, then the MS updates the BAK as discussed above. (Alternatively, the ME may check the SDP to see if it has the current BAK).

The ME checks if it has a security association (SA) corresponding to the SPI and the destination address of the broadcast packet. If the ME has an SA with this SPI then the ME decrypts the block (as per IPSec ESP in transport mode) using the decryption key SK in the SA. If the ME does not have an SA with this SPI then the ME passes the SPI to the BCMCS offers new challenges for key management that require non-standard solutions. If a solution uses IPSec, then a variable SPI is desired for BCMCS, in order to determine which value of SK should be used to decrypt. For one embodiment, key management (in which SK is derived from BAK and SPI) is sufficiently secure for BCMCS, and allows a particularly practical solution for BCMCS.

There are two "exchanges" taking place in BCMCS:

The users pay fees to the CS in order to receive broadcast content from the CS (via the SP).

The CS pays fees to the SP in order to receive transmission time from the SP.

The security goals of the system include avoiding the following threats.

Threat 1. An SP gets paid transmission fees without giving transmission time. Typically, this is not a major concern. Any SP that fails to provide transmission time will be easily caught. It is expected that SPs will behave in a manner that promotes more business, else violating SPs will suffer the consequences of a bad reputation.

Threat 2. A CS (or other party) gets transmission time without paying transmission fees. Such as when someone impersonates a legitimate CS; sending messages to the SP as if it were content provided by the CS. One solution is to add an Authentication Header (AH), on the link between the CS and the SP to avert the threat.

Threat 3. User(s) access the broadcast content without paying the fees. The solution was required to be IPSec based. To access the broadcast content, a user must have the current decryption keys. The UIM is not powerful enough to decrypt the content, and therefore the ME performs the decryption. This implies that the decryption keys are stored in the ME. Eventually, someone will work out how to extract the current decryption key from the ME. A subscribed user will then be able to distribute the decryption key to other non-subscribed users. So it will be difficult to design a scheme where non-subscribed users cannot access the data.

Note that the goal is to dissuade the potential market (those users for which the service is targeted) from using illegitimate means to access the content.

The ME cannot be trusted to store or compute long-term keys; the long term keys are to be stored and computed in the UIM. The UIM is not powerful enough to perform public-key cryptographic operations so all key management must be based on symmetric cryptography. SPs and other entities will have access to some of the symmetric keys and may exploit these to derive decryption keys. It appears that the real threat is that of subscribed users distributing decryption keys to non-subscribed users. One solution is to change the decryption key frequently and in an unpredictable manner. The challenge is achieving this while minimizing the transmission overhead required for key distribution.

Figure 21:
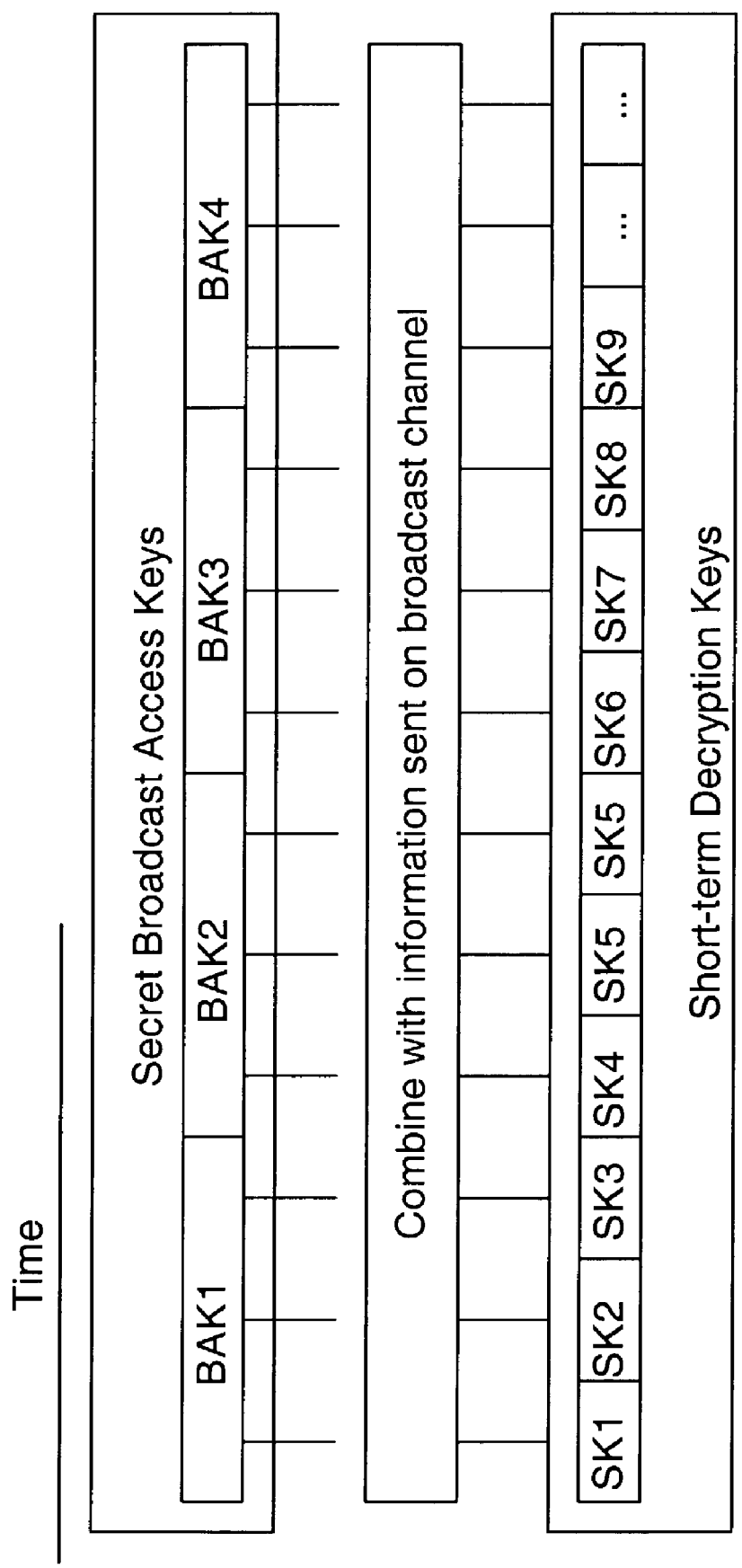
FIG. 21 illustrates derivation of multiple decryption keys from a BAK by combining information sent on a broadcast channel.

One solution distributes a Broadcast Access Key (BAK) to each user individually, wherein many decryption keys are derived using the BAK and public information sent with the broadcast. An example is shown in FIG. 21. In this example, only three decryption keys are derived from each BAK. In practice, there may be hundreds or thousands of decryption keys derived from a single BAK.

FIG. 21 is an example of deriving many decryption keys from one BAK by combining with information sent on the broadcast channel. If a subscribed user could extract BAK and distribute it to other users, then this would allow the other users to derive many SKs. To avoid this, the BAK must be kept in secure memory in the UIM so that the user cannot extract BAK. There are various options for provisioning the UIM with BAK. The option suggested (similar to IS-683-B Secure Mode) appears to be the simplest solution.

In the normal instance of using IPSec, the two parties would normally negotiate when changing keys. Once the parties agree on the new keys, the SPI does not change: the parties simply place the new keys in the old security association and leave the SPI as it was. In BCMCS, there is a different situation because there are multiple receivers and the communication flows only from the CS to the users. The CS is not in a position to verify that the users have the correct value of SK. Similarly; the users have difficulty verifying that they have the correct value of SK. Changing the SPI when SK changes solves this problem. This way the CS knows that the users are aware that SK has changed. Note that this is not standard practice in IPSec.

The two major options for distributing the SK include: 1) sending SK in packets separate from the content stream; or 2) deriving the SK from information included in the IPSec packet containing the content. Hybrid schemes may also be considered.

A user may "tune in" at any time during the broadcast. The user will want almost instant access to the content. Thus, if information for deriving SK (for example, and encrypted value of SK or a random seed) is sent in a packets separate from the content, then the CS must resend the information for deriving SK every few seconds. One disadvantage is that this method uses up bandwidth. The major disadvantage is that there is no standard method for distinguishing packets containing SK information from packets containing content.

Given that the SPI is changing when SK is changing, it is possible to take the additional step of deriving SK exclusively from BAK and the SPI. To ensure that the correct value of BAK is used, the SPI includes a 4-bit BAK_ID, and there would be an expiration time for the BAK so that BAK_ID can be re-used for other values of BAK in the future. This leaves 28 bits of the SPI that could change, corresponding to $2^{28}$ possible values of SK. When the ME comes across a new SPI, the ME passes this SPI to the UIM and the UIM computes SK from SPI and BAK. The ME would have the new SK back in a negligible amount of time, and could continue decrypting. The variable portion of SPI should be random; otherwise a subscribed user could get the UIM to pre-compute the necessary SK values and distribute them.

Such methods incur no additional bandwidth for distributing SK to the users, and allow the UIM to compute SK as soon as it has the BAK and the ME has begun receiving the IPSec packets. The user doesn't have to wait for the packets containing information for SK. This is a considerable advantage, particularly in the case where a user is changing channels every few seconds or minutes: the user will not want a few seconds delay while waiting for information to derive SK every time they change channels.

This scheme, however, allows a relatively small number of SK values to be derived from a single BAK: Specifically, in the example described, there are $2^{28}$ values (corresponding to the $2^{28}$ values of SPI_RAND), compared to $2^{128}$ values using other methods. A group of subscribed users could get their UIM to pre-compute all $2^{28}$ values of SK for the current BAK by inputting all $2^{28}$ possible SPI values. Estimate that one UIM might be able compute all the keys in about three days. A large number of subscribed UIMs would be able to pre-compute these values within, say, one hour. This group could then distribute these values. The set of keys would require around 4 gigabytes of memory. Since the current consideration, however, is for users accessing via a Personal Digital Assistant (PDA) or phone, it is highly unlikely that they will have access to sufficient storage for all 4 gigabytes. Additionally, the user will probably be unwilling to download large amounts of data, e.g., 4 gigabytes, every time the BAK changes. Also, the current example considers users that want quality service. Without all the keys, the users are not going to be able to decrypt all the content, and won't get quality service.

The following discussion presents several options for enhancing the security of BCMCS and similar broadcast type services. Specifically considered are: 1)encryption layers, including link layer encryption and end-to-end encryption; 2) BAK update procedures, such as encryption at the SS and encryption at the local network; 3) location of the BAK encryptor, or BAK distribution server, such as associated with a single CS or centralized for provision for multiple CS, and 4) SK transport, wherein the SK may be derived from the SPI or sent in encrypted form. An exemplary architecture is provided in FIG. 9 which will be used for the following discussion.

While various options and embodiments are considered, the exemplary embodiment provides a method for first establishing a Registration Key (RK), or root key, securely between a home system or network, referred to as an HLR, and a secure module within a remote unit, the UIM. An AKA procedure, or a modified AKA procedure is used to provide a same RK to both the HLR and the UIM for a given user. Once the UIM and HLR both have a same RK value, the local system, referred to as the VLR, may provide a Broadcast Access Key (BAK) to the UIM, using such information. Specifically, the VLR generates the BAK. The VLR then either: 1) provides the BAK to the HLR, where the HLR encrypts the BAK and provides the Encrypted BAK (EBAK) to the VLR; or 2) the VLR sends a Temporary Key (TK) request to the HLR. In the first instance, the HLR encrypts the BAK using the RK that is known only by the HLR and the UIM. The EBAK is provided to the UIM via the VLR. The UIM receives the EBAK and uses the RK to decrypt the BAK. Note that for implementation, every time the BAK changes, the VLR must send the BAK to the HLR incurring overhead. For method 2), the HLR generates multiple TK values and associated random values. The TK values are generated using random numbers and the RK. The TK values, i.e., $TK_1$, $TK_2$, etc., and the random values, i.e., $TK\_RAND_1$, $TK\_RAND_2$, etc., are provided to the VLR. Each time the VLR updates the BAK (changes the BAK for maintenance of secure transmissions) the VLR encrypts the BAK using a $TK_i$. The VLR then sends the EBAK, and the $TK_i$ or the ($TK_i$, $TK\_RAND_i$) pair to the UIM. In each situation, as the UIM has the RK, the UIM is able to decrypt the EBAK and recover the BAK.

Figure 22:
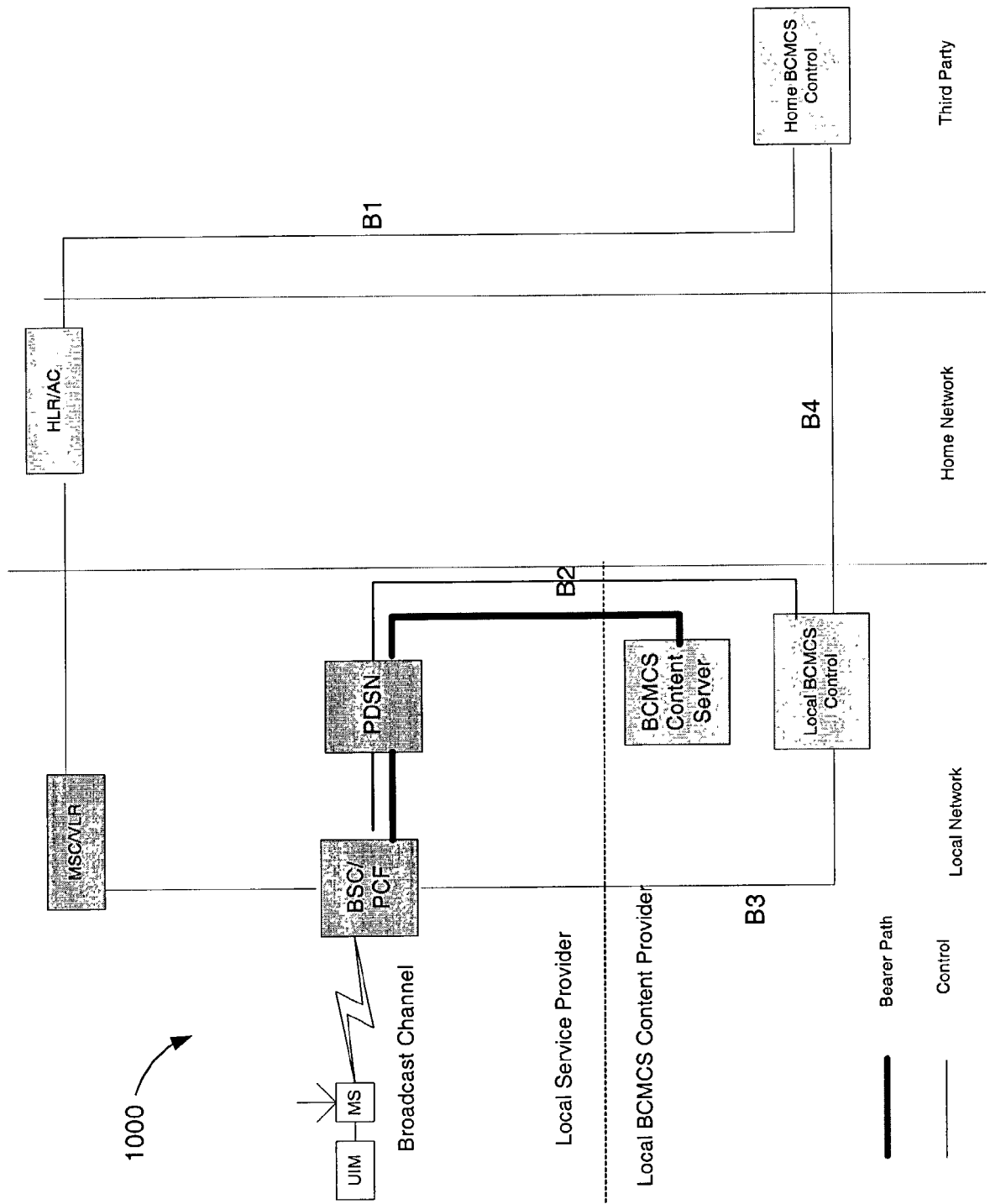
FIG. 22 is a communication system architecture for supporting BCMCS.
Figure 23:
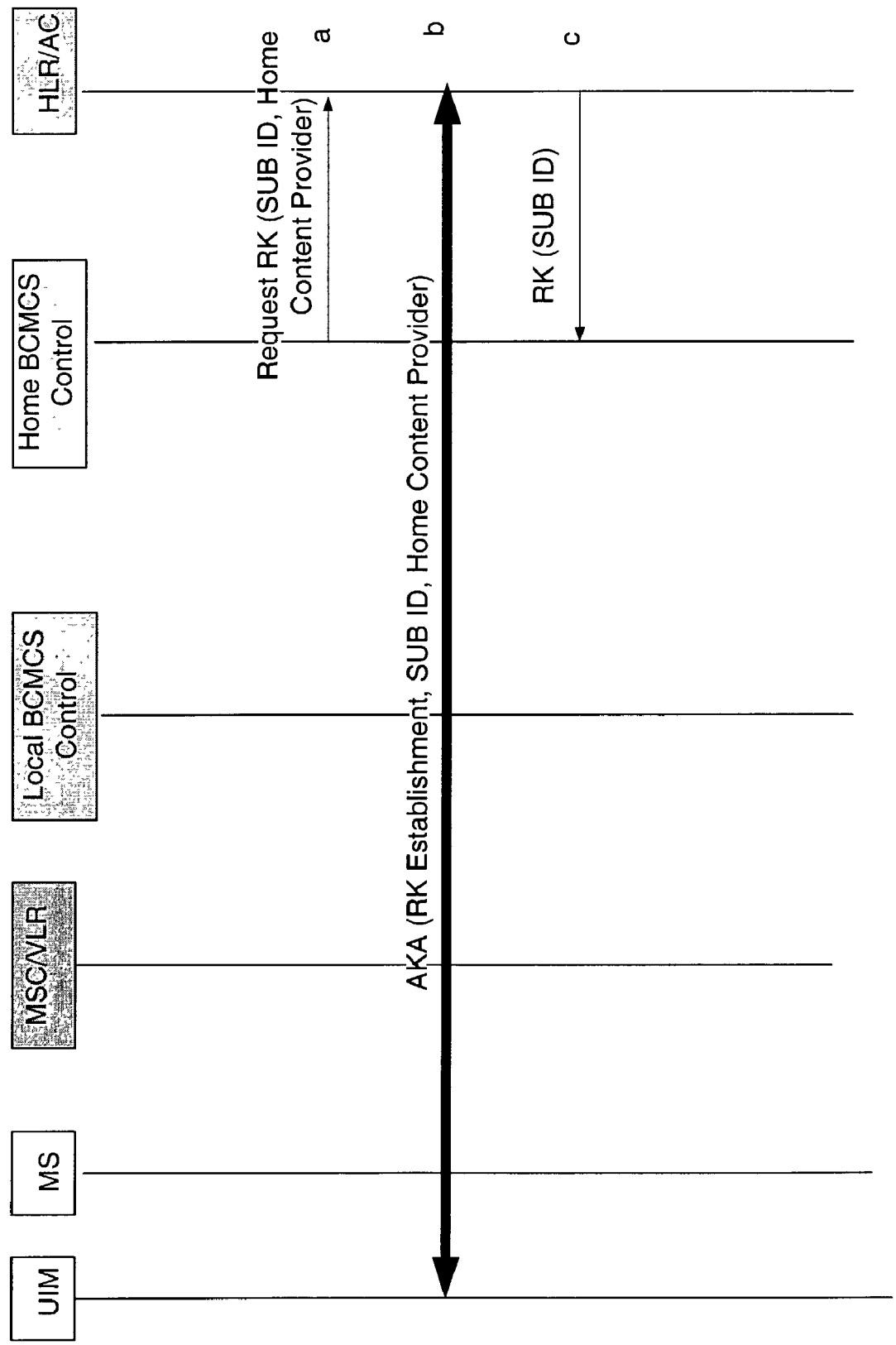
FIG. 23 is a timing diagram of Registration Key (RK) establishment in a communication system supporting BCMCS, wherein the home service provider does not own the Content Server (CS).

Consider system 1000 of FIG. 22 supporting BCMCS. The functions of the various entities are defined as:

Home BCMCS Control:
  Provide BCMCS service subscriptions
  Accounting info for BCMCS service
  Request for Root Key (RK) establishment in UIM
  Generate the temporary key (TK) for encryption of BAK Local BCMCS Control:
  Generate BAK for BCMCS service
  Encryption of BAK by using TK
  Download encrypted BAK to UIM
  Deliver BAK to RAN for generating SK and also indicate SK life time BCMCS Content Server:
  Provide BCMCS content. The interfaces illustrated in system 1000 are defined as:

B1 Interface (HLR/AC—Home BCMCS Control):
  Used for request of RK establishment in UIM from Home BCMCS Control
  Deliver RK to Home BCMCS Control from HLR/AC B2 Interface (Local BCMCS Control—PDSN):
  Download the encrypted BAK to UIM via IP protocol B3 Interface (Local BCMCS Control—BSC/PCF)
  Deliver BAK to RAN
  Send SK lift time to RAN B4 Interface (Local BCMCS Control—Home BCMCS Control)
  Deliver sets of TK to Local BCMCS Control FIG. 23 is a timing diagram illustrating RK establishment. The vertical axis refers to time. RK establishment or provisioning occurs when the user subscribes to the BCMCS service in Home BCMCS AAA. Each BCMCS content provider has one corresponding RK for each subscriber. RK is only known by the UIM and home service provider/home content service provider. RK Establishment Procedures illustrated in FIG. 23 is described as follows.

step a: Upon receiving the subscription from the user, Home BCMCS Control sends RK establishment request to the subscriber's home service provider's HLR/AC indicating the subscriber's identity (SUB_ID) and its own BCMCS content provider's identity.

step b: HLR/AC uses the existing AKA procedures to establish RK in UIM.

step c: Upon successful RK establishment in UIM, HLR/AC sends

Figure 24:
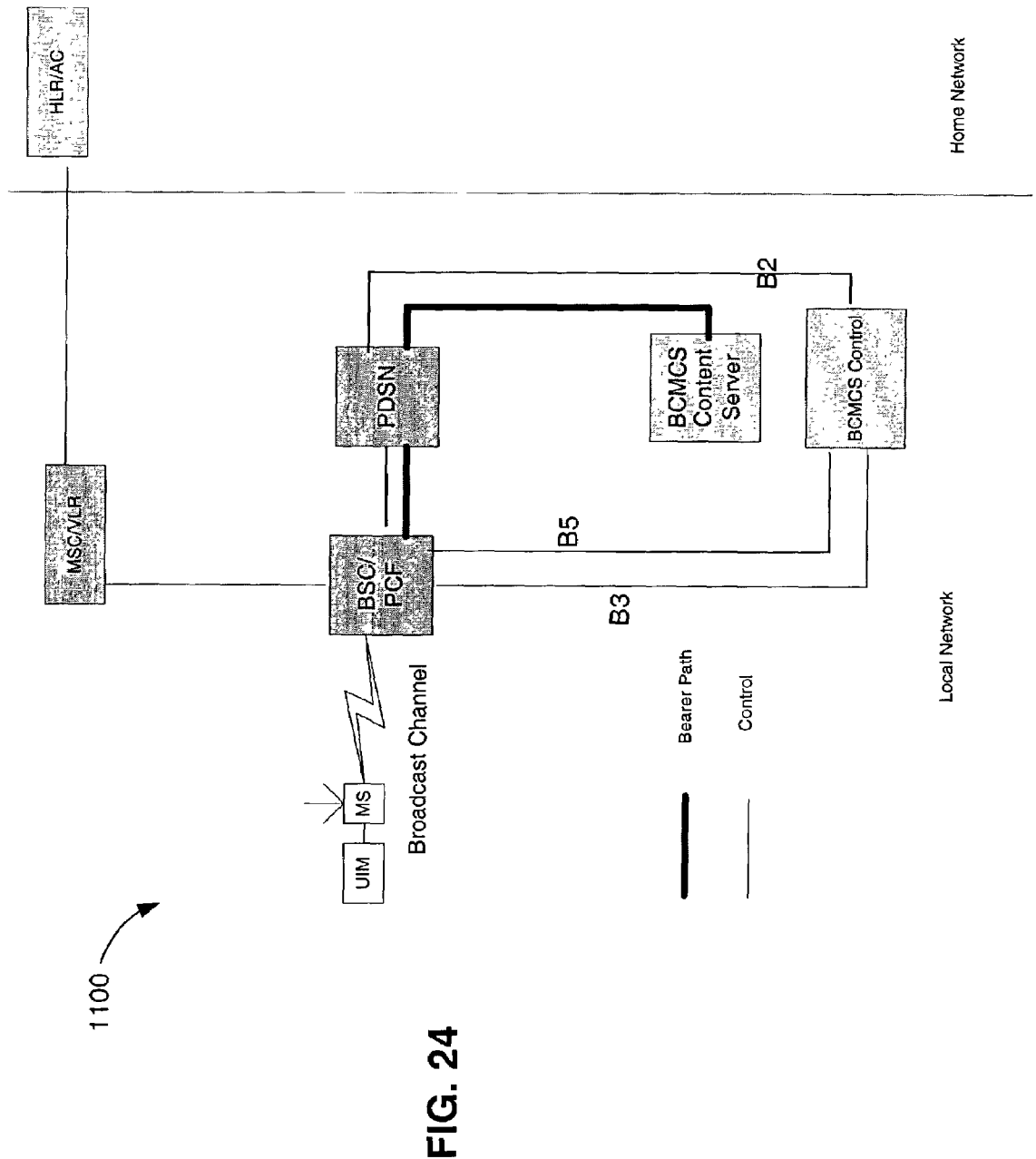
FIG. 24 is a communication system architecture for supporting BCMCS, wherein the home service provider owns the CS.

RK to the Home BCMCS Control.•BAK download occurs when the MS requests such. There is BAK life time associated with each BAK, wherein each BAK is identified by a BAK identifier or sequence number. Each BCMCS program identified by Content ID has its own BAK. A Home Content Provider ID and Content ID is unique for each BCMCS program. The mapping between the BCMCS_ID and (Home Content Provider ID+Content ID) pair is performed locally in Local BCMCS Control. The BAK is only known by Local BCMCS Control and the UIM. The BAK Download Procedures are given as follows.

step a: Upon the subscriber subscription to the BCMCS service or upon the BAK lifetime expires, the UIM requests a BAK download and the MS passes the request to the Local BCMCS Control.

step b: The Local BCMCS Control entity sends a Temporary Key Request to the Home BCMCS Control so that it can use it for encryption of BAK.

step c: The Home BCMCS Key Encryptor generates TK_RAND and then calculate TK with the input of RK and TK_RAND by using some function [TK=f (TK_RAND, RK)]. The Home BCMCS Key Encryptor may generate several sets of the pairs for future usage so that the transactions between the Home BCMCS Control and Local BCMCS Control is not always needed. The Home BCMCS Control then returns several TKs to the Local BCMCS Control.

step d: The Local BCMCS Key Encryptor generates a BAK encrypted with one of TKs, and generates BAK_RAND. The Local BCMCS Encryptor then calculate BAK_AUTH with the input of BAK and BAK_RAND by using some function [BAK_AUTH=f(BAK_RAND, BAK)]. Then the Local BCMCS Key Encryptor sends encrypted BAK with corresponding BAK_ID and BAK lifetime, BCMCS_ID, TK_RAND, BAK_AUTH, and BAK_RAND to the UIM via the MS. The UIM calculates TK with the input of TK_RAND and its owned stored RK and then decrypts BAK by using the TK. The calculation of BAK_AUTH with input of BAK and BAK_RAND, is compared with the received BAK_AUTH. If there is no match, return to step a. FIG. 24 illustrates a BCMCS architecture for a Home Service Provider having a Content Server. The system 1100 has entities defined as follows.

Home HLR/AC:
    Provide BCMCS service subscriptions
    Accounting info for BCMCS service
    Generate the temporary key (TK) for encryption of BAK
Local BCMCS Control:
    Generate BAK for BCMCS service
    Encryption of BAK by using TK
    Download encrypted BAK to UIM via B2 interface
    Deliver BAK to RAN for generating SK and also indicate SK life time
BCMCS Content Server:
    Provide BCMCS content.

As illustrated in FIG. 24, the interfaces are defined as follows.
B2 Interface (Local BCMCS Control—PDSN):
    Download the encrypted BAK to UIM via IP protocol
B3 Interface (Local BCMCS Control—BSC/PCF)
    Deliver BAK to RAN
    Send SK lift time to RAN
B5 Interface (Local BCMCS Control—BSC/PCF)
    Deliver sets of TK to Local BCMCS Control.

In the system 1100, the A-key be used for RK, as well as A-key exchange procedures, as the home service provider owns BCMCS Content Server.

With respect to system 1100, the BAK download occurs when the MS requests a BAK or update. There is BAK life time associated with each BAK. Each BCMCS program identified by Content ID has its own BAK. The BAK is only known by Local BCMCS Control and UIM. The BAK Download Procedures are given as follows.

step a: Upon the subscriber subscribers the BCMCS service or upon the BAK lifetime expires, the UIM requests for BAK download and the MS passes the request to the Local BCMCS Control.
step b: The Local BCMCS Control sends Temporary Key Request to the BSCNLR so that it can use it for encryption of BAK.
step c: The BSC/PCF passes Temporary Key Request to the HLR/AC via MSCNLR.
step d: The HLR/AC generates TK_RAND and then calculate TK with the input of A Key and TK_RAND by using some function [TK=f(TK_RAND, A Key)]. It can generates several sets of the pairs for future usage so that the transactions between the HLR/AC and BSC/PCF via MSC/VLR is not always needed. The HLR/AC then returns several TKs to the BSC/PCF via MSC/VLR.
step e: The BSC/PCF passes TK to the Local BCMCS Control.
step f: The Local BCMCS Control generates a BAK and encrypted with one of TKs. It also generates BAK_RAND and then calculate BAK_AUTH with the input of BAK and BAK_RAND by using some function [BAK_AUTH=f(BAK_RAND, BAK)]. Then the Local BCMCS Control sends encrypted BAK with corresponding BAK_ID and BAK lifetime, BCMCS_ID, TK_RAND, BAK_AUTH, and BAK_RAND to the UIM via the MS. The UIM calculates TK with the input of TK_RAND and its owned stored A Key and then decrypts BAK by using the TK. And then it calculates its own BAK_AUTH with input of BAK and BAK_RAND. It compares its calculated BAK_AUTH with the received BAK_AUTH. If it is not matched, it will start from step a again. Note that for an embodiment providing encryption at the link layer, such encryption configuration does not prevent IP level encryption. Encryption at the link layer should be disabled if IP level encryption is enabled. The Short term Key (SK) Download Procedures are given as follows.

step a: The BCMCS Control sends BAK and BAK life time to BSC/PCF, and sends SK life time to request BSC/PCF generates SK with indicated SK Life Time.
step b: The BSC/PCF sends SK encrypted with BAK to UIM via MS.
step c: UIM decrypts SK with BAK and sends back to MS.
step d: BCMCS Content Server sends plain broadcast content to BSC/PCF via PDSN.
step e: The BSC/PCF encrypts the broadcast content with SK and then sends it over the air. In summary, the BCMCS is discovered out of band. The user subscribes to the BCMCS service out of band (SUB ID). If the Home Service Provider does not own the content server, the root key or Registration Key (RK) is established at the UIM via AKA; otherwise, the A-key will be used for RK. The TK is sent to the Local BCMCS Control node. The BAK encrypted by TK is download to UIM via visited network (PDSN) using a special UDP port number. The MS finds if broadcast service is available for particular sector via overhead message. The MS performs a registration (BCMCS_ID).

Figure 25:
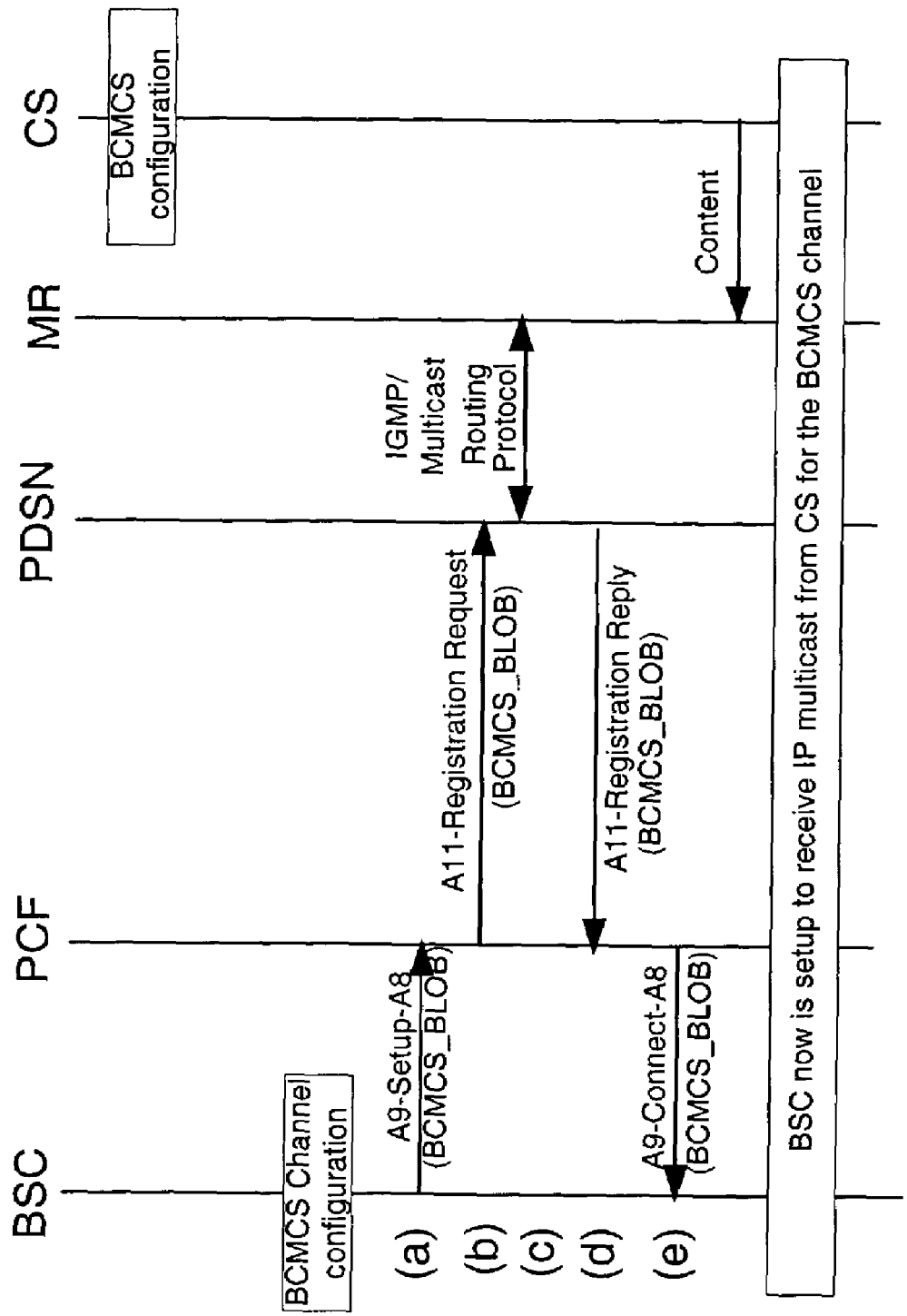
FIG. 25 is a timing diagram of bearer path set-up via provisioning for multicast service.
Figure 26:
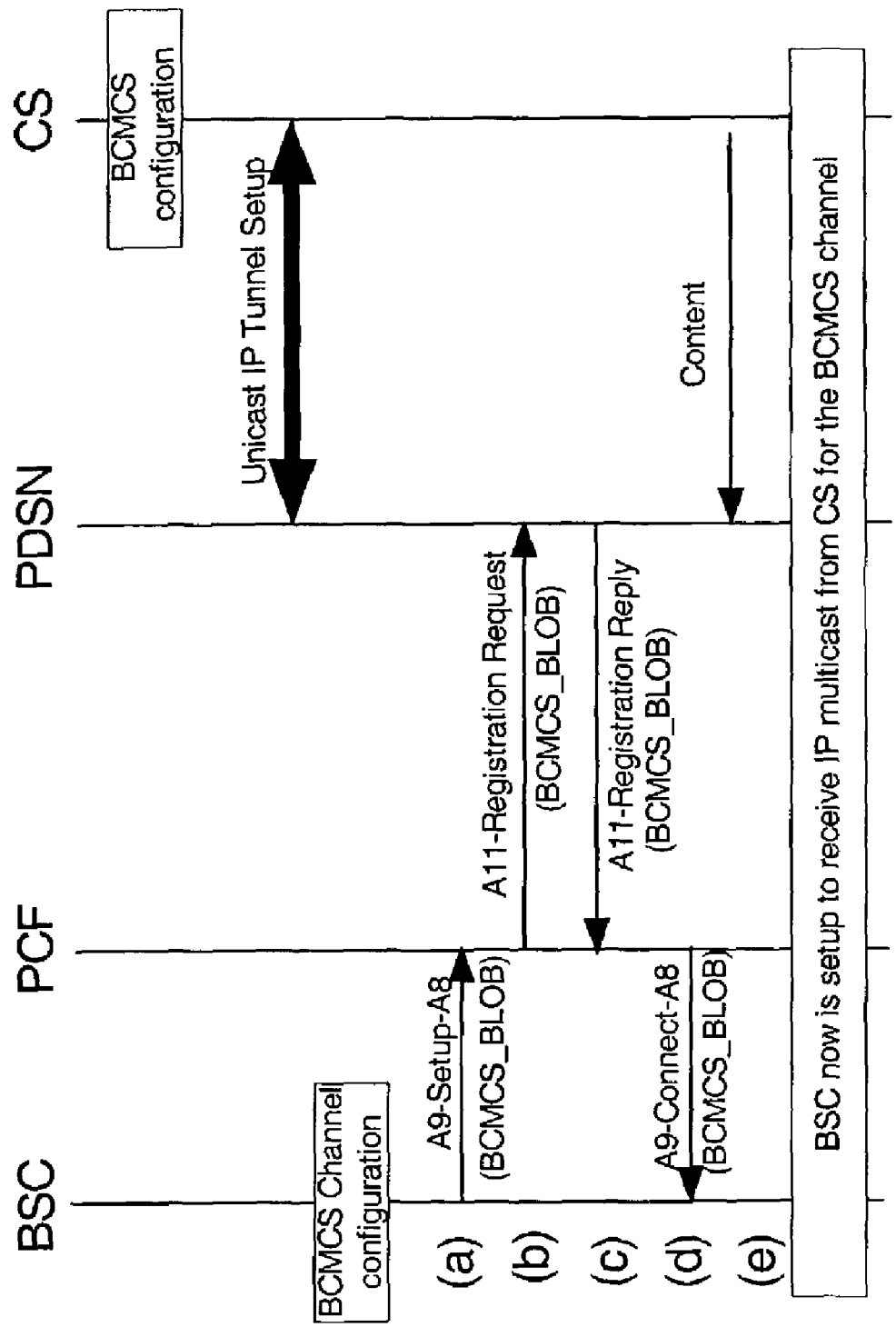
FIG. 26 is a timing diagram of bearer path set-up via provisioning for unicast service.
Figure 27:
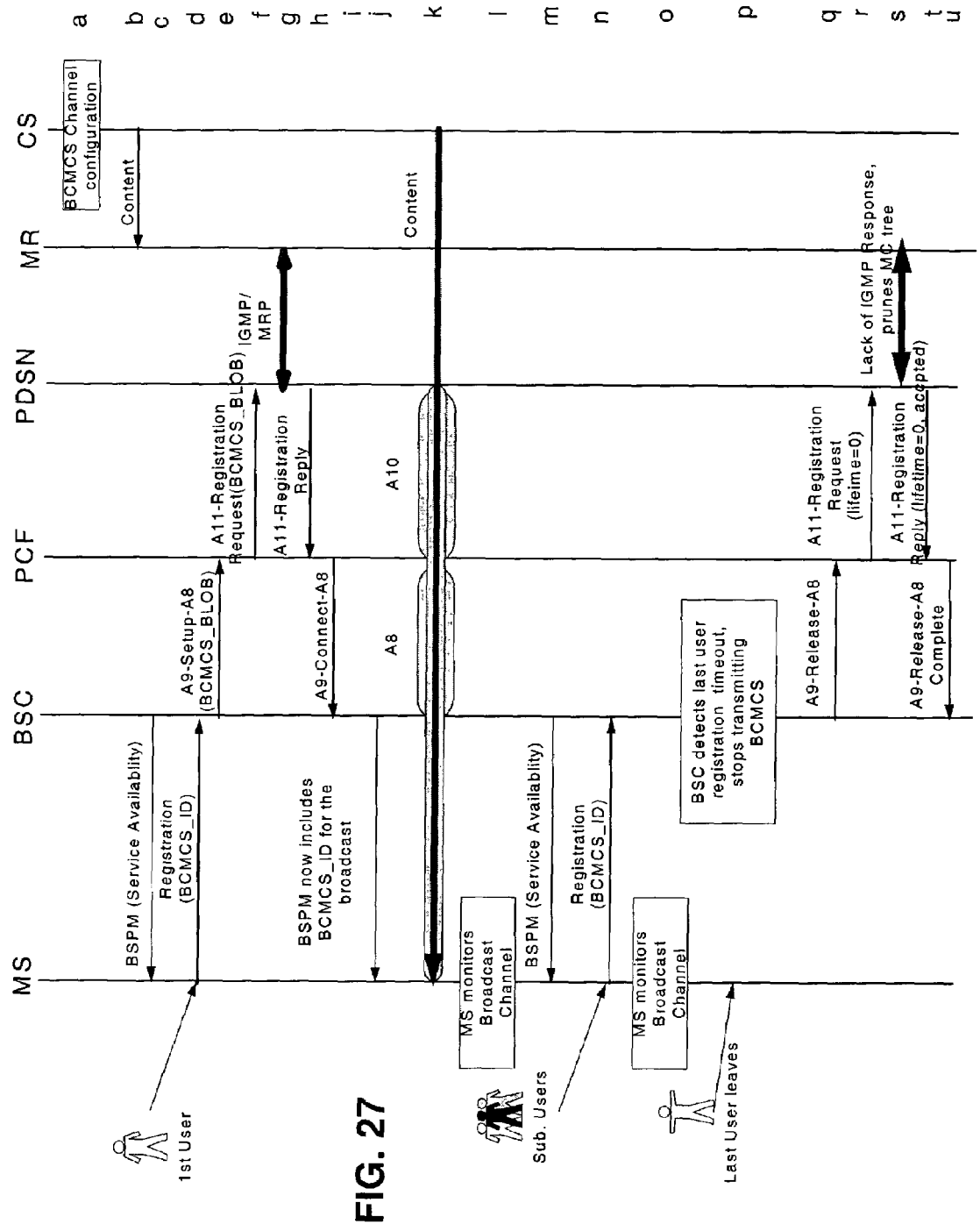
FIG. 27 is a timing diagram of bearer path configuration via MS registration for multicast service.

FIG. 25 illustrates the bearer path set-up via provisioning for multicast service between the CS and the PDSN. FIG. 26 illustrates bearer path set-up via provisioning for unicast service between the CS and the PDSN. FIG. 27 illustrates bearer path set-up and tear down via the MS registration and deregistration for multicast service between the CS and the PDSN.

BCMCS bearer path is setup (if not there)
MS starts monitoring BCMCS channel

Figure 9:
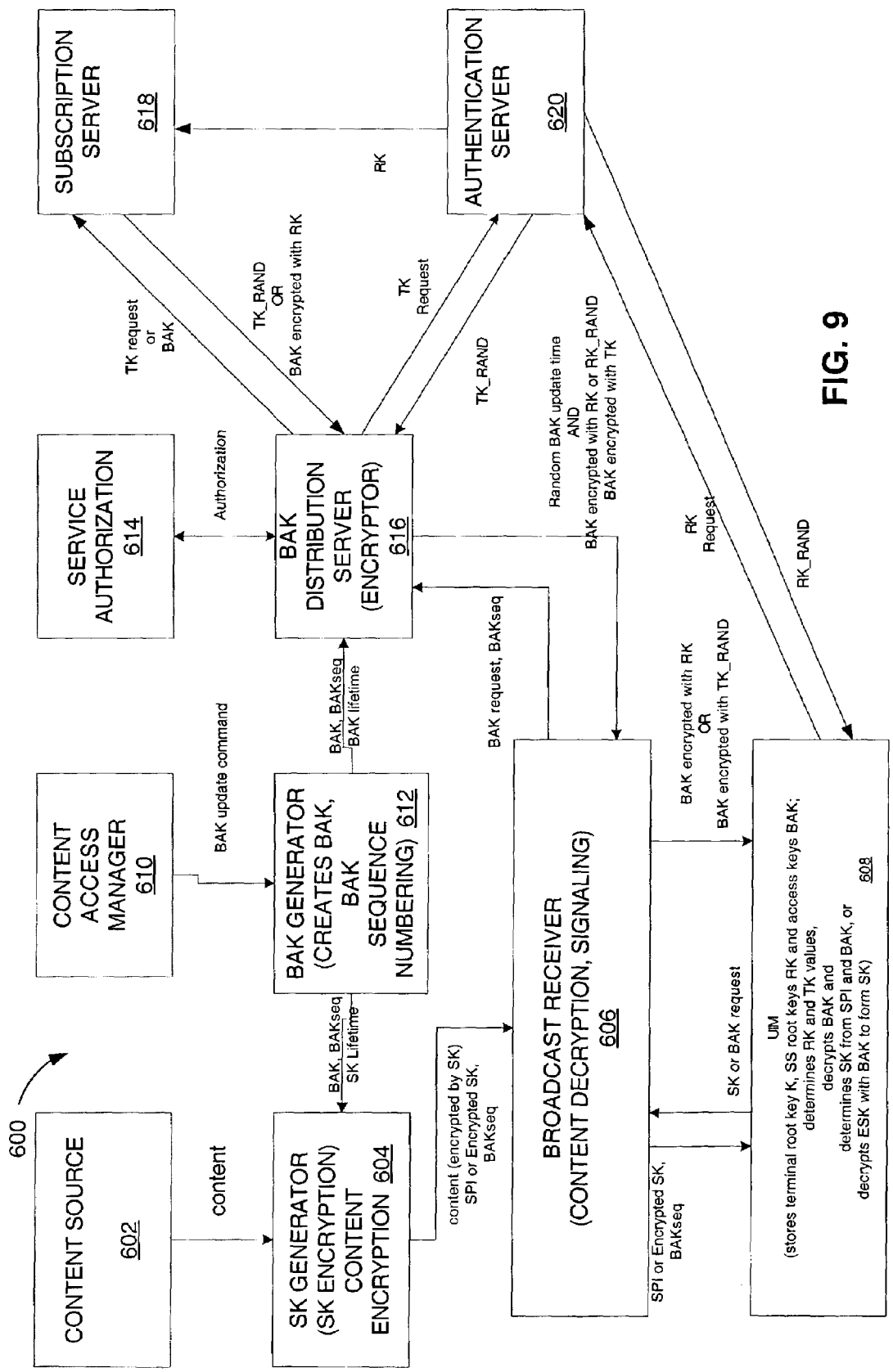
FIG. 9 is a high level architectural diagram illustrating security in a communication system supporting broadcast transmissions.

FIG. 9 illustrates a high level architecture 600 for security according to one embodiment. The CS 602 provides content information to a Content Encryptor (CE) 604. The CE 604 is used for generation of the SK, and may be used for encryption of the SK. The content encryptor 604 provides: 1) the content encrypted with the SK; 2) the SPI; or 3) an Encrypted SK (discussed hereinbelow), to a broadcast receiver 606. Additionally, the CE 604 receives the BAK, the BAKseq (identifies which BAK value) and the SK lifetime (specifies how long the SK is valid) from the BAK generator 612. These values are provided for processing within the CE 604. The CE 604 encrypts the content and provides the encrypted product to the broadcast receiver 606. The CE 604 also provides the BAKseq to the broadcast receiver 606. As the BAK is updated, the BAKseq value identifies the particular BAK. Note that the content encryptor 604 generates the SK. The SK generation may be SPI based or may be an Encrypted SK (ESK).

For the SPI based generation of SK, the SPI may be formed from a 4-bit BAKseq and 28-bit SPI_RAND. The SK for packets when SPI=(BAKseq, SPI_RAND) is generated by encrypting SPI_RAND with BAK, wherein "X_RAND" is a random number used to evaluate X. The SPI change indicates a change in SK. The content encryptor 604 chooses the SPI_RAND, generates the SK, and forms SPI(BAKseq, SPI_RAND). The Content Encryptor (CE) 604 encrypts the content with the SK and sends the SPI with the encrypted content to the broadcast receiver 606. The broadcast receiver 606 extracts the SPI and passes the SPI to the UIM 608, which computes the SK from the SPI_RAND and the BAK. The UIM 608 passes the SK to the broadcast receiver 606, which decrypts content using the SK.

For the ESK, the content encryptor 604 encrypts the SK with the BAK to generate the ESK. The content encryptor 604 chooses the SK and computes the ESK therefrom to form (BAKseq, ESK). The content encryptor 604 encrypts content with the SK and sends (BAKseq, ESK) periodically with the encrypted content to the broadcast receiver 606. The broadcast receiver 606 passes the (BAKseq, ESK) to the UIM 608, which computes the SK and passes the SK back to the broadcast receiver 606. The broadcast receiver 606 then decrypts content using the SK. The BAKseq, ESK) may be sent in a packet with a unique port number, which may introduce synchronization problems.

The broadcast receiver 606 provides content decryption and signaling. The broadcast receiver 606 receives the encrypted content, SPI or ESK and BAKseq from the CE 604. The broadcast receiver 606 provides the SPI or ESK and the BAKseq to the UIM 608, and receives the SK request and/or the BAK request from the UIM 608. Further the broadcast receiver 606 provides the BAK encrypted with the RK or provides the BAK encrypted with the TK_RAND to the UIM 608.

The UIM 608 stores the terminal root key K, the SS root keys RK, and the access keys BAK. The UIM 608 determines the RK and TK values. The UIM 608 decrypts the BAK and determines the SK from the SPI and BAK. In the alternative, the UIM 608 is also adapted to decrypt the ESK using the BAK to form the SK. The UIM 608 passes the SK to the ME (not shown).

A content access manager 610 provides a BAK update command to the BAK generator 612. The BAK generator 612 generates the BAK and the BAK sequence numbering, i.e., BAKseq. The BAK generator 612 provides the BAK, BAKseq, and SK lifetime to the content encryptor 604. The BAK generator 612 provides the BAK, BAKseq, and the BAK lifetime (specifies how long the BAK will be valid) to the BAK distribution server 616. Authorization is provided to the BAK distribution server 616 by a service authorization unit 614. The BAK distribution server 616 receives a BAK request from the broadcast receiver 606. The BAK distribution server 616 is adapted to provide a random BAK update time, BAK encrypted with the RK or RK_RAND, and BAK encrypted with the TK to the broadcast receiver 606.

In a first case, the BAK distribution server 616 receives a BAK request from the broadcast receiver 606, with an identification of which BAK is requested, i.e., BAKseq. In response, the BAK distribution server 616 provides a TK request to the Subscription Server (SS) 618. The SS 618 holds the RK unique key for the SS and the UIM. The SS 618 forms the Temporary Key (TK) from the root key and TK_RAND. The SS 618 then sends the TK_RAND value to the BAK distribution server 616.

In a second case, the BAK distribution server 616 sends the BAK specified by the BAK request and BAKseq received from the broadcast receiver 606 to the SS 618. In response, the SS 618 encrypts the BAK with the RK and returns the encrypted BAK to the BAK distribution server 616.

In still another case, the BAK distribution server 616 sends a TK request to the authentication server 620. The authentication server 620 holds the terminal root key K, and forms the TK and/or RK from the root key and random number(s). The authentication server 620 then sends the TK_RAND to the BAK distribution server 616. Note that as described hereinbelow, the BAK distribution server 616 may also be referred to as a BAK encryptor.

The UIM 608 computes the RK from the RK_RAND provided by the authentication server 620. The authentication server 620 provides the RK_RAND in response to an RK Request from the UIM 608. The authentication server 620 also provides the RK value to the SS 618.

The BAK distribution server 616 provides a random BAK update time to the UIM 608. The random BAK update time instructs the UIM 608 when to request a BAK update. The random timing of such updates ensures that all users do not request updates at the same time and thus tax the system.

Figure 10:
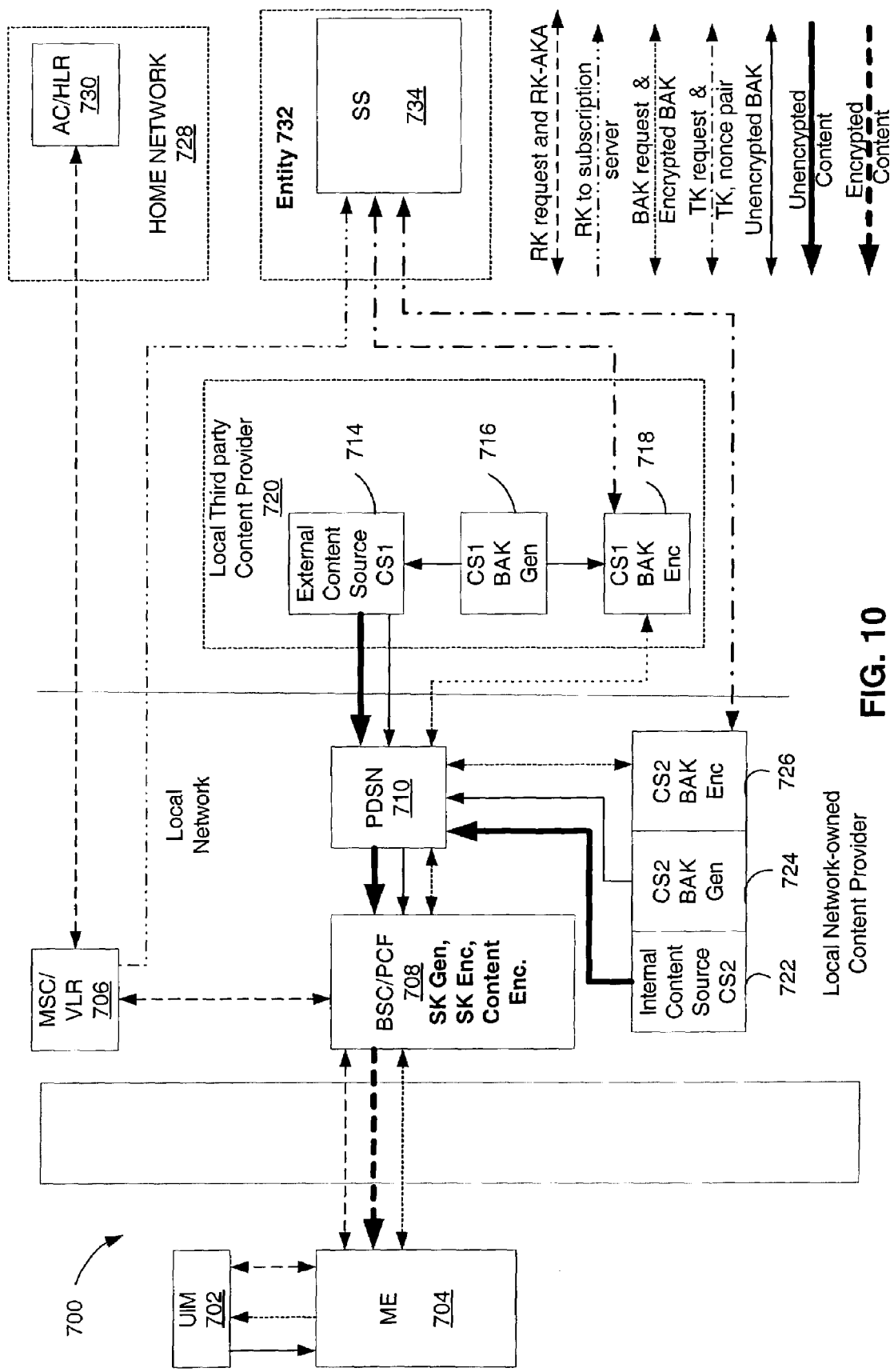
FIG. 10 is a block diagram of a communication system employing link layer content encryption.
Figure 11:
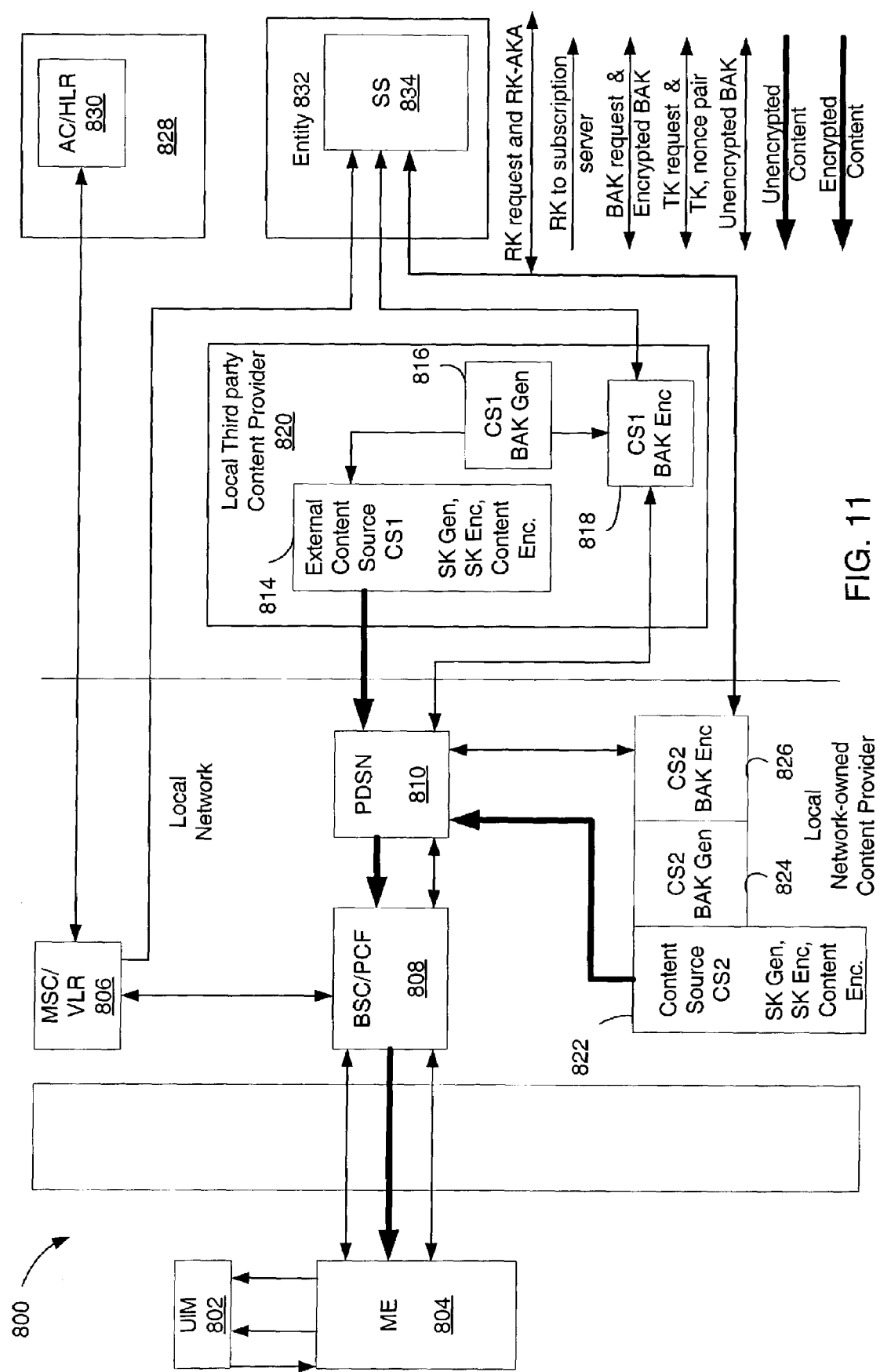
FIG. 11 is a block diagram of a communication system employing end-to-end content encryption.
Figure 12:
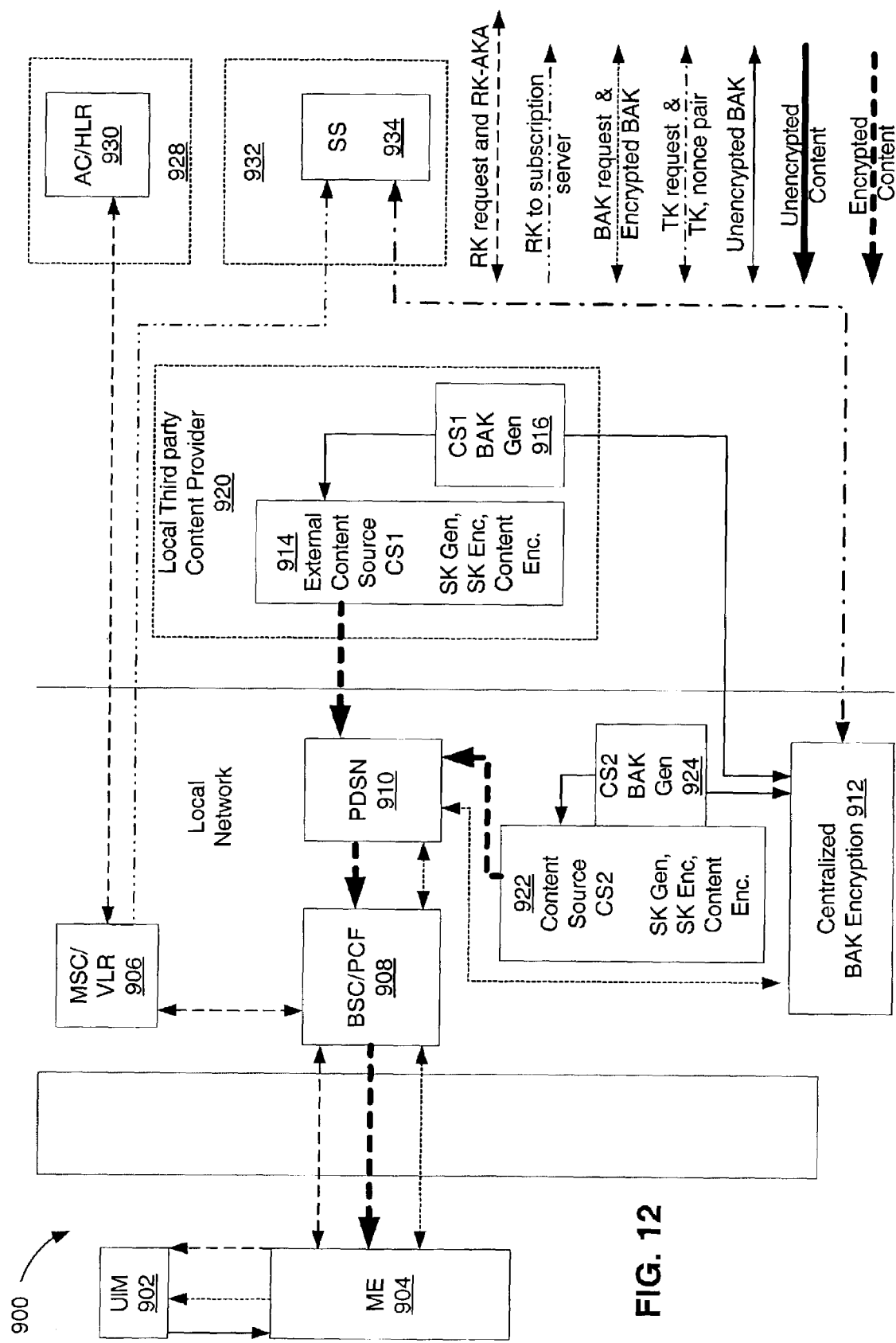
FIG. 12 is a block diagram of a communication system employing centralized BAK encryption.

FIGS. 10, 11, and 12 illustrate various embodiments of encryption and security applications to various system configurations. Each figure includes a legend indicating signal, key and information flow within the system. The legend is located in the lower right hand corner of the figure. As illustrated by these examples, encryption may be performed at the link layer, such as wherein the encryption is performed at a Base Station Controller (BSC), Packet Control Function node (PCF), other similar node, or a combination thereof. One embodiment of a link layer encryption method is illustrated in FIG. 10. Encryption may also be provided on an end-to-end basis, wherein one embodiment is illustrated in FIG. 11. Note that an end-to-end encryption method is described hereinabove through the use of Ipsec. The embodiment illustrated in FIG. 11 performs the encryption at the application layer.

Note that the BAK is periodically or otherwise updated from time to time. The BAK updates may be SS-encrypted, wherein a BAK encryptor sends the BAK to the SS; the SS encrypts the Bak and returns the encrypted BAK to the BAK encryptor. Specifically, the BAK encryptor sends the BAK to the SS. The SS encrypts the BAK with the RK to the Encrypted BAK (EBAK). The SS returns the EBAK to the BAK encryptor. The BAK encryptor sends the EBAK to the UIM, which decrypts the EBAK with the RK to recover the BAK.

In the alternative, the BAK may be locally encrypted. In this case, the SS provides a Temporary Key (TK) to the local BAK encryptor. If the BAK encryptor is in the local network, then the BAK encryptor may use the CK as the TK, wherein the CK is derived from the Authentication Vector (AV).

The location of the BAK encryptor may be designed according to the needs and goals of the system. The BAK encryptor obtains the (TK_RAND, TK) pair from the SS. In one embodiment, the TK is given as:

$$TK=f(TK\_RAND, RK). \tag{11}$$

The BAK encryptor may reuse the (TK_RAND, TK) pair. The SS may send multiple pairs. The BAK encryptor then encrypts the BAK with the TK for form EBAK. The BAK encryptor then sends (TK_RAND, EBAK) to the UIM. The UIM forms the TK using Equ. (11) given above. The UIM decrypts the EBAK with the TK to recover the BAK.

In an alternate embodiment, the BAK update is locally encrypted with the TK from the Authentication, Accounting, and Authorization (AAA) unit, HLR/AAA. In this case, the SS is the HLR/AAA. The MS performs a special AKA negotiation. The Authorization Vector (AV) includes a CK, wherein the CK is defined as:

$$CK=f(CK\_RAND, K), \tag{12}$$

Wherein K is equal to the A-key root key at the HLR or home network. The BAK encryptor may reuse the (CK_RAND, CK) pair; the HLR/AAA may send multiple pairs.

The CK and CK_RAND are passed to the BAK encryptor, which encrypts the BAK with the CK to form EBAK. The BAK encryptor then sends the (CK_RAND, EBAK) pair to the UIM. In response, the UIM forms CK as defined in Equ. (12). The UIM decrypts EBAK with the CK to form the BAK.

In one embodiment, the BAK encryptor is associated with a single Content Server (CS). In an alternate embodiment, such as illustrated in FIG. 12, a centralized BAK encryptor is employed that may be associated with multiple CSs.

The SK is updated periodically or from time to time. In one embodiment, the SK is derived from the SPI. In an alternate embodiment, the SK is provided in encrypted form. A special port number may be used to indicate the packet containing the SK. For example, a Broadcast frame identifier, such as the BSR_ID, may be set to a predetermined value, such as "000," to indicate the packet containing the SK.

FIG. 10 illustrates one embodiment providing link layer content encryption. The system 700 includes a UIM 702 coupled to an ME 704. The UIM 702 provides an unencrypted BAK to the ME 704. The ME 704 provides an encrypted BAK to the UIM 702. Similarly, the ME 704 provides the RK-AKA to the UIM 702. As illustrated, SK generation, SK encryption, and content encryption are performed by the Base Station Controller/Packet Control Function (BSC/PCF) node 708 at the local network owned content provider. Unencrypted content is provided from an internal content source (CS2) 722 to the Packet Data Service Node (PDSN) 710. The PDSN 710 then passes the unencrypted content to the BSC/PCF 708. A CS2 BAK generator 724 provides the unencrypted BAK value to the PDSN 710; and the CS2 BAK encryptor 726 receives a BAK request from the PDSN 710 and provides an encrypted BAK in return. The PDSN 710 then forwards the unencrypted content, the unencrypted BAK and the encrypted BAK to the BSC/PCF 708.

The local network includes an MSC 706, which serves as the VLR. The BSC/PCF 708 receives the RK from the MSC 706 in response to an RK request. An AC 730 located in the home network 728 serves as the HLR. The MSC requests the RK from the AC 730, which responds by providing the RK. The MSC 706 provides the RK to the BSC/PCF 708, which provides the RK to the ME 704. Further, the BSC/PCF 708 provides the encrypted content and encrypted BAK to the ME 704.

A local third party content provider 720 includes an external content source (CS1) 714, a CS1 BAK generator 716, and a CS1 BAK encryptor 718. The encrypted BAK is provided from BAK encryptor 718 to the PDSN 710. The external content source CS1 714 provides unencrypted content and unencrypted BAK to the PDSN 710.

The entity 732 that stores the subscription includes the subscription server 734. The MSC 706 provides the RK to the subscription server 734. The TK request and TK_RAND pair are communicated between the subscription server 734 and the BAK encryptors 718 and 726. The signal sequence is as given in the legend of FIG. 10, wherein signals are listed in descending order starting with the RK Request.

FIG. 11 illustrates an alternate embodiment providing end-to-end content encryption. The configuration of system 800 is similar to that of system 700; however, in system 800, the content source (CS2) 822 provides the SK generation, SK encryption, and content encryption. The content source 822 provides encrypted content to the PDSN 810; and the BAK encryptor 826 encrypts the BAK and provides the encrypted BAK to the PDSN 810 in response to a BAK request. The PDNS further receives encrypted content from the external content source (CS1) 814 within the local third party content provider 820. As in the content source 822, the external content source 814 performs SK generation, SK encryption and content encryption. The BAK encryptor 818 provides an encrypted BAK to the PDSN 810. The PDSN 810 then provides the encrypted content and the encrypted BAK to the BSC/PCF 808.

FIG. 12 illustrates an embodiment providing centralized BAK encryption, with end-to-end content encryption. The configuration of system 900 is similar to that of system 800, wherein the SK generation, SK encryption, and content encryption are performed by content source (CS2) 922 and external content source (CS1) 914. System 900 includes a centralized BAK encryptor 912 that receives the unencrypted BAK from the CS2 BAK generator 924 and the CS1 BAK generator 916. In response the centralized BAK encryptor 912 provides an encrypted BAK to the PDSN 910 in response to a BAK request. The centralized BAK encryptor 912 further communicates with the subscription server 932 to negotiate the TK request and TK_RAND/pair.

Figure 13:
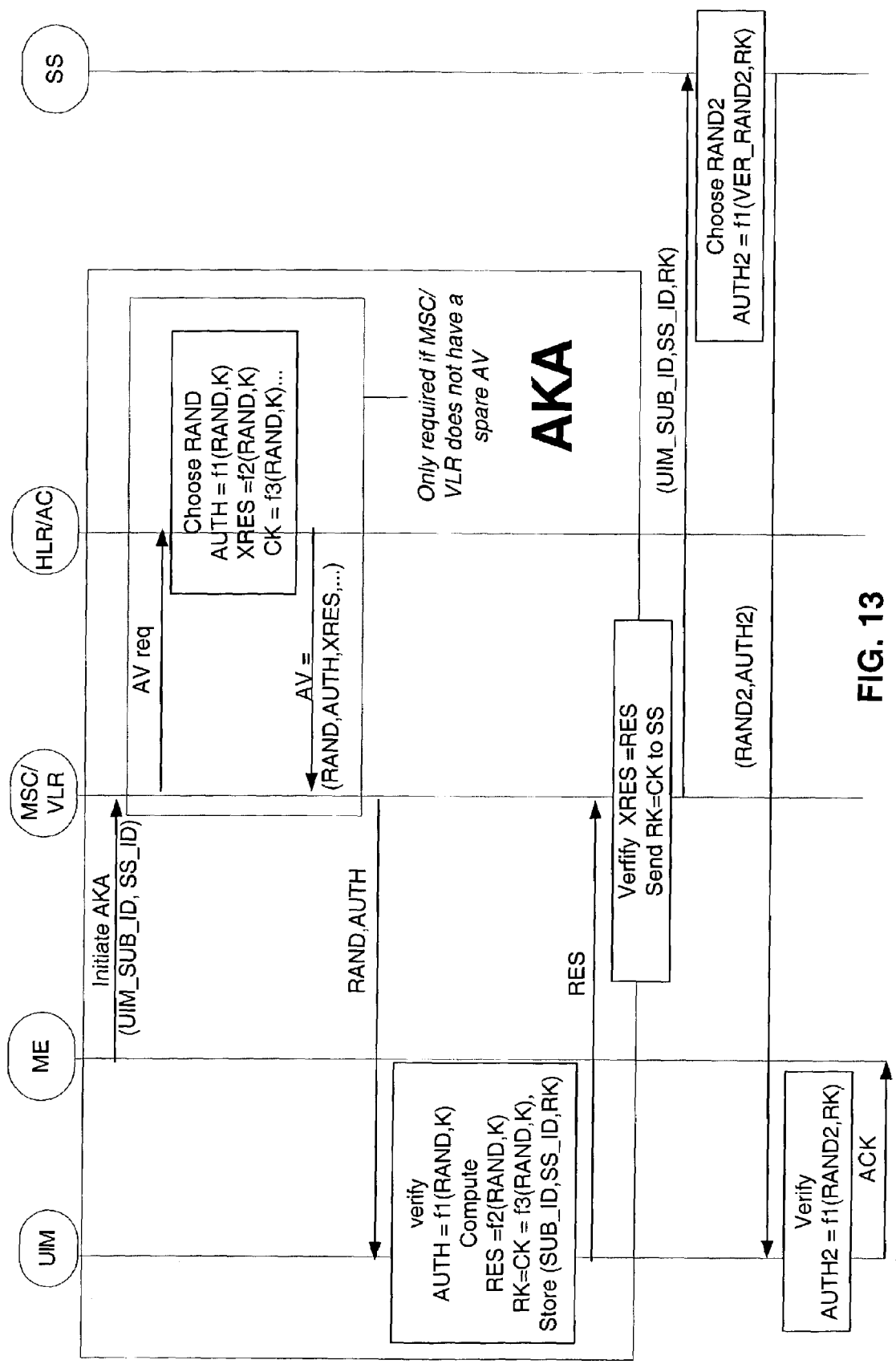
FIG. 13 is a timing diagram illustrating provisioning the Registration Key (RK) in a communication system.

FIG. 13 is a timing diagram for provisioning the RK. The vertical axis provides the time axis, and system elements are provided on the top horizontal axis. The ME initiates the Authenticated Key Agreement (AKA) procedure by sending a message to the MSC, acting as a VLR. The AKA procedure is identified within the block so labeled. The MSC then sends an Authentication Vector (AV) request to the HLR. The HLR selects a RAND value and generates the AV therefrom. The AV may include a random number RAND, as well as variables given as:

$$AUTH = f1(RAND, K) \qquad (13)$$

$$XRES = f2(RAND, K) \qquad (14)$$

$$CK = f3(RAND, K), \qquad (15)$$

Wherein f1, f2, f3, etc. are meant to indicate different functions for computing each of the variables.

The HLR provides the AV to the MSC or VLR. Note that if the MSC has a spare AV, the spare is used and there is no need to request an AV from the HLR. Information from the AV is forwarded to the UIM, which verifies authentication and computes processing variables. Such processing is then verified by the MSC. The MSC verifies the authentication by computing AUTH as described in Equ. (13), and further by computing the following variables:

$$RES = f2(RAND, K) \qquad (16)$$

$$RK = CK = f3(RAND, K). \qquad (17)$$

The RK value is sent to the SS, which continues the verification process. The SS then performs a further verification by selecting a random number RAND2 and computing:

$$AUTH2 = f1(VER\_RAND2, RK). \qquad (18)$$

The SS provides authentication information to the UIM, which verifies authentication and acknowledges (or negative acknowledges) to the ME.

Figure 14:
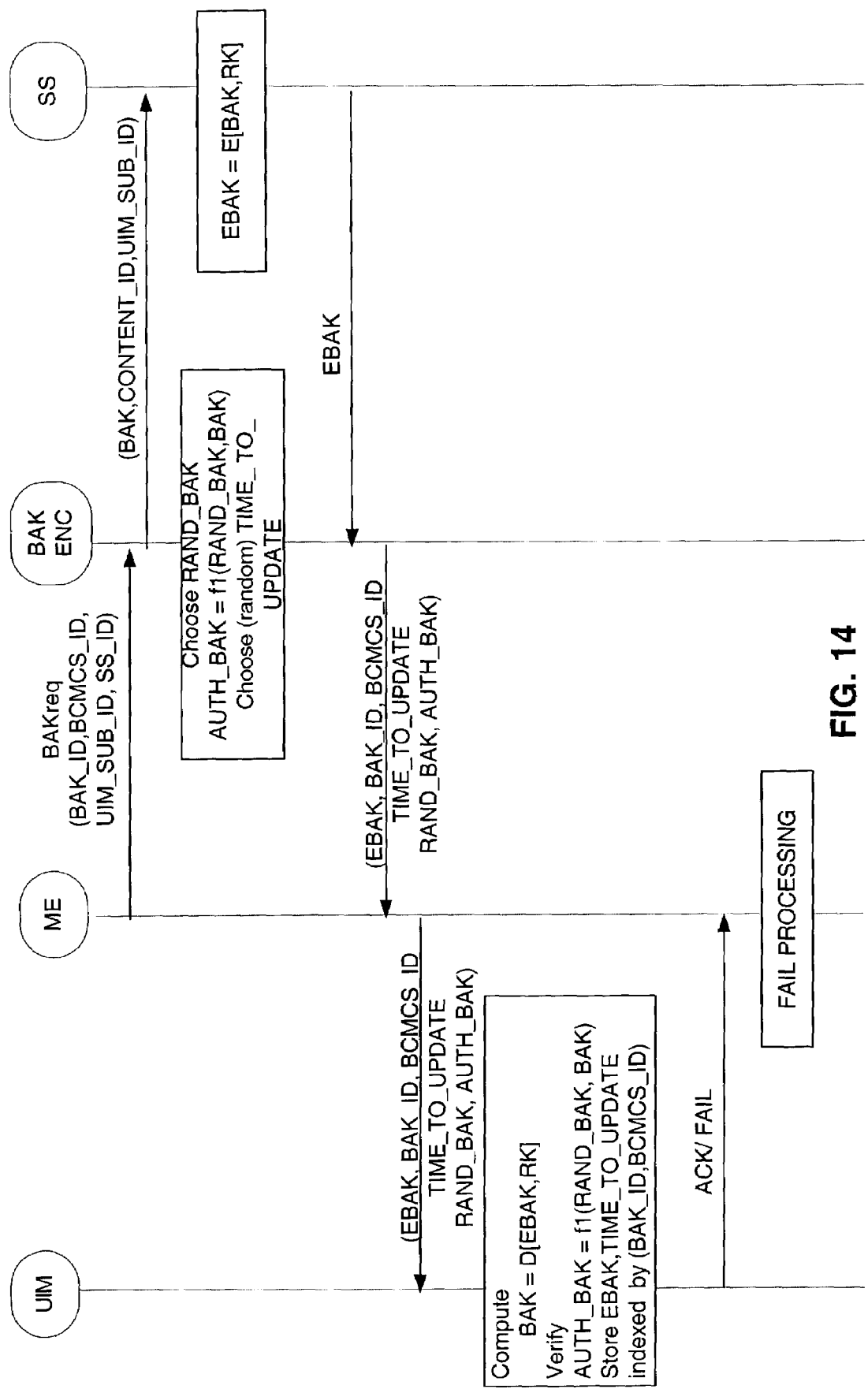
FIG. 14 is a timing diagram illustrating Subscription Server (SS) encryption of the Broadcast Access Key (BAK) in a communication system.

FIG. 14 is a timing diagram illustrating the generation of the SS encrypted BAK value. Refer to FIG. 9, for the example of the BAK distribution server (or encryptor) 616 sends a BAK request to the SS 618, and the SS 618 encrypts the BAK with the RK to form the EBAK. The SS 618 sends the EBAK to the BAK distribution server 616. As illustrated in FIG. 14, the ME requests the BAK from the SS via the BAK encryptor. The ME sends a BAKreq message to the BAK encryptor. The BAK encryptor then sends the BAK and associated information to the SS. The SS receives the BAK and generates an Encrypted BAK (EBAK). The EBAK is forwarded to the UIM which decrypts the EBAK to recover the BAK, wherein such computation is given as:

$$BAK = D[EBAK, RK], \quad (19)$$

wherein D[ ] is the decryption operator. The UIM further verifies the BAK by computing:

$$AUTH\_BAK = f1(RAND\_BAK, BAK). \quad (20)$$

The UIM sends an acknowledge or fail message in response to such verification. On a fail, failure processing is performed or initiated by the ME. Note that as given throughout, the various functions for calculating variables may be a same function or each may be individually assigned.

Figure 15:
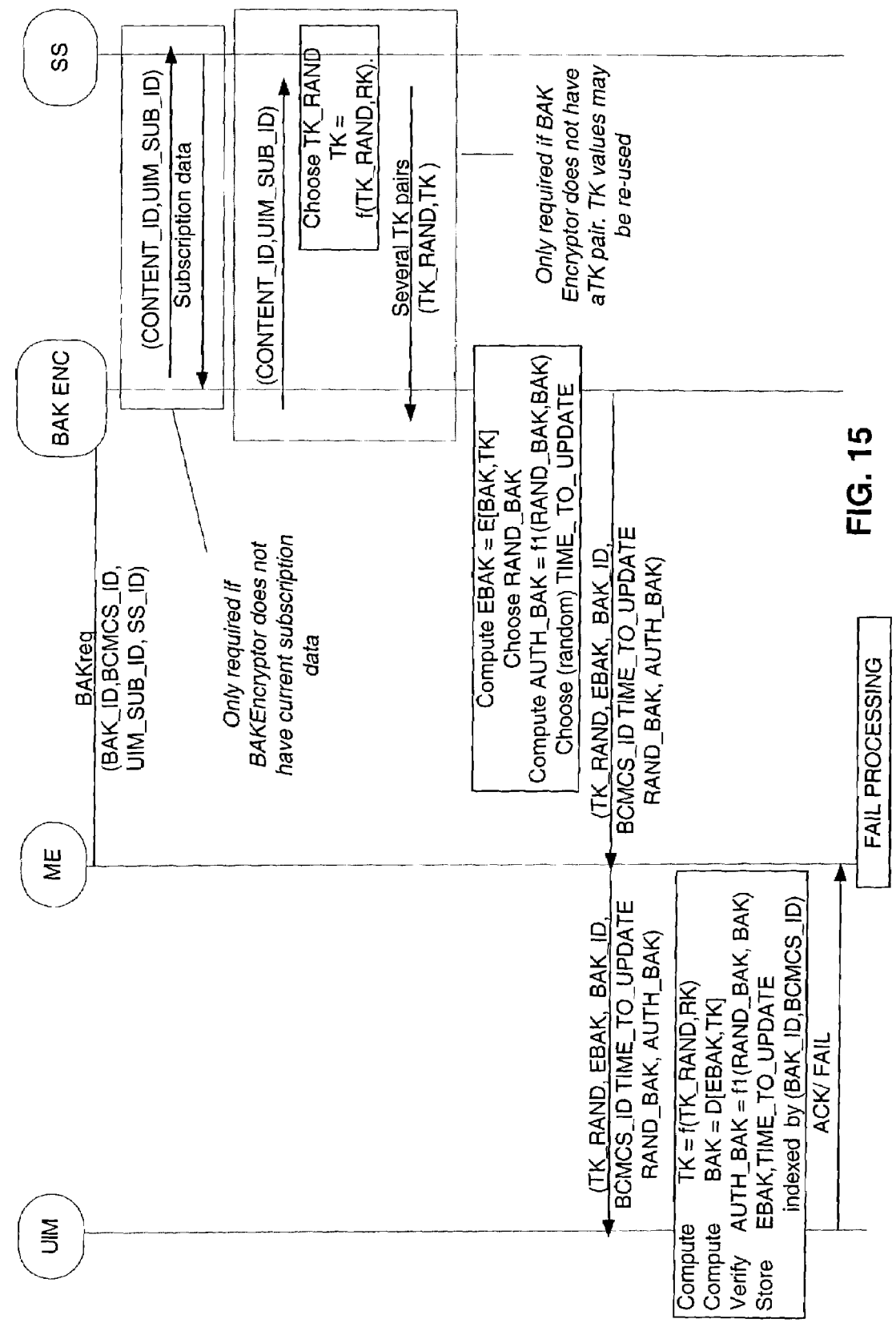
FIG. 15 is a timing diagram illustrating locally encrypted BAK in a communication system.

FIG. 15 is a timing diagram illustrating the locally encrypted BAK processing. Refer to FIG. 9, for the example of the BAK distribution server (or encryptor) 616 sends a TK request to the SS 618, and the SS 618 forms TK from the root key and a random number TK_RAND. The SS 618 sends the TK_RAND to the BAK distribution server 616. The BAK distribution server 616 then encrypts the BAK with the TK_RAND. As illustrated in FIG. 15, the ME sends a BAKreq message to the BAK encryptor. If the BAK encryptor does not have current subscription data, the BAK encryptor requests such from the SS. If the BAK encryptor does not have a TK pair, the SS chooses a random number TK_RAND, and computes TK as:

$$TK = f(TK\_RAND, RK). \quad (21)$$

The SS sends several (TK_RAND, TK) pairs to the BAK encryptor. The BAK encryptor computes EBAK by encrypting the BAK with the TK. The BAK encryptor then provides the EBAK, the TK_RAND, as well as other BAK information to the ME, which forwards such information to the UIM. The UIM computes TK according to Equ. (21), computes EBAK according to Equ. (19) and computes AUTH_BAK according to Equ. (20). The UIM verifies the BAK and sends an acknowledge or fail message to the ME accordingly. On a fail, fail processing is performed or initiated by the ME.

Figure 16:
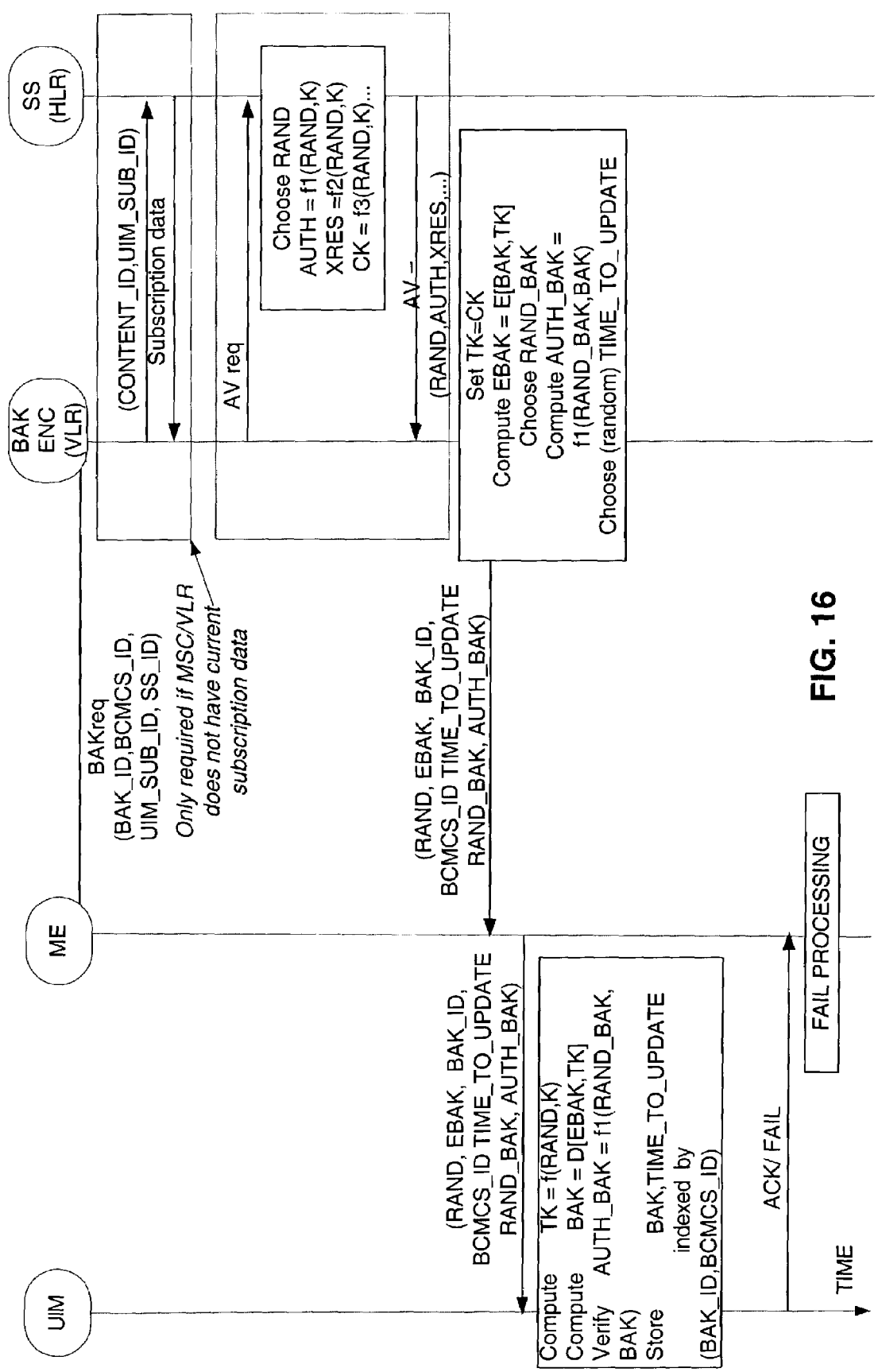
FIG. 16 is a timing diagram illustrating generation of the Temporary Key (TK) using the Authentication Vector (AV) in a communication system.

FIG. 16 illustrates security processing when the local BAK has received the AV during an initial authentication procedure, and then uses the random value from the AV to generate the TK. In this situation, the BAK encryptor is the VLR. The BAK encryptor sends an AV request to the SS (which is considered the HLR). In response, the SS chooses a random number RAND and computes AUTH, XRES, and CK as given in Equs. (13), (14), and (15), respectively. The SS sends the AV to the BAK encryptor, which encrypts the BAK to form EBAK. The BAK encryptor then sends RAND, EBAK, and BAK information to the ME, which forwards such information to the UIM. The UIM computes TK according to Equ. (21), computes EBAK according to Equ. (19) and computes AUTH_BAK according to Equ. (20). The UIM verifies the BAK and sends an acknowledge or fail message to the ME accordingly. On a fail, fail processing is performed or initiated by the ME.

Figure 17:
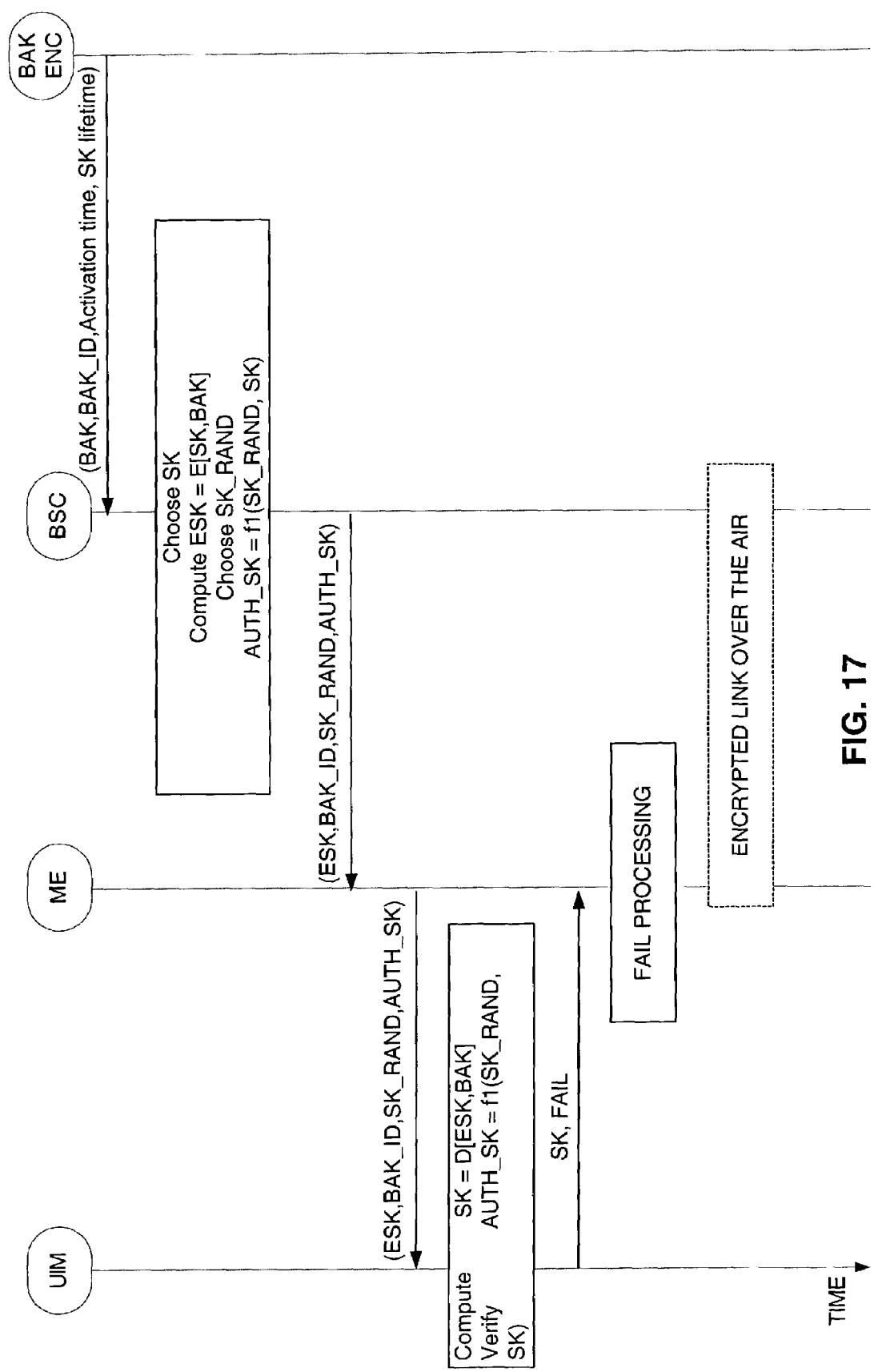
FIG. 17 is a timing diagram illustrating link layer encryption in a communication system.

FIG. 17 is a timing diagram illustrating link layer encryption, wherein the BSC encrypts the SK and the content. Refer to FIGS. 9 and 10, wherein the BSC 708 performs SK generation, SK encryption and content encryption. As illustrated in FIG. 17, the BAK encryptor provides the BAK, as well as BAK and SK information, to the BSC. The BSC chooses a SK and encrypts the SK using the BAK to form the ESK. The BSC further chooses a random number SK_RAND and computes an authentication variable AUTH_SK, given as:

$$AUTH\_SK = f1(SK\_RAND, SK). \quad (22)$$

The BSC provides the ESK, SK_RAND, AUTH_SK, and BAK information to the ME, which forwards such information to the UIM. The UIM computes the SK as:

$$SK = D[ESK, BAK], \quad (23)$$

and AUTH_SK as given in Equ. (22). The UIM then sends the SK or a fail message to the ME. For a fail, the ME performs or initiates fail processing. For verification of the SK, an encrypted link is now available for secure communication.

Key verification is a further security consideration in a communication system. If there has been some confusion in communication and/or processing of the SS, BAK encryptor, etc., an incorrect value key may be derived in the UIM. There is a need therefore, for the UIM to determine if the RK, BAK and SK have been provisioned correctly. According to one embodiment, verification is performed by using a random number associated with a given key, and performing a verification operation for the given key using the random number. The verification result is then sent to the UIM. The UIM checks the verification result. For example, let Kx represent RK, BAK, SK or any other key designated for encryption in a communication system. The entity that has established the key Kx first chooses a random number RAND_Kx. The entity then computes a verification result given as:

$$VERIF\_Kx = f(RAND\_Kx, Kx). \quad (24)$$

The entity then sends the (RAND_Kx, VERIF_Kx) pair to the UIM. The UIM then determines if the Kx is correct by checking the verification result as defined in Equ. (24). If the verification result is correct, the UIM accepts the keys. Else, the UIM performs key verification error processing, which may include notifying the entity or entities involved that a key is incorrect. If the entity receives no response from the UIM, the entity assumes the key was received correctly.

Similarly, BAK verification may be implemented, wherein prior to sending the EBAK to the UIM, the BAK encryptor performs a verification procedure. The BAK encryptor chooses a random number RAND_BAK, and computes a verification result as:

$$VERIF\_BAK = f1(RAND\_BAK, BAK), \quad (25)$$

wherein BAK is the key being verified. The BAK encryptor sends (EBAK, RAND_BAK, VERIF_BAK) to the UIM. The BAK encryptor may send additional information as well. The UIM decrypts the EBAK and confirms Equ. (25). On confirmation, the UIM uses the BAK value derived, else, the UIM notifies the BAK encryptor that the BAK is not correct.

Note that in key verification, RAND_Kx could include a value for the TIME. In this case, VERIF_Kx becomes a "timestamp" verifying when Kx was sent to the UIM. This prevents a replay attack when someone tries to confuse the UIM by sending the same packet, only at sometime later when the key has already been used. The UIM will detect that TIME is wrong. An attacker can't change TIME because this will also change the value of VERIF_Kx.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for a remote station to extract data from at least one encrypted packet of data provided by a broadcast service, comprising:
   receiving a broadcast access key for the broadcast service;
   receiving an encrypted packet of data from a plurality of encrypted packets of data, wherein the each encrypted packet of data is associated with one short-term key from a plurality of short-term keys, wherein each short-term key is associated with a first number,
   receiving the first number corresponding to the short-term key associated with the encrypted packet of data;
   generating the short-term key using the broadcast access key and the first number;
   extracting a packet of data from the encrypted packet of data using the short-term key;
   encrypting the broadcast access key to form an encrypted broadcast access key comprising:
      storing a root key in the secure memory storage unit, wherein the root key is associated with the secure memory storage unit, wherein the root key is also stored in a fifth server,
      wherein the fifth server is part of a first server, and
      wherein extracting the encrypted broadcast access key further comprises:
         decrypting the EBAK based on the root key stored in the secure memory storage unit;
      storing the encrypted broadcast access key in a secure memory storage unit; and extracting the encrypted broadcast access key (EBAK) from the secure memory storage unit.

2. The method as in claim 1, wherein the fifth server also performs the functions of authorization, authentication and accounting for broadcast service.

3. The method as in claim 2, wherein the fifth server is a home content server.

4. The method as in claim 2, wherein the fifth server is part of a mobile network.

5. The method as in claim 2, wherein the root key is used for authentication in mobile networks and is known only to the fifth server and the secure memory storage unit.

6. The method as in claim 4, wherein the mobile network is a Code Division-Multiple Access network.

7. The method as in claim 4, wherein the mobile network is a Global System Mobile network.

8. The method as in claim 4, wherein the mobile network is a Wideband Code Division-Multiple Access network.

9. A method for a remote station to extract data from at least one encrypted packet of data provided by a broadcast service, comprising:
   receiving a broadcast access key for the broadcast service;
   receiving an encrypted packet of data from a plurality of encrypted packets of data, wherein the each encrypted packet of data is associated with one short-term key from a plurality of short-term keys, wherein each short-term key is associated with a first number;
   receiving the first number corresponding to the short-term key associated with the encrypted packet of data;
   generating the short-term key using the broadcast access key and the first number;
   extracting a packet of data from the encrypted packet of data using the short-term key;
   encrypting the broadcast access key to form an encrypted broadcast access key comprising:
      storing a root key in the secure memory storage unit, wherein the root key is associated with the secure memory storage unit; and wherein extracting the encrypted broadcast access key further comprises:
  decrypting the EBAK based on the root key stored in the secure memory storage unit;
storing the encrypted broadcast access key in a secure memory storage unit; and
extracting the encrypted broadcast access key (EBAK) from the secure memory storage unit wherein the mobile network is a Global System for mobile (GSM) network.

10. A method for a remote station to extract data from at least one encrypted packet of data provided by a broadcast service, comprising:
  receiving a broadcast access key for the broadcast service;
  receiving an encrypted packet of data from a plurality of encrypted packets of data, wherein the each encrypted packet of data is associated with one short-term key from a plurality of short-term keys, wherein each short-term key is associated with a first number;
  receiving the first number corresponding to the short-term key associated with the encrypted packet of data;
  generating the short-term key using the broadcast access key and the first number;
  extracting a packet of data from the encrypted packet of data using the short-term key;
  encrypting the broadcast access key to form an encrypted broadcast access key;
  storing the encrypted broadcast access key in a secure memory storage unit; and
  extracting the encrypted broadcast access key (EBAK) from the secure memory storage unit comprising:
    receiving the encrypted broadcast access key and a second number and storing the encrypted broadcast access key and the second number in the secure memory storage unit.

11. A method for a remote station to extract data from at least one encrypted packet of data provided by a broadcast service, comprising:
  receiving a broadcast access key for the broadcast service;
  receiving an encrypted packet of data from a plurality of encrypted packets of data, wherein the each encrypted packet of data is associated with one short-term key from a plurality of short-term keys, wherein each short-term key is associated with a first number;
  receiving the first number corresponding to the short-term key associated with the encrypted packet of data;
  generating the short-term key using the broadcast access key and the first number;
  extracting a packet of data from the encrypted packet of data using the short-term key;
  encrypting the broadcast access key to form an encrypted broadcast access key;
  storing the encrypted broadcast access key in a secure memory storage unit; and
  extracting the encrypted broadcast access key (EBAK) from the secure memory storage unit comprising:
    determining a Temporary Key (TK);
    storing the TK in the secure memory storage unit; and
    decrypting the EBAK using the TK to form the Broadcast Access Key (BAK).

12. The method as in claim 11, wherein determining the TK comprises:
  determining the TK associated with a second number stored in the secure memory storage unit.

13. The method as in claim 12, wherein determining the TK associated with the second number comprises:
  forming the TK from the second number and a second root key stored in the secure memory storage unit, wherein the second root key is uniquely associated with the secure memory storage unit.

14. The method as in claim 13, wherein forming the TK from the second number and the second root key comprises:
  storing the second root key in the secure memory storage unit.

15. The method as in claim 13, wherein forming the TK from the second number and the second root key comprises:
  encrypting the second root key to form an encrypted second root key;
  storing the encrypted second root key at the remote station.

16. The method as in claim 13, wherein the value of the second root key is known only to the fifth server and the secure memory storage unit.

17. The method as in claim 13, wherein the second root key is used for authentication in mobile networks.

18. The method as in claim 17, wherein the mobile network is a CDMA network.

19. The method as in claim 17, wherein the mobile network is a GSM network.

20. The method as in claim 17, wherein the mobile network is a WCDMA network.

21. A method for a remote station to extract data from at least one encrypted packet of data provided by a broadcast service, comprising:
  receiving a broadcast access key for the broadcast service wherein receiving the broadcast access key comprises requesting the broadcast access key from a first server;
  receiving an encrypted packet of data from a plurality of encrypted packets of data, wherein the each encrypted packet of data is associated with one short-term key from a plurality of short-term keys, wherein each short-term key is associated with a first number;
  receiving the first number corresponding to the short-term key associated with the encrypted packet of data;
  generating the short-term key using the broadcast access key and the first number; and
  extracting a packet of data from the encrypted packet of data using the short-term key.

22. A method for a remote station to extract data from at least one encrypted packet of data provided by a broadcast service, comprising:
  receiving a broadcast access key for the broadcast service;
  receiving an encrypted packet of data from a plurality of encrypted packets of data, wherein the each encrypted packet of data is associated with one short-term key from a plurality of short-term keys, wherein each short-term key is associated with a first number;
  receiving the first number corresponding to the short-term key associated with the encrypted packet of data, wherein receiving the encrypted packet of data and the associated first number comprises receiving the associated first number with each encrypted packet of data;
  generating the short-term key using the broadcast access key and the first number; and
  extracting packet of data from the encrypted packet of data using the short-term key.

23. The method of claim 22, wherein requesting the broadcast access key from a first server is prior to an expiration time of a current broadcast access key.

24. A method for a remote station to extract data from at least one encrypted packet of data provided by a broadcast service, comprising:

receiving a broadcast access key for the broadcast service;
receiving an encrypted packet of data from a plurality of encrypted packets of data, wherein the each encrypted packet of data is associated with one short-term key from a plurality of short-term keys, wherein each short-term key is associated with a first number;
receiving the first number corresponding to the short-term key associated with the encrypted packet of data, wherein the first number is received with at least one encrypted packet of data;
generating the short-term key using the broadcast access key and the first number; and
extracting a packet of data from the encrypted packet of data using the short-term key.

25. A method for a remote station to extract data from at least one encrypted packet of data provided by a broadcast service, comprising:
receiving a broadcast access key for the broadcast service at the remote station comprising:
receiving a broadcast access key expiration indicator wherein the broadcast access key expiration indicator identifies an expiration time of the broadcast access key;
receiving an encrypted packet of data from a plurality of encrypted packets of data, wherein the each encrypted packet of data is associated with one short-term key from a plurality of short-term keys, wherein each short-term key is associated with a first number;
receiving the first number corresponding to the short-term key associated with the encrypted packet of data;
generating the short-term key using the broadcast access key and the first number, and
extracting a packet of data from the encrypted packet of data using the short-term key.

26. A method for a remote station to extract data from at least one encrypted packet of data provided by a broadcast service, comprising:
receiving a broadcast access key for the broadcast service at the remote station comprising:
authorizing the remote station to provide the broadcast service;
receiving an encrypted packet of data from a plurality of encrypted packets of data, wherein the each encrypted packet of data is associated with one short-term key from a plurality of short-term keys, wherein each short-term key is associated with a first number;
receiving the first number corresponding to the short-term key associated with the encrypted packet of data;
generating the short-term key using the broadcast access key and the first number; and
extracting a packet of data from the encrypted packet of data using the short-term key.

27. A method for a remote station to extract data from at least one encrypted packet of data provided by a broadcast service, comprising:
receiving a broadcast access key for the broadcast service;
receiving an encrypted packet of data from a plurality of encrypted packets of data, wherein the each encrypted packet of data is associated with one short-term key from a plurality of short-term keys, wherein each short-term key is associated with a first number;
receiving the first number corresponding to the short-term key associated with the encrypted packet of data;
generating the short-term key using the broadcast access key and the first number;
extracting a packet of data from the encrypted packet of data using the short-term key; and
storing the broadcast access key in a secure memory storage unit,
wherein receiving the broadcast access key comprises authorizing the secure memory storage unit to provide the short-term keys to the remote station, wherein the first server authorizes the secure memory storage unit.

28. A method for a remote station to extract data from at least one encrypted packet of data provided by a broadcast service, comprising:
receiving a broadcast access key for the broadcast service;
receiving an encrypted packet of data from a plurality of encrypted packets of data, wherein the each encrypted packet of data is associated with one short-term key from a plurality of short-term keys, wherein each short-term key is associated with a first number;
receiving the first number corresponding to the short-term key associated with the encrypted packet of data;
generating the short-term key using the broadcast access key and the first number;
extracting a packet of data from the encrypted packet of data using the short-term key; and
storing the broadcast access key in a secure memory storage unit,
wherein the secure memory storage unit is a User Identity Module (UIM) adapted for use in a wireless device supporting spread spectrum protocols.

29. A method for encryption key management in a communication system supporting broadcast services, comprising:
generating a short-term key using a broadcast access key;
encrypting a packet of data using the short-term key;
broadcasting the encrypted packet of data; and
sending the broadcast access key from a first server to a remote station comprising:
generating the broadcast access key in a fourth server.

30. A method for encryption key management in a communication system supporting broadcast services, comprising:
generating a short-term key using a broadcast access key;
encrypting a packet of data using the short-term key;
broadcasting the encrypted packet of data;
sending the broadcast access key from a first server to a remote station;
generating a first random value in the fourth server; and
assigning the first random value to the broadcast access key in a fourth server.

31. A method for encryption key management in a communication system supporting broadcast services, comprising:
generating a short-term key using a broadcast access key BAK;
encrypting a packet of data using the short-term key;
broadcasting the encrypted packet of data: and
sending the broadcast access key from a first server to a remote station,
wherein the first server stores details of BAK values provided to the secure memory storage unit, wherein the details are used for accounting.

32. The method as in claim 31, wherein transmitting the encrypted broadcast access key comprises:
sending a broadcast access key expiration indicator, wherein the broadcast access key expiration indicator identifies an expiration time of the broadcast access key.

33. A method for encryption key management in a communication system supporting broadcast services, comprising:

generating a short-term key using a broadcast access key;
encrypting a packet of data using the short-term key;
broadcasting the encrypted packet of data;
forming an Encrypted Broadcast Access Key (EBAK) from the broadcast access key at a first server; and
transmitting the encrypted broadcast access key.

34. The method as in claim 33, wherein forming the Encrypted Broadcast Access Key (EBAK) comprises:
encrypting the broadcast access key using a Temporary Key (TK) at the first server.

35. The method as in claim 34, further comprising:
receiving the TK from a fifth server at the first server.

36. The method as in claim 35, further comprising:
receiving a second value and the TK from the fifth server at the first server.

37. The method as in claim 36, wherein the second value is generated at the fifth server.

38. The method as in claim 37, wherein the second value is a random value.

39. The method as in claim 35, wherein sending the TK comprises:
authorizing the first server to provide the broadcast service to the secure memory storage unit.

40. The method as in claim 35, wherein sending the broadcast access key from the first server to the remote station comprises:
sending a second number from the first server o the remote station.

41. The method as in claim 40, wherein the TK is generated from the second number and a second root key, wherein the second root key is uniquely associated with the secure memory storage unit.

42. The method as in claim 41, wherein forming the TK from the second number and the second root key in the fifth server comprises:
storing the second root key in the fifth server.

43. The method as in claim 42, wherein the TK is formed from the second number and the second root key using a pseudo-random number generator.

44. The method as in claim 42, wherein the TK is formed from the second number and the second root key using a cryptographic hash function.

45. The method as in claim 42, wherein the TK is formed from the second number and the second root key using an encryption function.

46. The method as in claim 42, wherein the second root key is a key used for authentication in mobile networks.

47. The method as in claim 42, wherein the mobile network is a CDMA network.

48. The method as in claim 42, wherein the second root key is used for authentication and key generation.

49. The method as in claim 42, wherein the second root key is the key used for AKA authentication and key generation.

50. The method as in claim 49, wherein the communication system is a Wideband CDMA (WCDMA) system.

51. The method as in claim 35, wherein the fifth server also performs the functions of authorization, authentication and accounting for broadcast service.

52. The method as in claim 51, wherein the fifth server is the home content server.

53. A method for encryption key management in a communication system supporting broadcast services, comprising:
generating a short-term key using a broadcast access key; and
encrypting a packet of data using the short-term key;
broadcasting the encrypted packet of data,
wherein generating the short-term key comprises:
generating the short-term key using the broadcast access key and a first number at a second server; and
determining a value of the first number at the second server, comprising determining at least part of the first number from a value not controlled by the second server.

54. The method of claim 53, wherein the value is generated by incrementing a counter.

55. The method of claim 53, wherein the value is generated as a function of time.

56. A method for encryption key management in a communication system supporting broadcast services, comprising:
generating a short-term key using a broadcast access key;
encrypting a packet of data using the short-term key;
broadcasting the encrypted packet of data and an associated first number, the broadcasting comprising:
sending the first number with each encrypted packet of data.

57. A method for encryption key management in a communication system supporting broadcast services, comprising:
generating a short-term key using a broadcast access key;
encrypting a packet of data using the short-term key;
broadcasting the encrypted packet of data and an associated first number, the broadcasting comprising:
sending the first number with at least one encrypted packet of data; and
sending at least one encrypted packet of data without the first number.

58. A remote station adapted to extract data from at least one encrypted packet of data provided by a broadcast server, comprising:
receiver adapted for:
receiving a broadcast access key for the broadcast service;
receiving an encrypted packet of data from a plurality of encrypted packets of data, wherein the each encrypted packet of data is associated with one short-term key from a plurality of short-term keys, wherein each short-term key is associated with a first number;
receiving the first number corresponding to the short-term key associated with the encrypted packet of data;
generator adapted for generating the short-term key using the broadcast access key and the first number;
means for extracting a packet of data from the encrypted packet of data using the short-term key;
means for encrypting the broadcast access key to form an encrypted broadcast access key, wherein the secure memory storage unit is further adapted to store the encrypted broadcast access key; and
means for extracting the encrypted broadcast access key (EBAK) from the secure memory storage unit, comprising:
means for determining a Temporary Key (TK) comprising means for determining the TK associated with a second number stored in the secure memory storage unit;
means for storing the TK in the secure memory storage unit; and
means for decrypting the EBAK using the TK to form a Broadcast Access Key (BAK), wherein the means for determining the TK associated with the second number comprises:
means for forming the TK from the second number and a second root key stored in the secure memory storage unit, wherein the second root key is uniquely associated with the secure memory storage unit.

59. The remote station as in claim 58, wherein the means for forming the TK from the second number and the second root key comprises:
means for storing the second root key in the secure memory storage unit.

60. The remote station as in claim 58, wherein the means for forming the TK from the second number and the second root key comprises:
means for encrypting the second root key to form an encrypted second root key;
means for storing the encrypted second root key at the remote station.

61. The remote station as in claim 58, wherein the value of the second root key is known only to a fifth server and the secure memory storage unit.

62. A remote station adapted to extract data from at least one encrypted packet of data provided by a broadcast service, comprising:
receiver adapted for:
receiving a broadcast access key for the broadcast service;
receiving an encrypted packet of data from a plurality of encrypted packets of data, wherein the each encrypted packet of data is associated with one short-term key from a plurality of short-term keys, wherein each short-term key is associated with a first number;
receiving the first number corresponding to the short-term key associated with the encrypted packet of data;
wherein the receiver comprises a transmitter for requesting the broadcast access key from a first server;
generator adapted for generating the short-term key using the broadcast access key and the first number; and
means for extracting a packet of data from the encrypted packet of data using the short-term key.

63. A remote station adapted to extract data from at least one encrypted packet of data provided by a broadcast service, comprising:
receiver adapted for:
receiving a broadcast access key for the broadcast service;
receiving an encrypted packet of data from a plurality of encrypted packets of data, wherein the each encrypted packet of data is associated with one short-term key from a plurality of short-term keys, wherein each short-term key is associated with a first number;
receiving the first number corresponding to the short-term key associated with the encrypted packet of data;
wherein the receiver comprises means for receiving the first number with each encrypted packet of data;
generator adapted for generating the short-term key using the broadcast access key and the first number; and
means for extracting a packet of data from the encrypted packet of data using the short-term key.

64. The remote station of claim 63, wherein the transmitter requests the broadcast access key prior to an expiration time of a current broadcast access key.

65. A remote station adapted to extract data from at least one encrypted packet of data provided by a broadcast service, comprising:
receiver adapted for:
receiving a broadcast access key for the broadcast service;
receiving an encrypted packet of data from a plurality of encrypted packets of data, wherein the each encrypted packet of data is associated with one short-term key from a plurality of short-term keys, wherein each short-term key is associated with a first number;
receiving the first number corresponding to the short-term key associated with the encrypted packet of data wherein the first number is received with at least one encrypted packet of data;
generator adapted for generating the short-term key using the broadcast access key and the first number; and
means for extracting a packet of data from the encrypted packet of data using the short-term key.

66. A remote station adapted to extract data from at least one encrypted packet of data provided by a broadcast service, comprising:
receiver adapted for:
receiving a broadcast access key for the broadcast service;
receiving an encrypted packet of data from a plurality of encrypted packets of data, wherein the each encrypted packet of data is associated with one short-term key from a plurality of short-term keys, wherein each short-term key is associated with a first number:
receiving the first number corresponding to the short-term key associated with the encrypted packet of data;
receiving a broadcast access key expiration indicator, wherein the broadcast access key expiration indicator identifies an expiration time of the broadcast access key;
generator adapted for generating the short-term key using the broadcast access key and the first number; and
means for extracting a packet of data from the encrypted packet of data using the short-term key.

67. A remote station adapted to extract data from at least one encrypted packet of data provided by a broadcast service, comprising:
receiver adapted for:
receiving a broadcast access key for the broadcast service;
receiving an encrypted packet of data from a plurality of encrypted packets of data, wherein the each encrypted packet of data is associated with one short-term key from a plurality of short-term keys, wherein each short-term key is associated with a first number;
receiving the first number corresponding to the short-term key associated with the encrypted packet of data;
authorizing the remote station to provide the broadcast service;
generator adapted for generating the short-term key using the broadcast access key and the first number; and
means for extracting a packet of data from the encrypted packet of data using the short-term key.

68. A remote station adapted to extract data from at least one encrypted packet of data provided by a broadcast service, comprising:

receiver adapted for:
- receiving a broadcast access key for the broadcast service;
- receiving an encrypted packet of data from a plurality of encrypted packets of data, wherein the each encrypted packet of data is associated with one short-term key from a plurality of short-term keys, wherein each short-term key is associated with a first number;
- receiving the first number corresponding to the short-term key associated with the encrypted packet of data;

generator adapted for generating the short-term key using the broadcast access key and the first number;

means for extracting a packet of data from the encrypted packet of data using the short-term key; and secure memory storage unit for storing the broadcast access key, wherein the receiver for receiving the broadcast access key is further adapted for:
- authorizing the secure memory storage unit to provide the short-term keys to the remote station, wherein the first server authorizes the secure memory storage unit.

69. A remote station adapted to extract data from at least one encrypted packet of data provided by a broadcast service, comprising:

receiver adapted for:
- receiving a broadcast access key for the broadcast service;
- receiving an encrypted packet of data from a plurality of encrypted packets of data, wherein the each encrypted packet of data is associated with one short-term key from a plurality of short-term keys, wherein each short-term key is associated with a first number;
- receiving the first number corresponding to the short-term key associated with the encrypted packet of data;

generator adapted for generating the short-term key using the broadcast access key and the first number;

means for extracting a packet of data from the encrypted packet of data using the short-term key; and secure memory storage unit for storing the broadcast access key, wherein the secure memory storage unit is a User Identity Module (UIM) adapted for use in a wireless device supporting spread spectrum protocols.

* * * * *